US012227402B2

(12) United States Patent
Curtis, III

(10) Patent No.: US 12,227,402 B2
(45) Date of Patent: Feb. 18, 2025

(54) STOWABLE MODULAR UTILITY LIFT SYSTEM

(71) Applicant: Donald Raymond Curtis, III, Perry, FL (US)

(72) Inventor: Donald Raymond Curtis, III, Perry, FL (US)

( * ) Notice: Subject to any disclaimer, the term of this patent is extended or adjusted under 35 U.S.C. 154(b) by 316 days.

(21) Appl. No.: 17/807,828

(22) Filed: Jun. 20, 2022

(65) Prior Publication Data

US 2022/0402738 A1    Dec. 22, 2022

Related U.S. Application Data

(63) Continuation-in-part of application No. 17/349,838, filed on Jun. 16, 2021, now Pat. No. 11,400,850.

(51) Int. Cl.
| | |
|---|---|
| *B66F 9/12* | (2006.01) |
| *B60N 2/38* | (2006.01) |
| *B60R 9/06* | (2006.01) |

(52) U.S. Cl.
CPC .................. *B66F 9/12* (2013.01); *B60N 2/38* (2013.01); *B60R 9/06* (2013.01)

(58) Field of Classification Search
CPC ....... B60P 1/022; B60P 1/4407; B60P 1/4414; B60R 9/06; B66F 9/08; B66F 9/12; B66F 9/146; B66F 9/147; E02F 3/3408; E02F 3/3604; Y10S 414/13
USPC .................................................. 414/462, 607
See application file for complete search history.

(56) References Cited

U.S. PATENT DOCUMENTS

| | | | |
|---|---|---|---|
| 2,298,166 | A | 10/1942 | Richards |
| 2,683,540 | A | 7/1954 | Wood |
| 3,700,123 | A | 10/1972 | Corley, Jr. |
| 3,779,406 | A | 12/1973 | Hermann |
| 4,519,739 | A | 5/1985 | Risch |
| 4,787,809 | A | 11/1988 | Zrostlik |
| 4,813,842 | A | 3/1989 | Morton |
| 5,456,564 | A | 10/1995 | Bianchini |
| 5,951,236 | A | 9/1999 | Thompson |
| 6,869,265 | B2 | 3/2005 | Smith et al. |
| 6,932,555 | B2 | 8/2005 | Dale et al. |
| 8,342,540 | B1 | 1/2013 | Marleau |
| 8,689,898 | B2 | 4/2014 | Benesch |
| 8,974,169 | B2 | 3/2015 | Mizner |

(Continued)

FOREIGN PATENT DOCUMENTS

| | | |
|---|---|---|
| JP | H08301587 A | 11/1996 |
| KR | 101126148 B1 | 3/2012 |

(Continued)

OTHER PUBLICATIONS

International Search Report dated Mar. 9, 2022 in International Application No. PCT/US2021/041655.

(Continued)

*Primary Examiner* — James Keenan
(74) *Attorney, Agent, or Firm* — SALIWANCHIK, LLOYD & EISENSCHENK

(57) ABSTRACT

The subject invention pertains to stowable, modular lift conversion systems configured for aftermarket or OEM application to a truck, all-terrain vehicle (ATV), or utility task vehicle (UTV). Lift systems provided include removable and mounted systems with power provided by a battery, a winch, or linear motion device either on the lift or on the vehicle. Modular implements and lift attachments are provided.

20 Claims, 42 Drawing Sheets

(56) References Cited

U.S. PATENT DOCUMENTS

| | | |
|---|---|---|
| 9,731,642 B2 | 8/2017 | Narinen |
| 10,160,395 B2 | 12/2018 | Robinson et al. |
| 10,384,617 B1 | 8/2019 | Keyser |
| 10,480,154 B2 | 11/2019 | Breuer et al. |
| 10,682,964 B1 | 6/2020 | Turner et al. |
| 10,717,636 B2 | 7/2020 | Addicott |
| 2005/0254925 A1 | 11/2005 | Braquet |
| 2006/0120841 A1 | 6/2006 | Meeks |
| 2007/0166138 A1 | 7/2007 | Brooks |
| 2008/0292435 A1 | 11/2008 | Turner et al. |
| 2010/0290876 A1 | 11/2010 | Conatser |
| 2011/0085880 A1 | 4/2011 | Davis et al. |
| 2011/0168417 A1 | 7/2011 | Benesch |
| 2016/0167933 A1 | 6/2016 | Birch et al. |
| 2021/0331538 A1 | 10/2021 | Kato |

FOREIGN PATENT DOCUMENTS

| | | |
|---|---|---|
| KR | 101515881 B1 | 5/2015 |
| WO | 2021009284 A1 | 1/2021 |

OTHER PUBLICATIONS

International Search Report dated Oct. 3, 2023 in International Application No. PCT/US2023/068742.

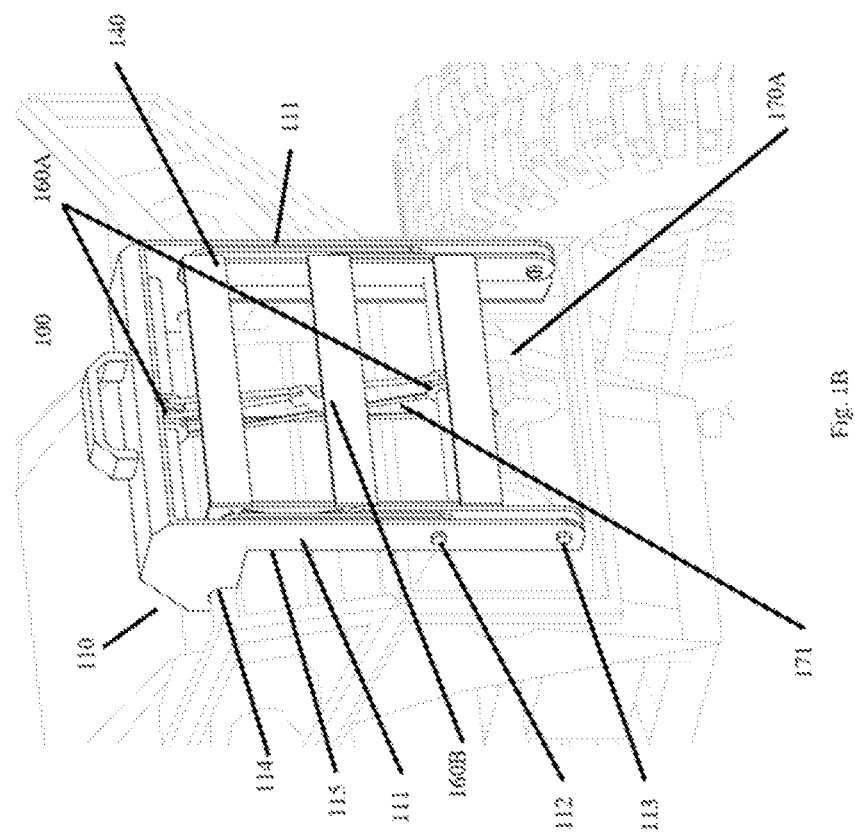
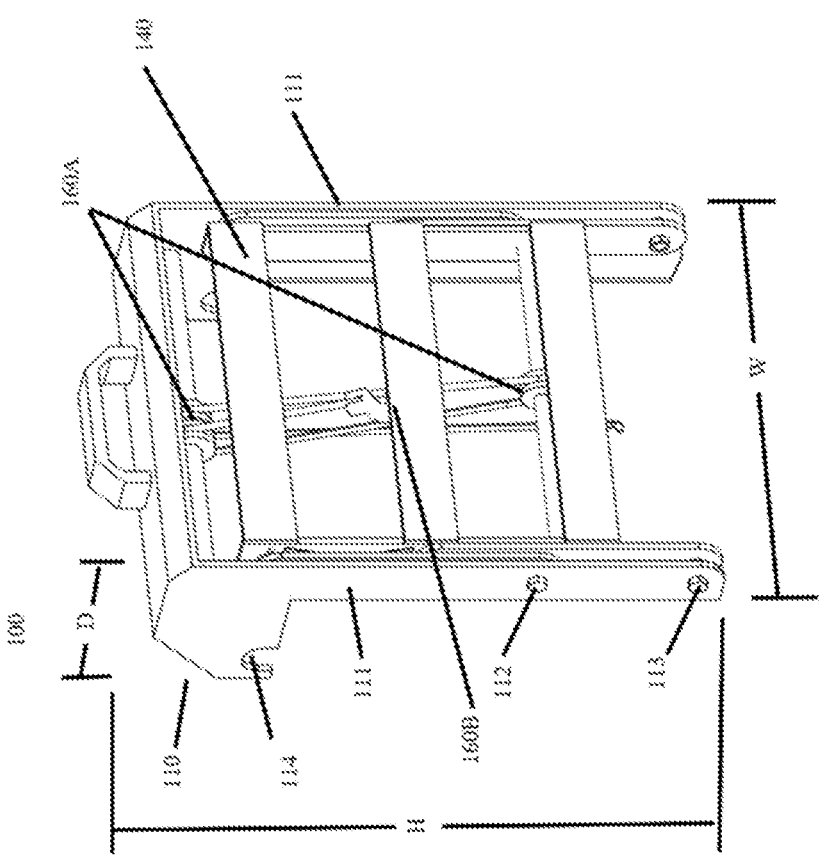

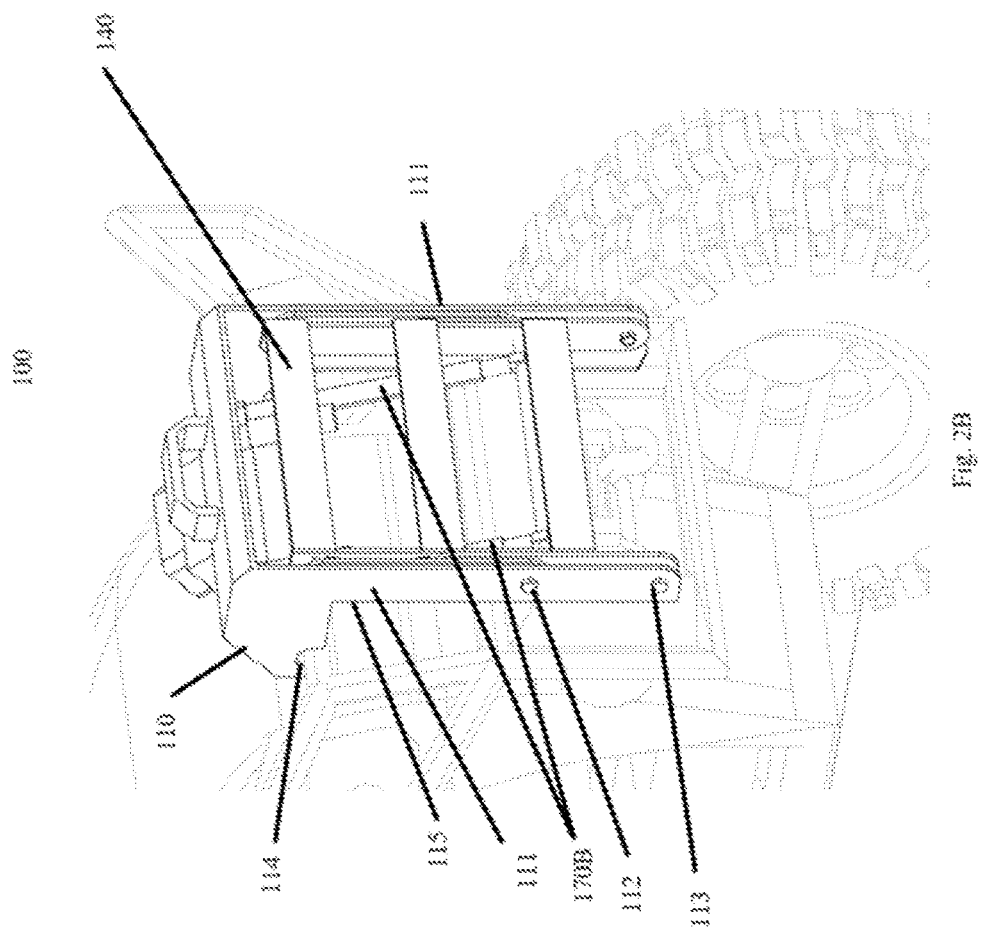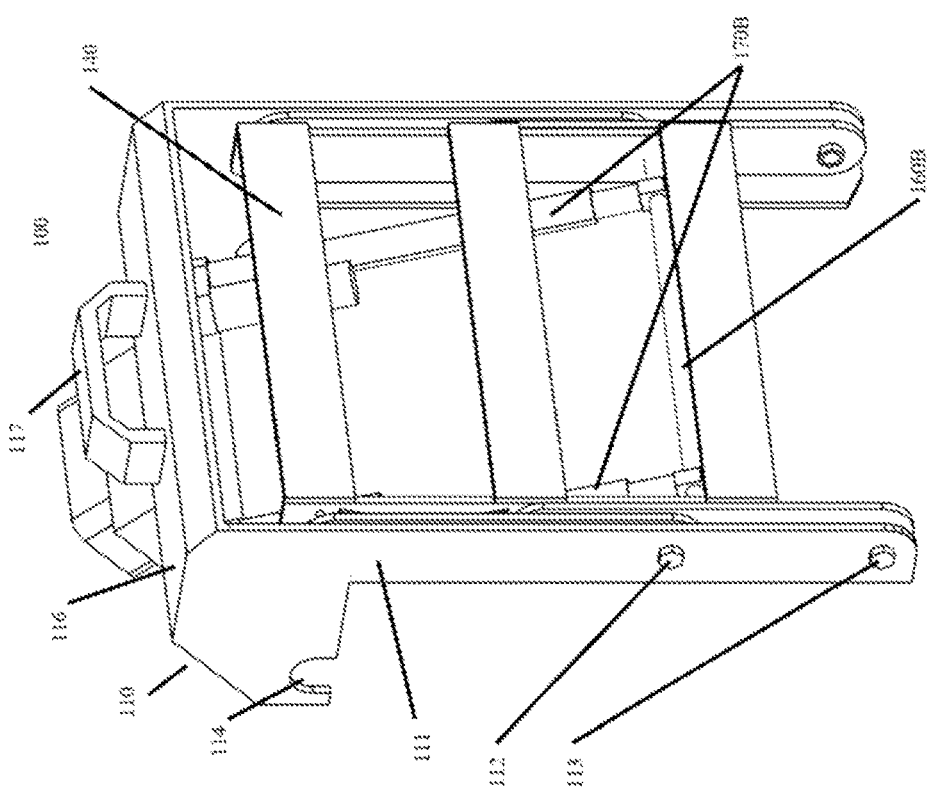

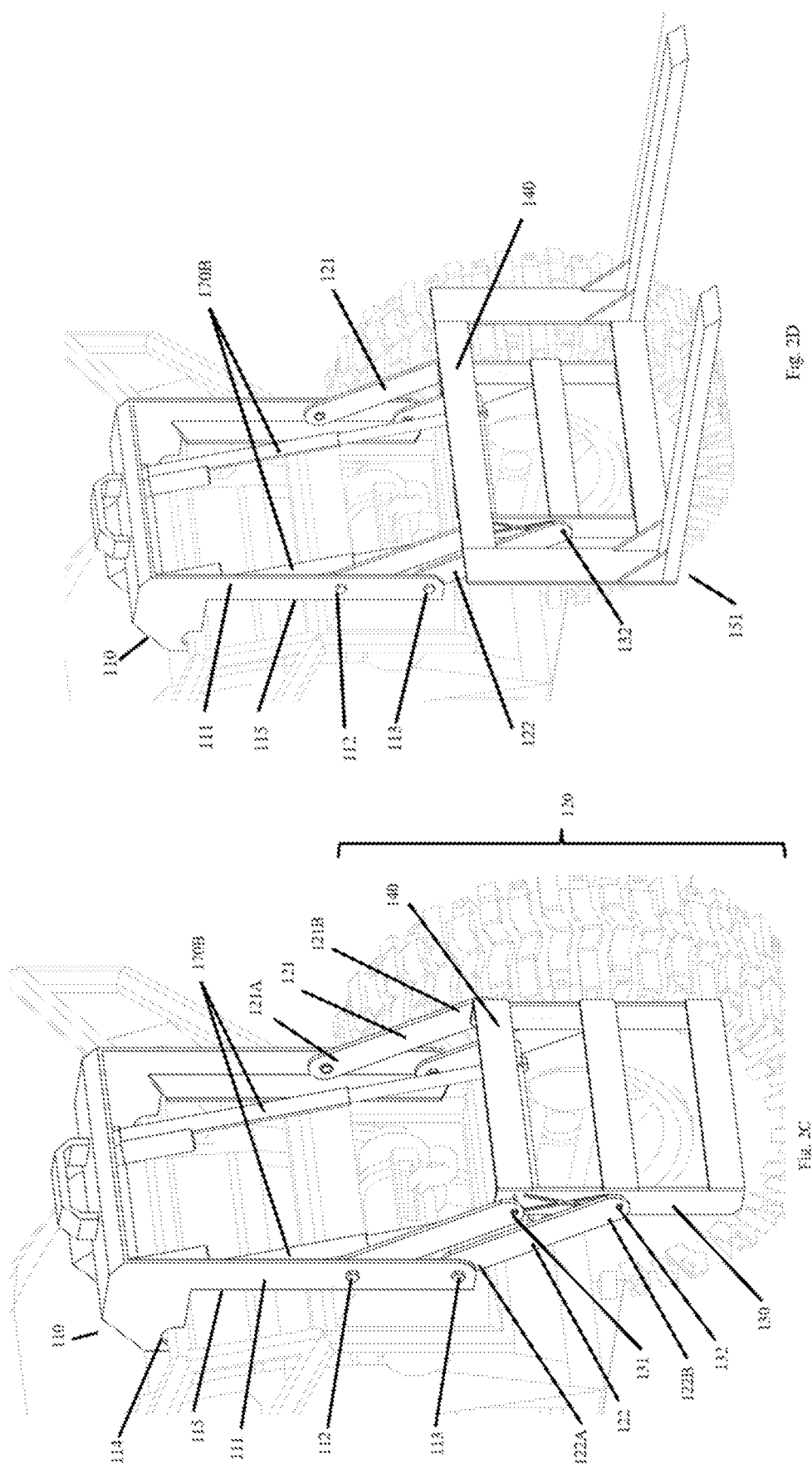

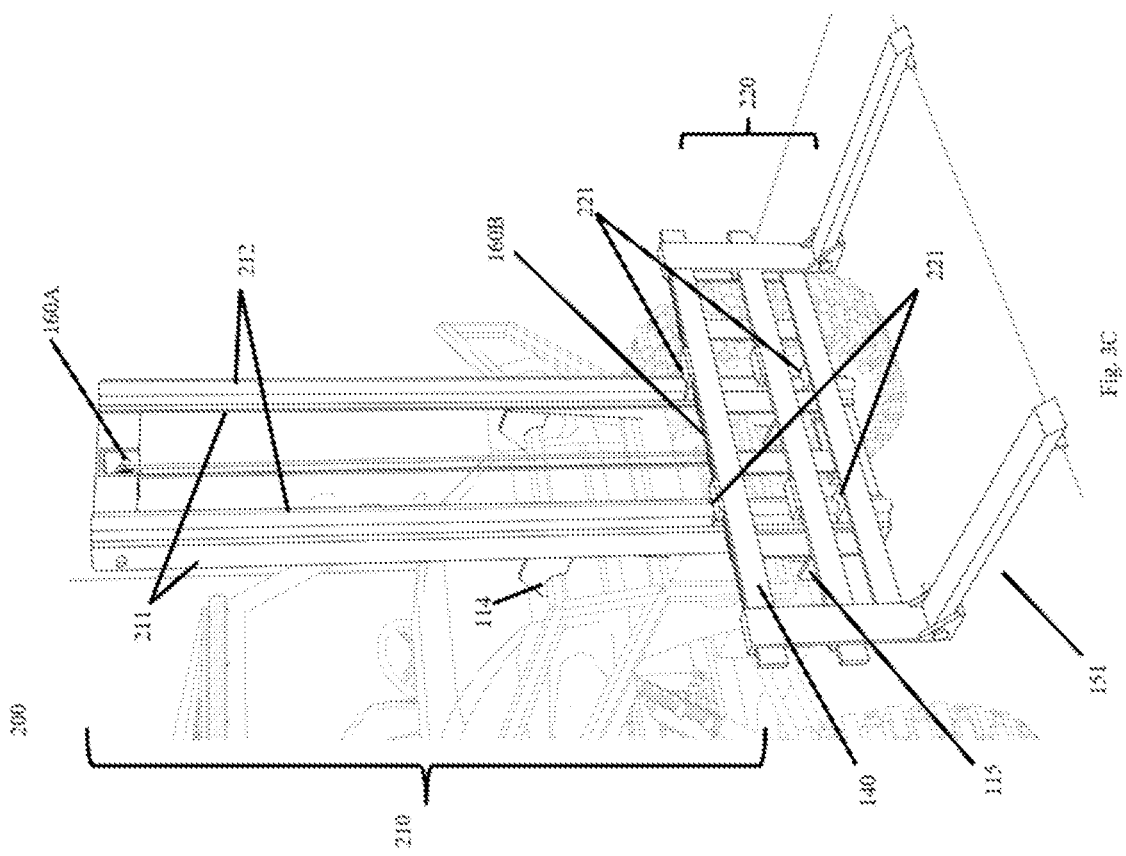
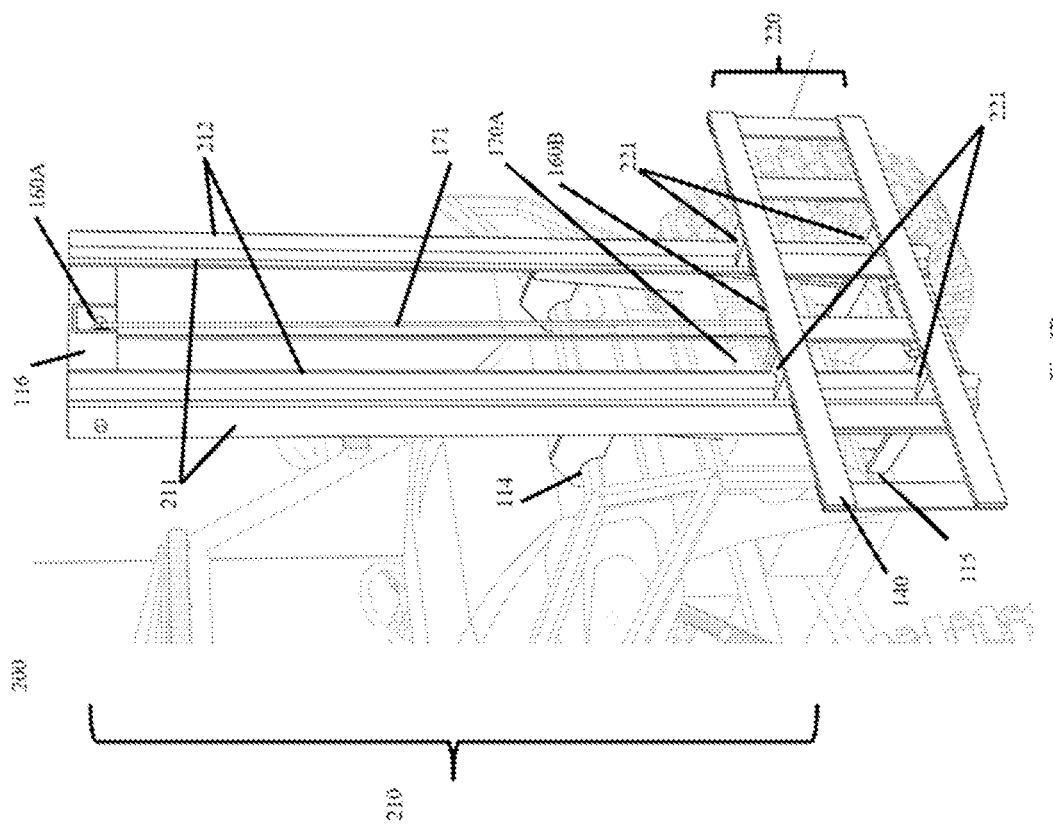

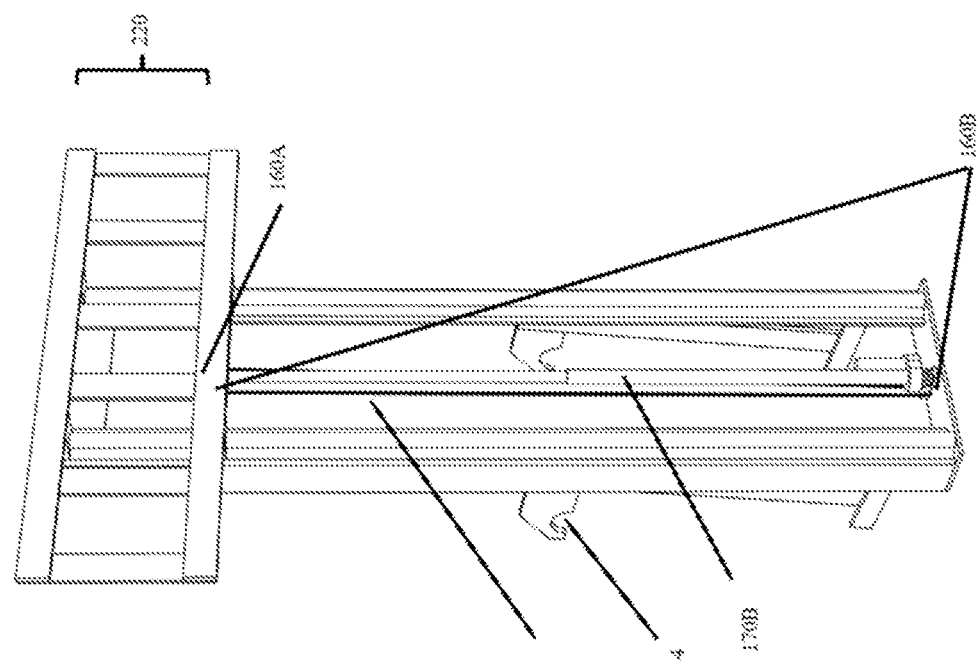
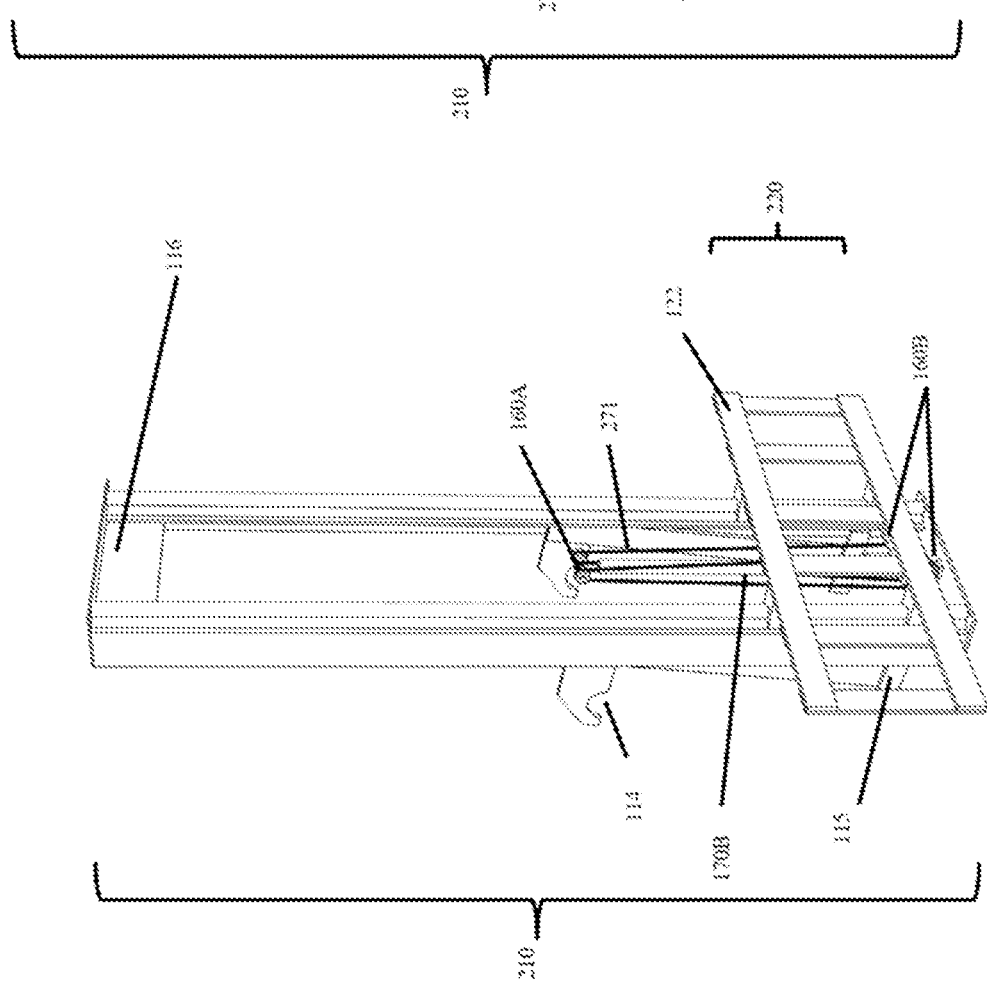

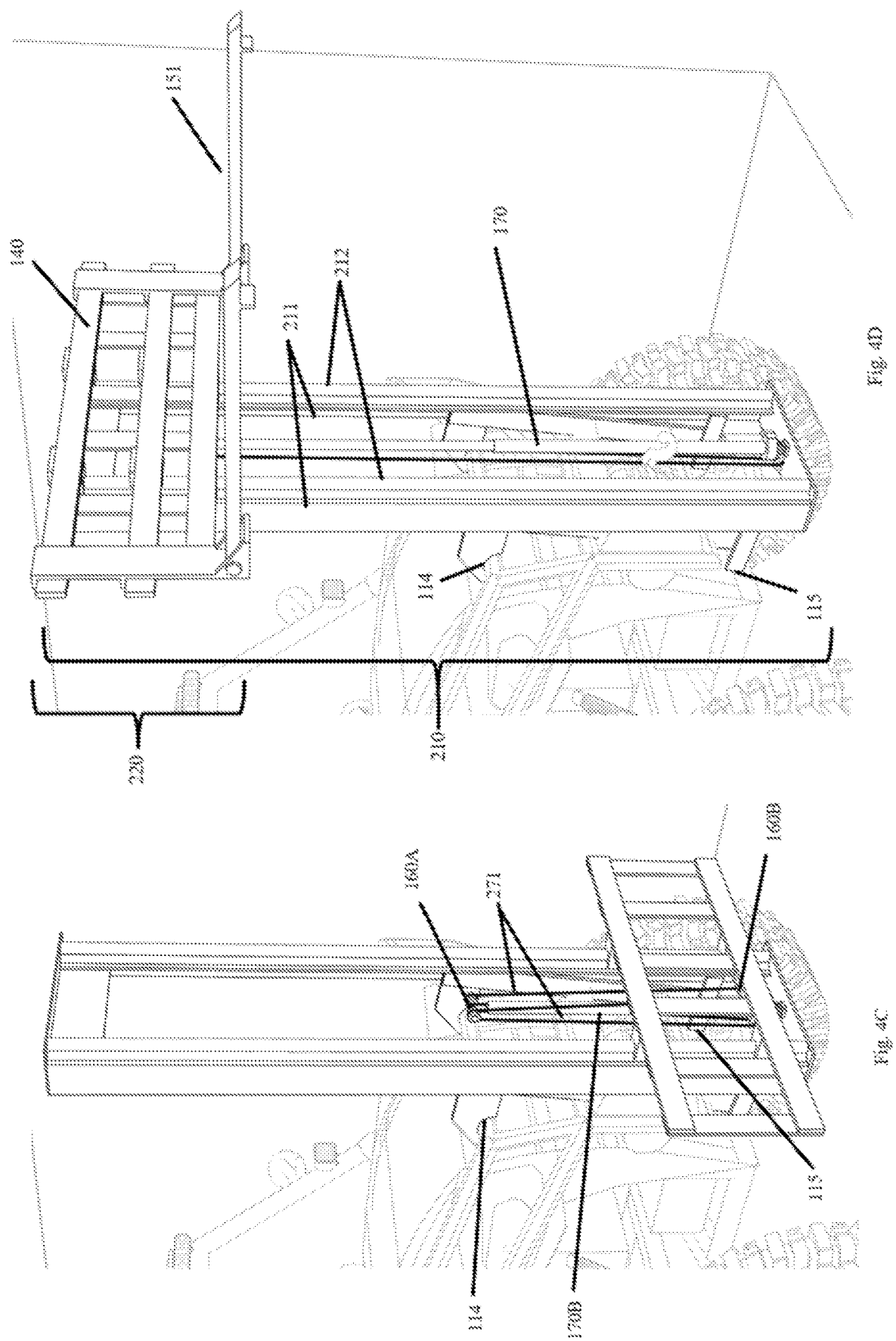

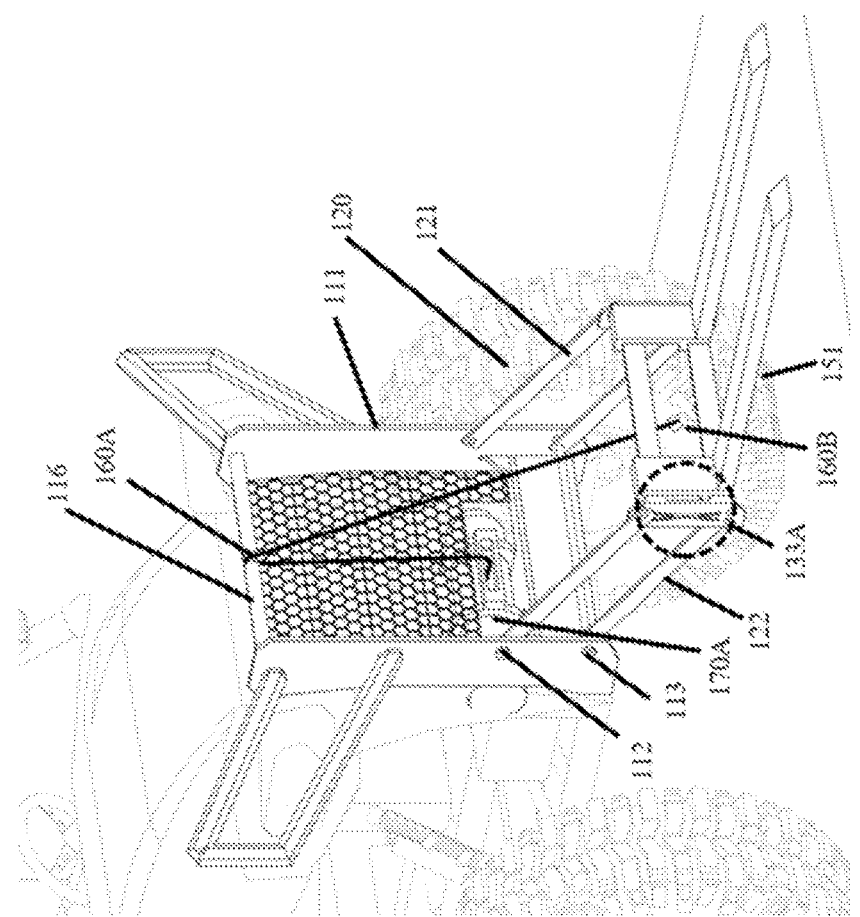
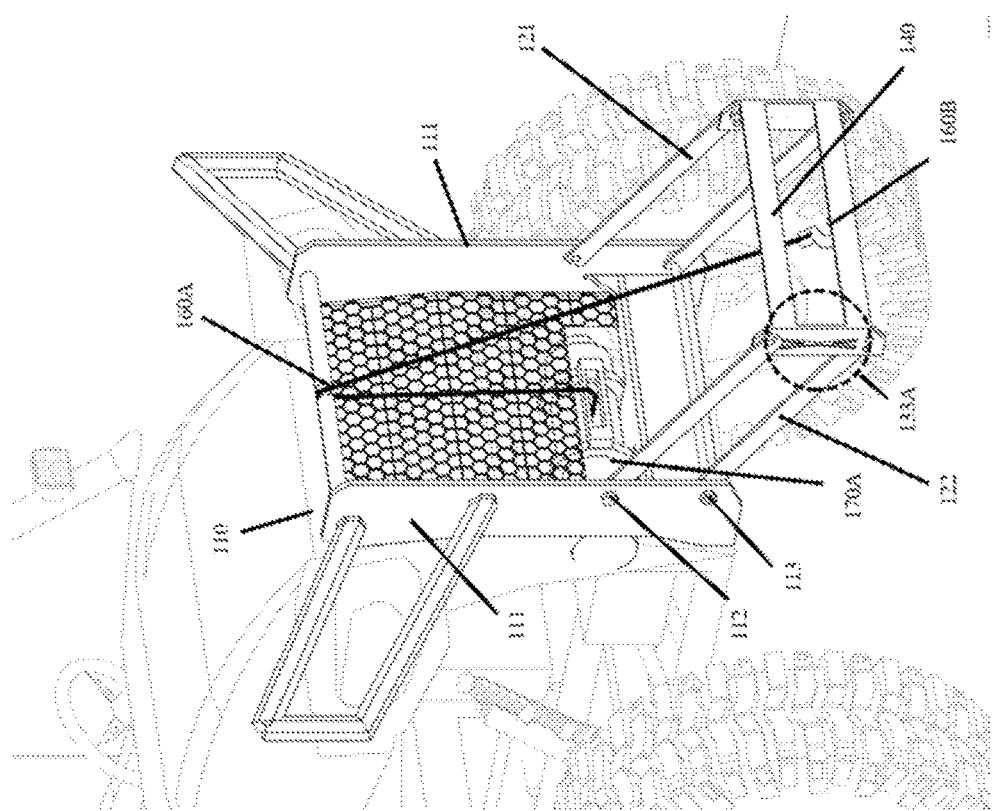

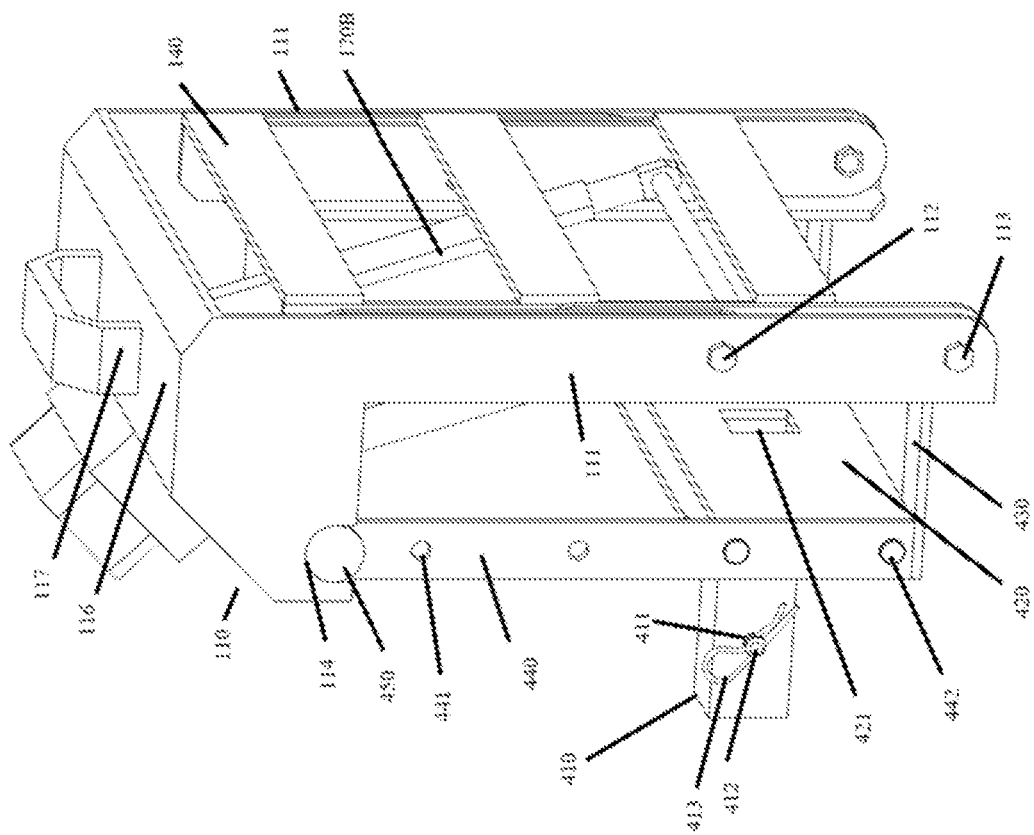
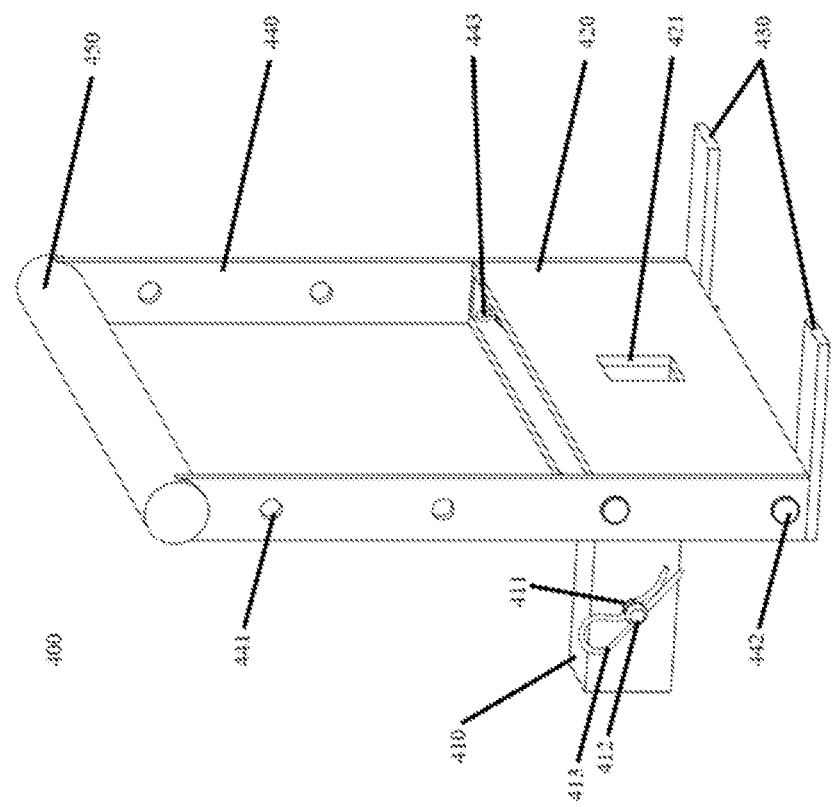

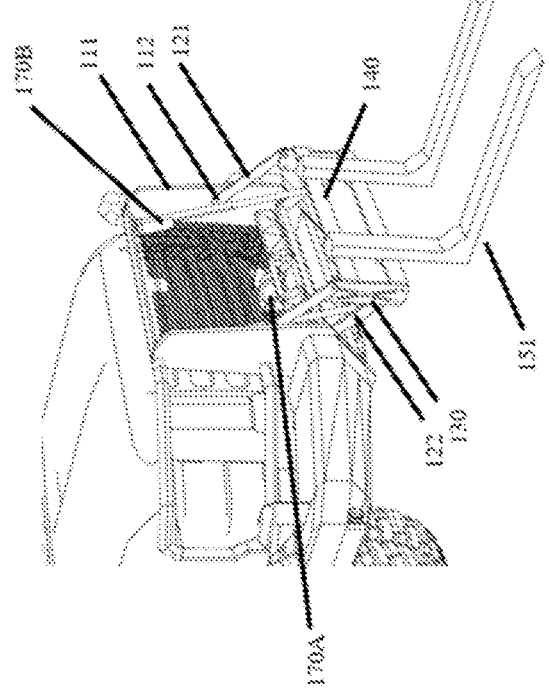
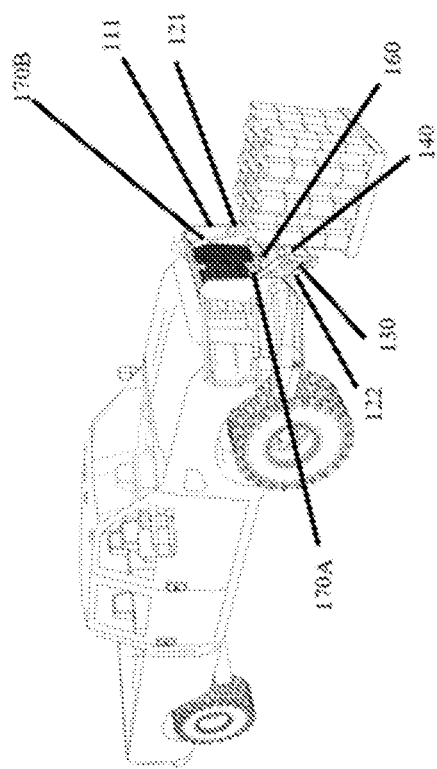
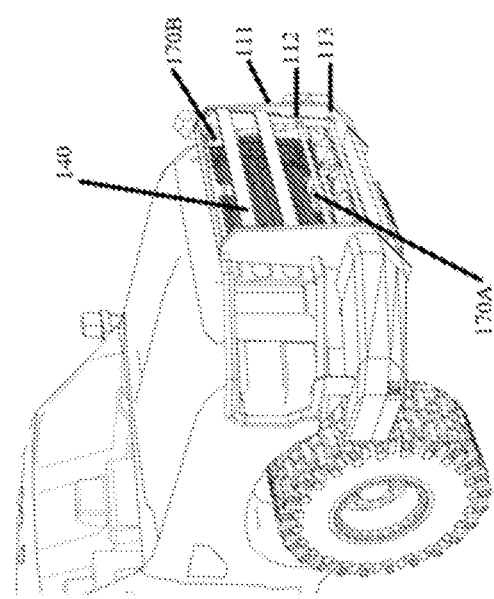
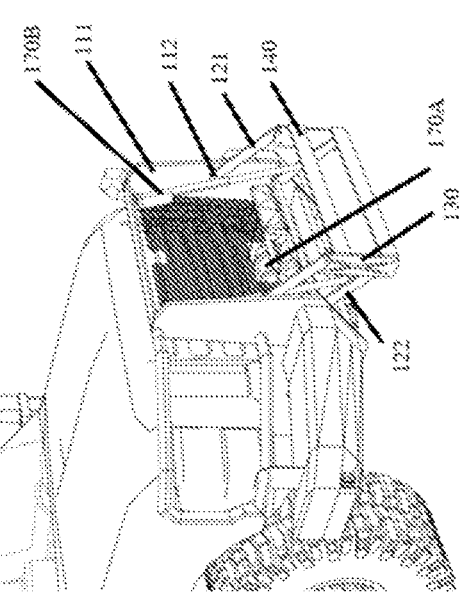
Fig. 11A
Fig. 11B
Fig. 11C
Fig. 11D

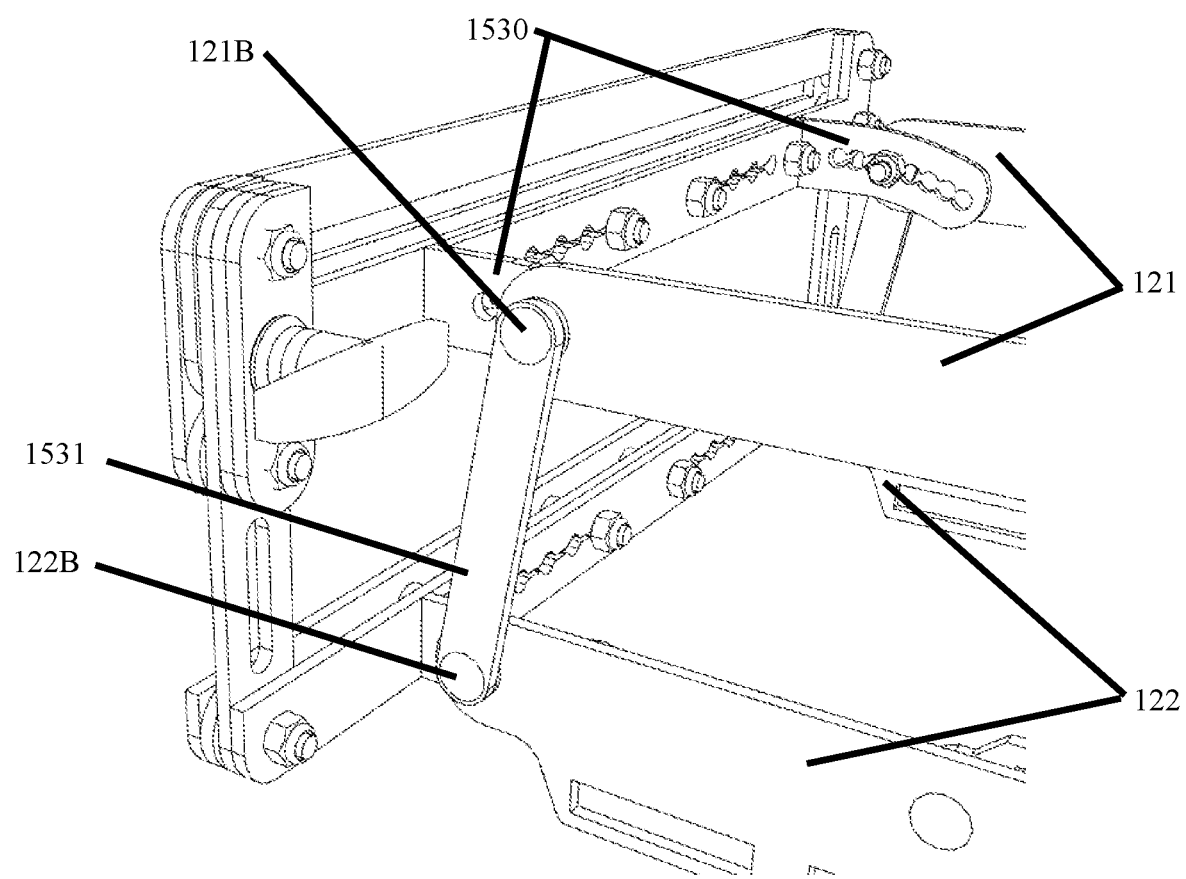
Fig. 17C1

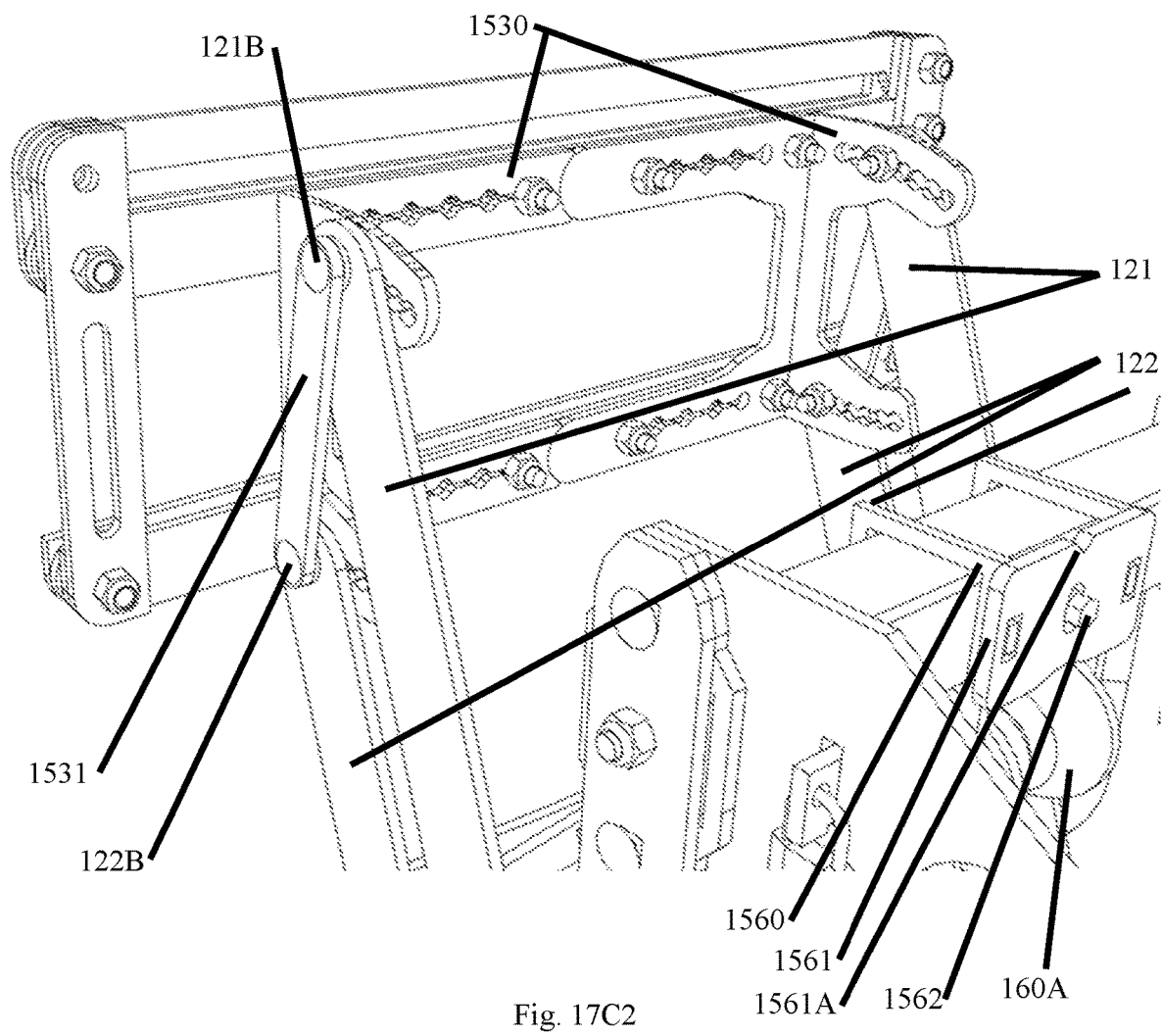
Fig. 17C2

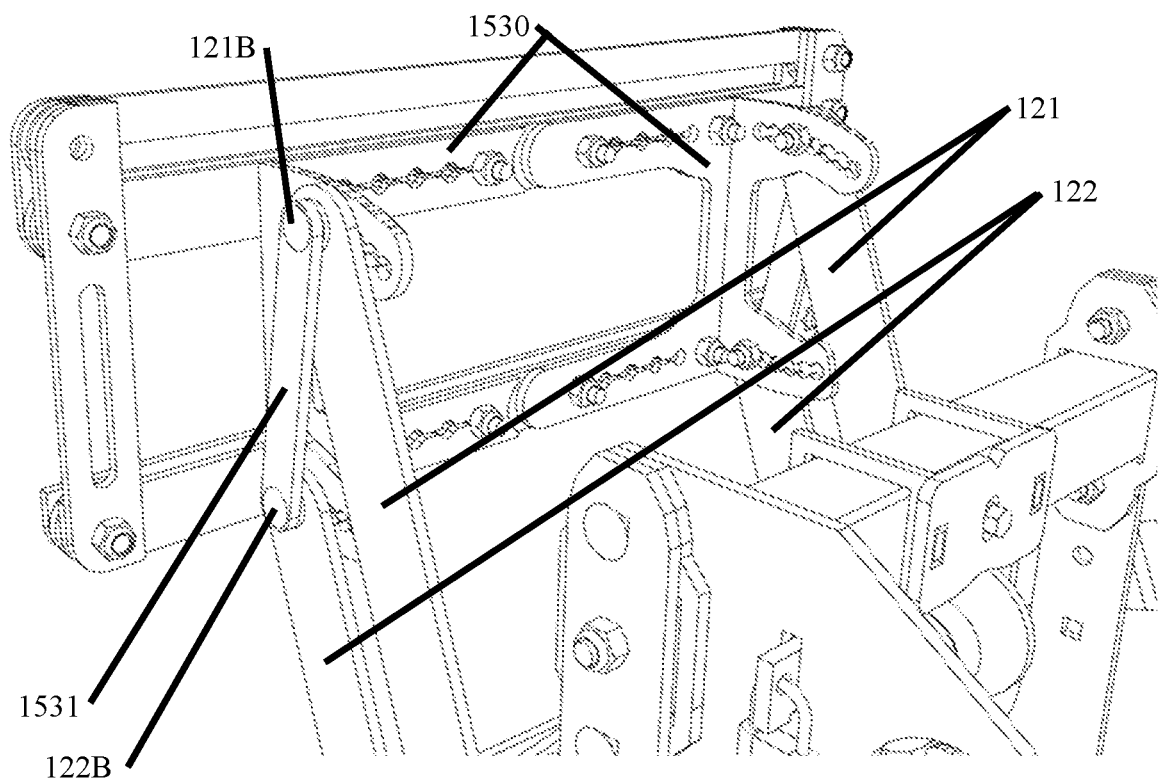
Fig. 17C3

STOWABLE MODULAR UTILITY LIFT SYSTEM

CROSS-REFERENCE TO RELATED APPLICATION

This application claims the benefit of U.S. application Ser. No. 17/349,838, filed Jun. 16, 2021, now U.S. Pat. No. 11,400,850, issued Aug. 2, 2022, which is hereby incorporated by reference in its entirety including any tables, figures, or drawings.

BACKGROUND OF THE INVENTION

In the United States, throughout North America, and around the world there are a large number of trucks, all-terrain vehicles, and utility vehicles in use for personal, recreational, industrial, or mixed applications.

According to Polaris Inc.'s 2020 Annual Shareholder Report (Form 10-K, Page 3), 2020 retail sales of all manufacturers' all-terrain vehicles ("ATVs") and utility task vehicles ("UTVs" or "side-by-side") were as follows:

North America ATV retail sales 345,000
North America side-by-side retail sales 640,000
Worldwide ATV retail sales 465,000
Worldwide side-by-side retail sales 690,000

According to General Motor Company's 2020 Annual Shareholder Report (Form 10-K, Page 2), 4,055,000 trucks were sold in the United States in 2020 alone.

Although a smaller portion of the millions sold each year, many trucks come equipped with bumpers and brush guards, or have the same installed aftermarket.

These vehicles can be adapted and particularly suitable for a variety of applications both on and off-road. These vehicles can also be well suited to reach and operate in areas where a traditional fork-lift or lift-equipped tractor is not readily available, is inconvenient to access, or is not suited to operate. For example, a fork-lift can be unable to traverse an unpaved construction or agricultural site. Additionally, conventional commercial lifts, tractors, and the like can be large, heavy, expensive, and otherwise not practical to deploy in many situations including remote sites, areas lacking in improved road access, or tight spaces created by geographical features, trees, or structures.

There exists a need in the art for improved lifting capabilities on trucks, ATVs, and UTVs as evidenced by review of the patent literature.

Marleau (U.S. Pat. No. 8,342,540) teaches a vehicle implement pivotally connected to a frame by at least one arm. The vehicle implement is pivotable between a first position and a second position, vertically higher than the first position. A suspension limiter restricts movement of the left and right suspensions.

Benesch (U.S. Pat. No. 8,689,898) teaches a removable loader for a vehicle wherein the removable loader is configured to pivot about the first pivotal axis and the implement is configured to pivot about the second pivotal axis each by only one winch.

Turner et al. (U.S. Pat. No. 10,682,964) teaches a load lifting system for use on a vehicle comprising a plurality of mounting members and a load lifting assembly.

Keyser (U.S. Pat. No. 10,384,617) teaches a vehicle loader/carrier system comprising a fixed frame, a movable frame, and motion imparting mechanisms including upper links and lower links being curved with a center of curvature above the system when the movable frame is in the lowered orientation and with a center of curvature forwardly of the system when the movable frame is in the raised orientation.

While the above references focus generally on adding some utility to trucks, ATVs, and/or UTVs, they each exhibit shortcomings in cost, complexity, bulk, size, weight, adaptability, or ease of use. Some are limited to specific tasks such as plowing. All require a level of integration with and in some cases modifications of design or construction in the subject vehicle. None fully meet the needs of a stowable modular utility lift system.

BRIEF SUMMARY OF THE INVENTION

Embodiments of the subject invention provide a compact and easily stowed modular lift system designed to transform an ATV, UTV, or truck into a highly portable powered lift and transport. Applications can include vehicles such as ATVs, UTVs, trucks, cars, buses, golf carts, lawn carts, mowers, tractors, and other vehicles known in the art.

In certain embodiments the modular design on the back end (e.g., the end facing the vehicle) can be lifted off of one vehicle and placed in storage or on another vehicle in seconds without adjustment, modifications, or removal of fastening mechanisms. In alternate embodiments the modular design can provide specific adjustment, modifications, or removal of fastening mechanisms to adapt to different vehicles or storage configurations.

The novel x-plate adjustable members allow the lift to be adapted quickly and easily to mount on vehicles of different geometry. The modular design on the front end (e.g., the end facing away from the truck/ATV/UTV) allows a wide variety of implements to be attached quickly and easily; again, without the necessity of fastening mechanisms.

Many UTVs and ATVs are factory equipped with steel brush guards on the front facing end, mounted to the frame of the vehicle. (e.g., A visual review of the 2021 Polaris RANGER Model Lineup from https://ranger.polaris.comkn-us/utvs/ shows 17 of 17 models categorized as 2-Seat, 3-Seat, Special Editions, or CREW are pictured with a factory installed brush guard, while only one model categorized as Youth is pictured without a factory installed brush guard.)

Although the brush guard designs vary widely, many UTV brush guards and ATV brush guards can have at least 18 inches of 1.5" diameter horizontal steel tubing extending across the front of the vehicle. Of those vehicles, a significant number come equipped with cable winches that can be used to pull an ATV or UTV from the mud, or used to drag heavy objects. Cable winches are also available as an aftermarket add-on or upgrade.

Additionally, ATVs and UTVs are commonly factory equipped or aftermarket outfitted with a rear facing two-inch hitch receiver. Front facing two-inch hitch receivers are also available.

Yet there persists a need in the art for a lift that is compact, adaptable, portable, modular, simple, light-weight, and flexible.

The designs set forth herein serve to create incredibly powerful yet simple lift systems for trucks, ATVs, and UTVs, utilizing a combination of the existing vehicle frame, a brush guard, and a winch (if available) or linear actuators in the absence of a winch.

Whether a construction site, farm, factory, or forest, the usefulness of the ability to quickly convert any ATV or UTV effectively into an off-road capable forklift cannot be overstated.

For example, a pallet of roofing shingles is delivered to the one corner of the large construction site, but needs to get to the opposite end. The forklift will get stuck if not on pavement, so it is of no use since the area is not yet paved. And the Foreman didn't foresee the need to have a tractor on site. But, the Foreman has a stowable modular utility lift system as described herein. With ease, the Foreman deploys the system on his job site UTV or truck and is able to lift and transport the pallet as needed.

As the Foreman is to the pallet, so too is the farmer to the bale of hay, the equestran to bags of feed, the hunter to downed game; and so on.

Since truck brush guards, unlike with ATVs and UTVs, vary widely with few common design elements providing a uniform add on lift system can present additional challenges. Instead, integrally designing the lift system within a brush guard allows for manufacturers and aftermarket dealers to equip a truck with an integrated stowable modular utility lift system.

Additionally, the majority of trucks are factory equipped or aftermarket outfitted with a rear facing 2-inch (or other standard size, e.g., 1¼", 2½", 3", or 50 mm) hitch receiver in the rear that would allow for quick attachment of a non-integral stowable modular utility lift system.

The designs set forth herein serve to create incredibly powerful, yet simple, lift systems for trucks, utilizing a combination of the subject stowable modular utility lift system (integral or non-integral) and the existing vehicle frame or hitch receiver.

In the prior example, the Foreman still needs to transport a load of construction materials across the job site.

Fortunately for the Foreman, he has a stowable modular utility lift system as described herein that he can fit into his 2-inch hitch receiver.

The Foreman is an overachiever though, and has outfitted his truck with the integral version of the stowable modular utility lift system. With ease, the Foreman employs either system and is able to lift and transport the pallet with his truck as needed.

Again, whether a job Foreman, famer, equestrian, hunter, or otherwise, the value of being able to use existing motorized vehicles to lift and transport heavy and/or awkward loads without the need for a dedicated forklift or tractor cannot be overstated.

A prototype in accordance with embodiments of the subject invention has been used to move horse trailers, utility trailers, boat trailers with boat, horse feed, hay, pallets loaded down with 400 pounds of potting soil, 8 foot long by 18 inch diameter logs, and other heavy loads. Embodiments have also been used to pick up a tractor box blade and even a tractor harrow and move them from one location to another. Potential implements include but are not limited to platforms or containers that would enable easy transport of a wide variety of loads, including downed livestock, injured persons, medical supplies, or construction materials.

By redirecting the pull capacity of existing ATV/UTV winches (e.g., 4,500 pounds tension from model 45RC manufactured and sold by Warn Industries, Inc., located in Clackamas, Oregon), embodiments provide the user with substantial lift and carry capacity (e.g., easily providing up to 4,500 pounds vertical lifting force depending on the angles and leverage ratios selected) where it would not otherwise be available. In trucks, winch tension capacity is typically up to 12,000 pounds. Where linear actuators are used in lieu of a winch, lift capacities can range from 250 pounds to 10,000 pounds depending on the motor and gear ratio utilized. In all examples, the effective lift capacity can be limited by or designed around the ultimate load carrying capacity of the vehicle.

In addition to recreational, agricultural, construction, commercial, and home-use applications suited to embodiments of the subject invention, the military, law enforcement, fire rescue, public works, and parks management applications are nearly innumerable. ATV/UTV vehicles are a longstanding and growing part of military and public service operations (see, e.g., military.polaris.com/en-us/about and www.popularmechanics.com/military/a17336/special-forces-atv-marines-army/). The modularity, flexibility, simplicity, and robust nature of the subject invention unlock immense value in governmental and public service applications. Embodiments provide rapid conversion of existing vehicles into cargo lifts, immediately enhancing the utility of existing equipment. For example, a military, government, or public service unit in operation with or supported by multiple single-rider or multi-passenger light vehicles (e.g., jeeps, hummers, UTVs, and ATVs) can provide cargo lift and transport functionality to any available vehicle with a modular lift according to an embodiment of the subject invention, then either remove the lift from the vehicle, or place the lift in a stowed configuration until needed again. In this manner, a single lift or a small number of lifts can serve a large number of vehicles in a service area.

BRIEF DESCRIPTION OF THE DRAWINGS

FIG. 1A shows a modular lift conversion system for mounting on an existing vehicle rack or guard in accordance with an embodiment of the subject invention in perspective view. The lift is in a stowed configuration and ready for mounting on a vehicle.

FIG. 1B shows a modular lift conversion system for mounting on an existing vehicle rack or guard in accordance with an embodiment of the subject invention in perspective view. The lift is in a stowed configuration mounted on a vehicle.

FIG. 1I shows a modular lift conversion system for mounting on an existing vehicle rack or guard in accordance with an embodiment of the subject invention in perspective view. The lift is depicted in a lowered position with modular implements to more clearly show elements of the invention.

FIG. 1J shows a modular lift conversion system for on mounting an existing vehicle rack or guard in accordance with an embodiment of the subject invention in perspective view. The lift is depicted in a lowered position with a modular passenger carrying seat implement to more clearly show elements of the invention.

FIG. 2A shows a modular lift conversion system for mounting on an existing vehicle rack or guard in accordance with an embodiment of the subject invention in perspective view. The lift is in a stowed configuration and ready for mounting on a vehicle.

FIG. 2B shows a modular lift conversion system for mounting on an existing vehicle rack or guard in accordance with an embodiment of the subject invention in perspective view. The lift is in a stowed configuration mounted on a vehicle.

FIG. 2C shows a modular lift conversion system for mounting on an existing vehicle rack or guard in accordance with an embodiment of the subject invention in perspective view. The lift is in a deployed position mounted on a vehicle.

FIG. 2D shows a modular lift conversion system for mounting on an existing vehicle rack or guard in accordance with an embodiment of the subject invention in perspective view. The lift is in a deployed position mounted on a vehicle with a modular forklift implement installed.

FIG. 2E shows a modular lift conversion system for mounting on an existing vehicle rack or guard in accordance with an embodiment of the subject invention in rear perspective view. The lift is depicted from the rear in a deployed position mounted on a rack with no vehicle shown to more clearly show elements of the invention.

FIG. 3B shows a modular vertical slide lift conversion system for mounting on an existing vehicle rack or guard in accordance with an embodiment of the subject invention in perspective view. The lift is in a stowed configuration mounted on a vehicle.

FIG. 3C shows a modular vertical slide lift conversion system for mounting on an existing vehicle rack or guard in accordance with an embodiment of the subject invention in perspective view. The lift is in a stowed configuration mounted on a vehicle with a modular forklift implement installed.

FIG. 4A shows a modular vertical slide lift conversion system for mounting on an existing vehicle rack or guard in accordance with an embodiment of the subject invention in perspective view. The lift is in a stowed configuration and ready for mounting on a vehicle.

FIG. 4B shows a modular vertical slide lift conversion system for mounting on an existing vehicle rack or guard in accordance with an embodiment of the subject invention in perspective view. The lift is in a deployed position with no vehicle shown to more clearly show elements of the invention.

FIG. 4C shows a modular vertical slide lift conversion system for mounting on an existing vehicle rack or guard in accordance with an embodiment of the subject invention in perspective view. The lift is in a stowed configuration mounted on a vehicle.

FIG. 4D shows a modular vertical slide lift conversion system for mounting on an existing vehicle rack or guard in accordance with an embodiment of the subject invention in perspective view. The lift is in a deployed position mounted on a vehicle with a modular forklift implement installed.

FIG. 5C shows an integrated modular brush guard and lift conversion system for mounting on an existing vehicle in accordance with an embodiment of the subject invention in perspective view. The lift is in a deployed position mounted on a vehicle.

FIG. 5D shows an integrated modular brush guard and lift conversion system for mounting on an existing vehicle in accordance with an embodiment of the subject invention in perspective view. The lift is in a deployed position mounted on a vehicle with a modular forklift implement installed.

FIG. 9A shows a modular lift conversion system and 2-inch receiver adapter for mounting on an existing vehicle hitch receiver in accordance with an embodiment of the subject invention in perspective view. The 2-inch receiver adapter is ready for mounting on a vehicle.

FIG. 9B shows a modular lift conversion system and 2-inch receiver adapter for mounting on an existing vehicle hitch receiver in accordance with an embodiment of the subject invention in perspective view. The lift is in a stowed configuration mounted on the adapter and ready for mounting on a vehicle.

FIG. 12I shows a modular vertical slide lift conversion system for mounting on an existing vehicle rack or guard in accordance with an embodiment of the subject invention in perspective view. The lift is in a deployed position mounted on a vehicle with a modular forklift implement installed.

FIG. 17C1 shows a detailed view of a modular lift conversion system with a closed and locked safety bar and laterally connected but vertically separated adaptive mounting plates according to an embodiment of the subject invention.

FIG. 17C2 shows a detailed view of a modular lift conversion system with a closed and locked safety bar and laterally interdigitating but vertically connected adaptive mounting plates according to an embodiment of the subject invention.

FIG. 17C3 shows a detailed view of a modular lift conversion system with a closed and locked safety bar and laterally separated but vertically connected adaptive mounting plates according to an embodiment of the subject invention.

DETAILED DISCLOSURE OF THE INVENTION

Figure 1D:
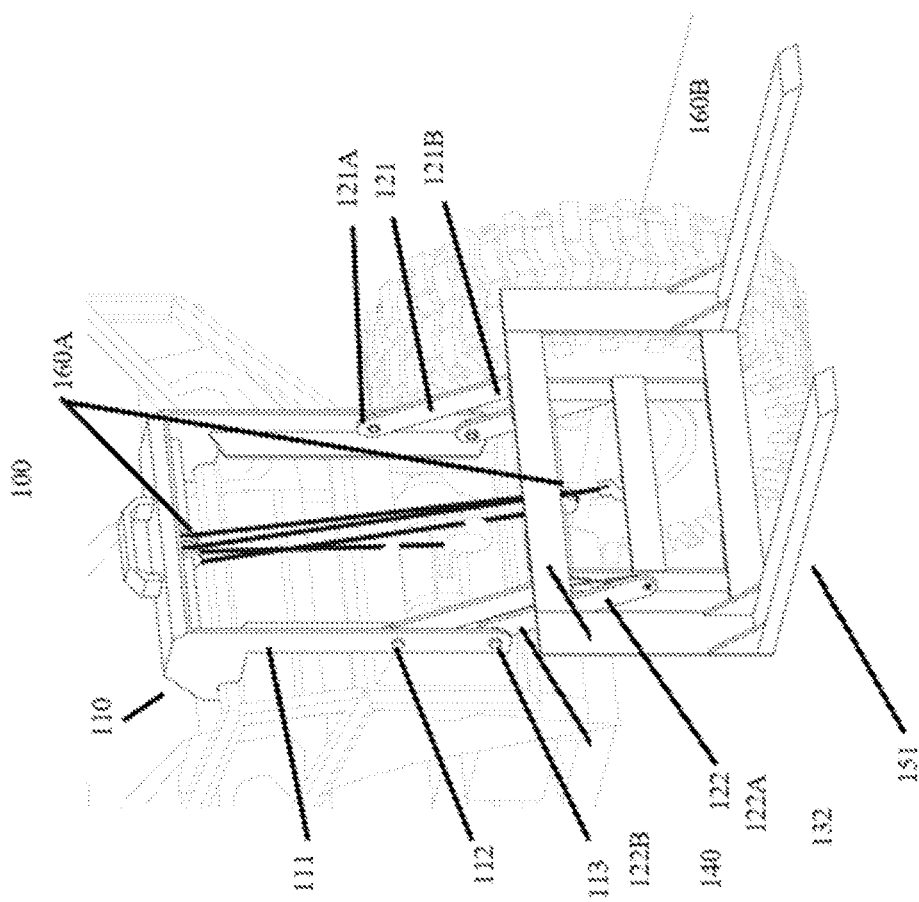
FIG. 1D shows a modular lift conversion system for mounting on an existing vehicle rack or guard in accordance with an embodiment of the subject invention in perspective view. The lift is in a deployed position mounted on a vehicle with a modular forklift implement installed.

Embodiments of the subject invention provide a compact and easily stowed modular lift system designed to transform an ATV, UTV, or truck into a highly portable fork-lift.

In an ATV/UTV embodiment, when in a stowed configuration, the lift can measure approximately 24" high×18" wide×14". When ready for use, the user can unfold the lift and place it on the top horizontal rail of an ATV or UTV grill guard. The ATV or UTV's winch can be threaded through the lift's pulleys, and the winch hook attached to a connection point (e.g., a winch ring.)

The user does not need to bolt or strap down the lift, as it can be secured to the ATV or UTV by a combination of gravity, leverage, and downward force of the winch cable. The user is then ready to lift loads (e.g., up to 600 pounds or 1,000 pounds in certain embodiments) simply by pushing his or her ATV/UTV winch button.

In one embodiment, a top bracket sits on the horizontal bar of an ATV, UTV, or truck. The combination of the winch cable being applied to the lift along with the forward weight of the implement mount plates, forces the vertical braces press against the grill guard of the vehicle, causing the lift to be secured to the vehicle. The lift can hang on the vehicle's grill guard in a stowed configuration, or in an extended or deployed position where a movable frame, a modular implement base, implement bar, or frame members extend (e.g., by folding out and down.) Once deployed (e.g., into an extended position), multiple modular implements can be placed upon the front implement plates, including but not limited to a trailer ball for moving trailers, a pair of narrow forks (e.g., for carrying lighter loads), or a seat lift for low speed riding (e.g., quail hunting.) An alternative embodiment provides a vertical or near vertical fork-lift design, using the same modular hang on back-end that enables attachment to multiple different vehicles without latches or bolts. The winch cable can feed through a pulley at the top of the rail, then pull the lift directly up.

Further embodiments provide a line, family, or kit of multi-vehicle, multi-power, modular vehicle lift conversion systems providing on and off-road vehicles the ability to quickly transform existing components and/or systems to lift systems. In certain embodiments the implement mounting bars are designed to be modular such that implements can readily be made compatible for mounting across multiple lift systems or on multiple vehicles. A vertical adaptive alignment plate affixed, attached, or connected to the implement mounting bars to allow for pitch adjustments to easily be made (e.g., by providing multiple attachment points or adjustable attachments to vary the angle of the x-plate or implement mounting bar.) The adaptive alignment plate can be referred to herein as the "X-Plate" or "x-plate" and can refer to a single plate, a pair of plates, an opposing pair of plates, or a multitude of plates. Since it is common for brush guards to have slight design variations (e.g., some pitch forward, some pitch rearward, and some are vertical or near-vertical) the X-Plate allows a user to adjust for an individual vehicle's brushguard, frame, or bumper pitch following installation, without removing the lift from the vehicle, and without altering, weakening, or increasing the cost and complexity of the fixed frame or vehicle attachment elements. The adaptive alignment plate, or x-plate, provides direct and simplified adjustment of the critical alignment of implements (e.g., modular implements including lifting forks) at the end of the kinematic chain nearest the load, while simultaneously allowing for simpler, more cost effective, more robust, and more reliable structures where the lift mounts to the vehicle. The adaptive alignment plate is itself also a simpler, more cost effective, more robust, and more reliable alignment and attachment mechanism compared to other methods (e.g., hydraulics, electric motors, or more complex mechanical linkages commonly employed to adjust alignment.)

The x-plate can have multiple or adjustable attachment points configured to adjust the ultimate pitch or alignment of the modular implement base or implements. Alternatively, the x-plate or adaptive alignment plate can have one or more simple or fixed alignment points (e.g., a pair of drilled holes) and one or more of the upper pivot arms and lower pivot arms can have multiple or adjustable mounting points configured to adjust the ultimate pitch or alignment of the modular implement base or implements.

Embodiments provide a mounting system that uses gravity to create a combination of downward and rearward pressure that secures a lift to a vehicle, optionally also using the downward and rearward pressure of the vehicle's winch cable as additional security while also serving as the lift motor.

Embodiments provide a brush guard for a vehicle (e.g., a truck, ATV, or UTV.) Within the confines of what would otherwise be a traditional brush guard can be stowed a lift system that utilizes a winch. The winch cable extends up and over the horizontal pulley bar, then down to the modular implement base or lower horizontal implement bar. Once deployed, various implements can be hung upon the one, two, or multiple (e.g., 3, 4, or more) horizontal implement bars with or without any type of fastener being used to secure them.

Embodiments provide a compact lift conversion system that affixes to the front brush guard of most existing UTVs (or ATVs or trucks) on the market. The system utilizes a combination of the UTV's existing winch, gravity, and rearward facing pressure to secure the unit to the UTV. The winch also serves to power the lift mechanism, by running up and over the horizontal pulley bar. In certain embodiments the horizontal pulley bar can be advantageously placed as high and as far forward as possible or as practical within a given design and considering other design constraints. Depending on where an existing winch is mounted on a UTV, placement (e.g., further rear placement) of the pulley bar can in some cases cause the winch to rub against the UTV causing frays to the cable, causing damage to the vehicle, or preventing utilization of the winch altogether. Because UTVs have various different shapes and sizes of brush guards, by having the pulley bar high and forward, the number that are compatible with the unit is maximized. The winch cable can extend up and over the horizontal pulley bar, then down to the lower horizontal implement bar. The angle of the winch cable as it exits the existing winch and runs up to the horizontal pulley bar can be minimized (e.g., between 0 and 20 degrees, alternatively 1, 2, 3, 4, 5, 6, 7, 8, 9, 10, 11, 12, 13, 14, 15, 16, 17, 18, 19, or 20 degrees, including ranges, increments, and combinations thereof.) This can create downward and rearward pressure even when not under external load, causing the unit to remain securely affixed to the UTV. Once deployed, various implements can be hung upon the two horizontal implement bars without any type of fastener being used to secure them, or alternatively, with a fastener, catch, latch, or lock to hold the implement in place or limit motion of the implement.

Embodiments provide a compact lift conversion system that affixes to the front brush guard of most existing UTVs on the market. It is intended for use with UTVs without a winch, or for users who do not wish to employ their UTV's winch. It utilizes a combination of the gravity and rearward facing pressure to secure the unit to the UTV. A linear actuator, powered by any standard hand-tool battery (e.g., batteries from Dewalt, Ryobi, Milwaukee) serves to power the actuator, thus powering the lift function. Alternatively, a conventional linear actuator (e.g., Warn ProVantage Power Lift, from Warn Industries, Clackamas, Oregon) can power the lift. Once deployed, various implements can be hung upon the horizontal implement bars without any type of fastener being used to secure them.

Embodiments provide a lift conversion system that affixes to the front brush guard of most existing UTVs (or ATVs or trucks) on the market, utilizing a combination of the vehicle's existing winch, gravity, and rearward facing pressure to secure the unit to the vehicle. The vehicle's winch also serves to power the lift mechanism, by running up and over the horizontal pulley bar. The horizontal pulley bar is placed as high as possible so as to raise the lift bracket up the vertical guiderails. The winch cable, by design, creates a retaining force (e.g., a downward or rearward pressure) even when not under load, causing the unit to remain securely affixed to the vehicle. Once deployed, various implements can be hung upon the horizontal implement bars without any type of fastener being used to secure them.

Embodiments provide a lift conversion system that affixes to the front brush guard of most existing UTVs on the market. It is intended for use with UTVs without a winch, or for users who do not wish to employ their UTV's winch. It utilizes a combination of the gravity and rearward facing pressure to secure the unit to the UTV. A linear actuator, powered by any standard hand-tool battery (e.g., Dewalt, Ryobi, Milwaukee) serves to power the actuator, thus powering the lift function. Alternatively, a conventional winch or linear actuator (e.g., Warn ProVantage Power Lift, from Warn Industries, Clackamas, Oregon) can power the lift. Once deployed, various implements can be hung upon the horizontal implement bars without any type of fastener being used to secure them.

Figure 1C:
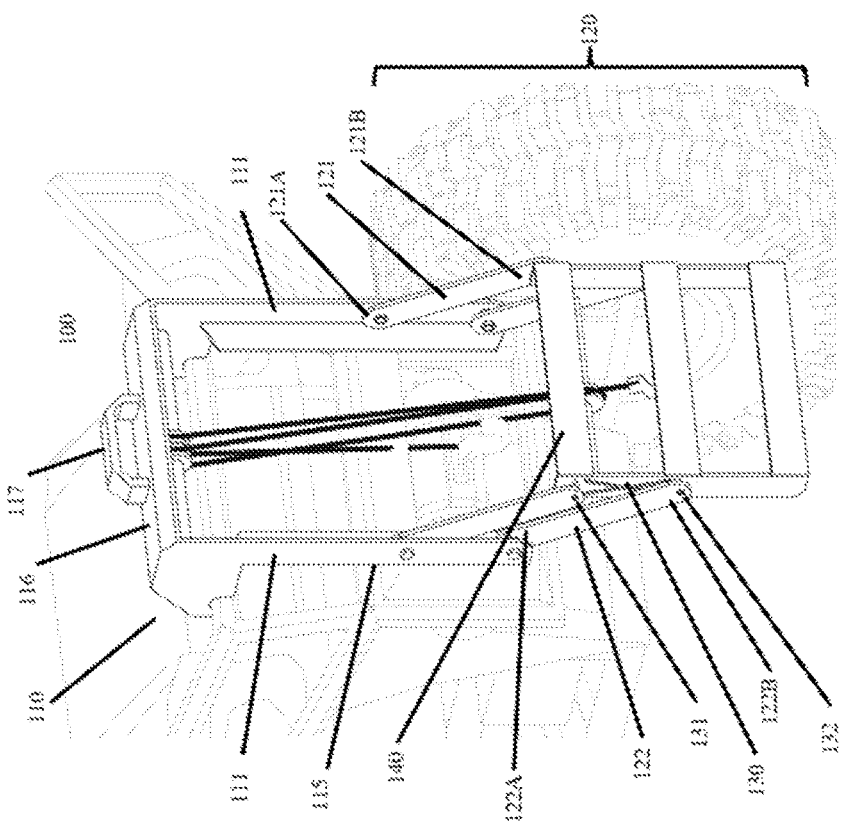
FIG. 1C shows a modular lift conversion system for mounting on an existing vehicle rack or guard in accordance with an embodiment of the subject invention in perspective view. The lift is in a deployed position mounted on a vehicle.

Turning now to the figures, FIGS. 1A through 1D show a modular lift conversion system 100 for mounting on an existing vehicle rack or guard in accordance with an embodiment of the subject invention in perspective view. In FIG. 1A the lift is in a stowed configuration and ready for mounting on a vehicle. In FIG. 1B the lift is in a stowed configuration mounted on a vehicle. In FIG. 1C the lift is in a deployed position mounted on a vehicle. In FIG. 1D the lift is in a deployed position mounted on a vehicle with a modular forklift implement 151 installed.

As depicted in FIGS. 1A through 1D, the lift system 100 comprises a fixed frame 110 having a frame width W, a frame depth D, and a frame height H and a movable frame 120. Vertical frame members 111 connect upper pivot point 112, lower pivot point 113, and hook 114; while providing in this embodiment support surface 115. Upper pivot arms 121 connect at a near end 121A to upper pivot point 112 and at a far end 121B to adjustable upper pivot point 131. Lower pivot arms 122 connect at a near end 122A to lower pivot point 113 of x-plate 130 and at a far end 122B to adjustable lower pivot point 132 of x-plate 130. Vehicle mounted winch 170A is shown with cable 171 routing in contact with cable interface points, comprising one or more rollers 160A and an attachment point 160B, respectively, such that tension applied to the cable can create a downward or rearward pressure on the fixed frame 110 and a motion imparting force on the movable frame 210. Attachment points and other elements can be hidden from view in some figures. Modular implement base 140 spans between x-plates 130 to support and align modular lifting fork implement 151. Upper frame member 116 can connect or support opposing vertical frame members 111 as well as optional handle 117.

Embodiments provide hook 114 and vertical frame member 111 as a unitary construct, optionally formed from a single piece of metal or other suitable material (e.g., a high strength polymer), offering benefits of simplicity in design and manufacture and reduced cost and complexity. Alternatively, hook 114 and vertical frame member 111 can be independently manufactured (e.g., of the same or different material) and joined (e.g., permanently, semi-permanently, or removably) either when the lift assembly is constructed, by an aftermarket installer or technician, by the end user, or at any other time (e.g., before, during, or after installation.) The hook 114 can comprise any suitable shape including but not limited to a half-circle, rounded slot, square, rectangle, notch, inside corner, "L", or "T" shape. Hook 114 can be formed of a single piece, multiple pieces, or as part of another frame member (e.g., as an integrated feature of a vertical frame member 111 or as part of an upper frame member 116.) Hook 114 can be of a fixed geometry or of an adjustable or dynamic geometry (e.g., either a rigid shaped cutout or having a movable or deformable element which can latch, hold, or lock the lift system in place on the vehicle or in storage.)

Figure 1F:
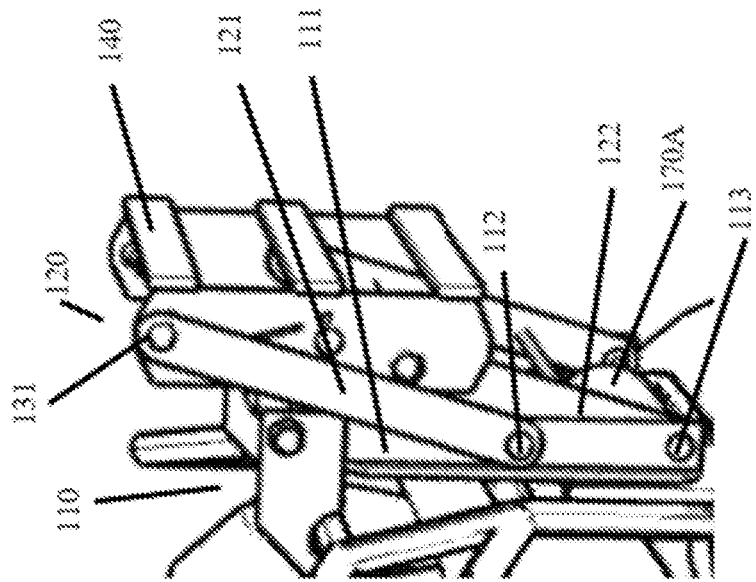
FIG. 1F shows a modular lift conversion system for mounting on an existing vehicle rack or guard in accordance with an embodiment of the subject invention in perspective view. The lift is depicted in a raised position to more clearly show elements of the invention.
Figure 1E:
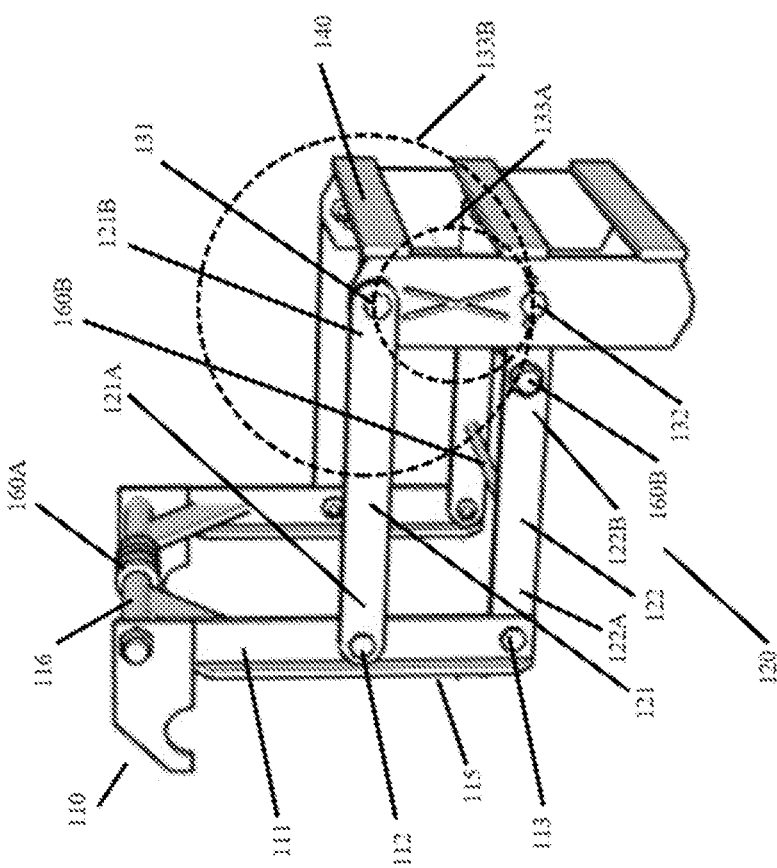
FIG. 1E shows a modular lift conversion system for mounting on an existing vehicle rack or guard in accordance with an embodiment of the subject invention in perspective view. The lift is depicted in a deployed position to more clearly show elements of the invention.
Figure 1H:
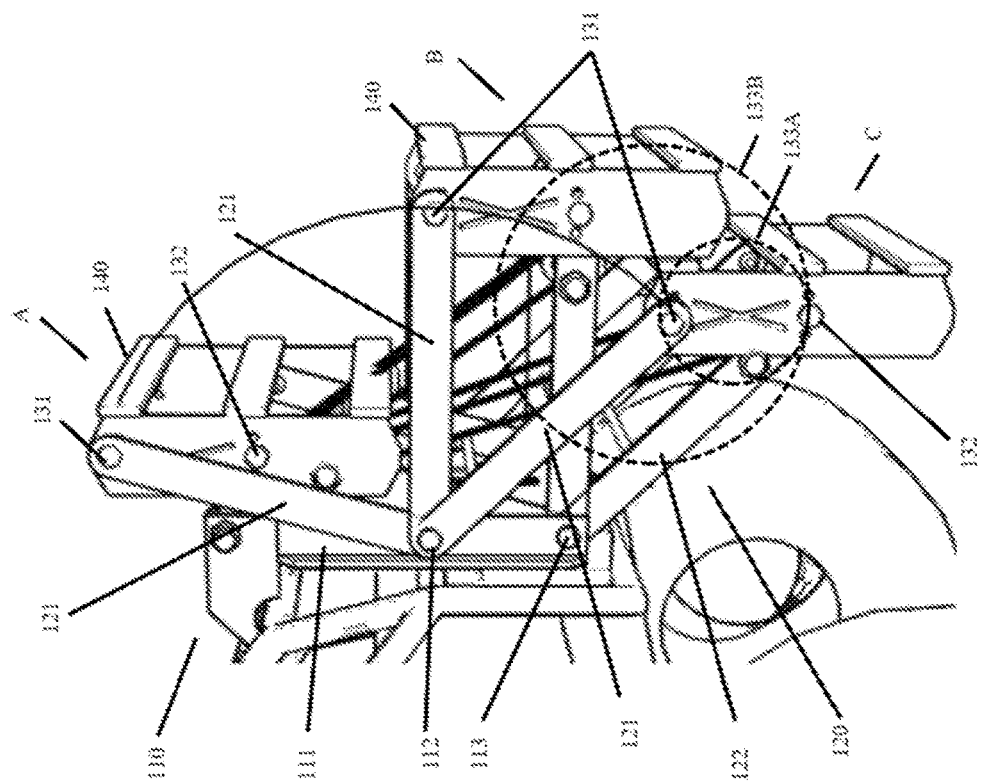
FIG. 1H shows a three-position overlay of a modular lift conversion system for mounting on an existing vehicle rack or guard in accordance with an embodiment of the subject invention in perspective view. The lift is depicted in an overlay of three different positions to more clearly show elements and working motion of the invention.
Figure 1G:
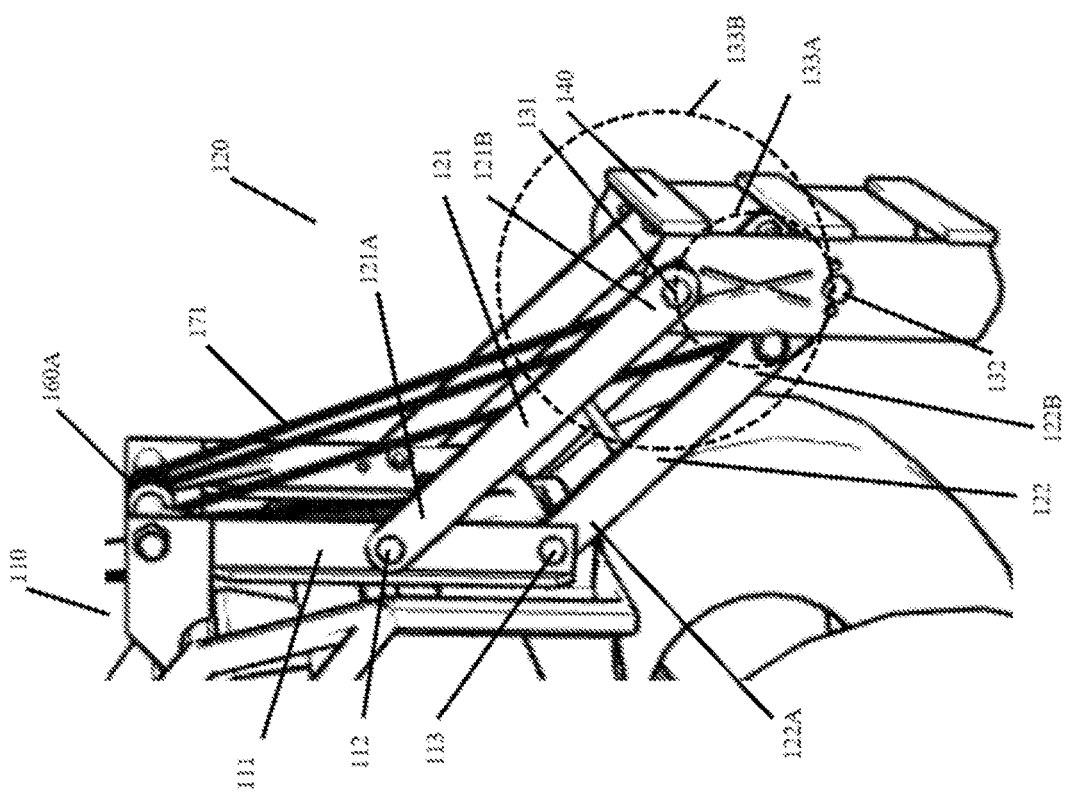
FIG. 1G shows a modular lift conversion system for mounting on an existing vehicle rack or guard in accordance with an embodiment of the subject invention in perspective view. The lift is depicted in a lowered position to more clearly show elements of the invention.

FIGS. 1E through 1J show a modular lift conversion system 100 for mounting on an existing vehicle rack or guard in accordance with an embodiment of the subject invention in perspective view. In FIG. 1E the lift is depicted in a deployed position to more clearly show elements of the invention. In FIG. 1F the lift is depicted in a raised position to more clearly show elements of the invention. In FIG. 1G the lift is depicted in a lowered position to more clearly show elements of the invention. In FIG. 1H the lift is depicted in an overlay of three different positions (A, B, C) to more clearly show elements and working motion of the invention. In FIG. 1I the lift is depicted in a lowered position with modular implements. In FIG. 1J the lift is depicted in a lowered position with a modular passenger carrying seat implement 153.

As depicted in FIGS. 1E through 1J, the lift system 100 comprises a fixed frame 110 and a movable frame 120. Vertical frame members 111 connect upper pivot point 112, lower pivot point 113, and hook 114; while providing in this embodiment support surface 115. Upper pivot arms 121 connect at a near end 121A to upper pivot point 112 and at a far end 121B to adjustable upper pivot point 131. Lower pivot arms 122 connect at a near end 122A to lower pivot point 113 of x-plate 130 and at a far end 122B to adjustable lower pivot point 132 of x-plate 130. Vehicle mounted winch 170A is shown with cable 171 routing in contact with cable interface points, comprising one or more rollers 160A and one or more attachment points 160B, respectively, such that tension applied to the cable can create a downward or rearward pressure on the fixed frame 110 and a motion imparting force on the movable frame 120. Modular implement base 140 spans between x-plates 130 to support and align modular lifting fork implement 151, modular trailer ball implement 152, and modular passenger carrying seat implement 153. Additional and various modular implements not shown or described are contemplated within embodiments of the subject invention. Modular implements shown and described (e.g., 151, 152, 153) are exemplary and in no way limiting except where expressly specified or required.

FIGS. 1A through 1J, in part, illustrate embodiments of an x-plate (or a pair of x-plates) configured to maintain vertical alignment of a modular implement base throughout a range of motion via a four-bar mechanism. The x-plate in this embodiment is depicted with an adjustable upper pivot point 131, and an adjustable lower pivot point 132, each having three mounting holes available to alter the angle of the x-plate while securely fastening and allowing rotary motion of the linkages in the four-bar mechanism.

In FIG. 1E a smaller dashed circle 133A centered at the crossing of the "X" illustrates that these adjustable pivot points can be aligned in a circle such that the distance between pivot points is consistent around the circle (e.g., to allow consistent rotational adjustment of the angle of the x-plate), while a larger dashed circle 133B centered at the adjustable upper pivot point illustrates that the distance between pivot points can be consistent with respect to the opposite pivot point (e.g., to allow adjustment of one of either upper or lower pivot points with or without adjustment of the other.) Alternatively, adjustment points can be aligned in a straight line or along another curve, circle, grid, pattern, line, or arc. Advantages of adjustment point alignment can include offering a variation in angle as the lift moves through a range of motion (e.g., tipping back as the lift raises to secure a load, or angling an implement up slightly near the ground to avoid digging in or damaging a floor or ground surface.)

Figure 13:
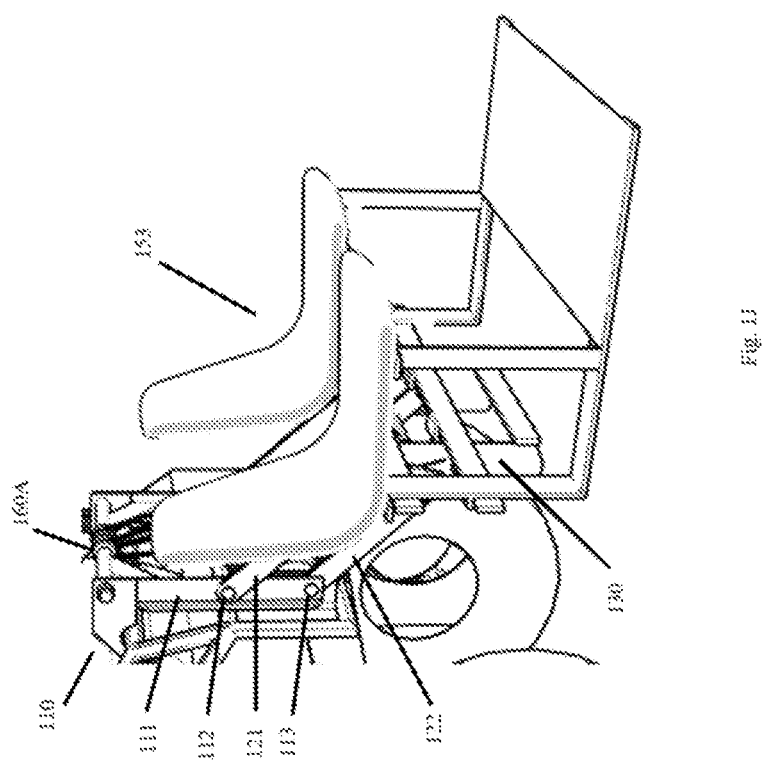
FIG. 13 shows two x-plate designs according to embodiments of the subject invention.

In embodiments where the opposing bolt holes are laid in a circular pattern, the x-plate can have 2 opposing x-plate mounting points, alternatively 1, 3, 4, 5, 6, 7, 8, 9, 10, or more opposing x-plate mounting points (e.g., as shown in FIG. 13.)

FIG. 1E also shows corner braces supporting an upper pivot bar bolted at each end between two vertical frame members 110, a lateral support extending between an opposing pair of lower pivot arms 122, and a stacked arrangement where the upper pivot arms 121 are located outside both the vertical frame members 110 and the x-plates 130 while the lower pivot arms 122 are located inside both the vertical frame members 110 and the x-plates 130. The vertical frame members 111 are each, respectively, shown having a flat main body supporting the upper and lower pivot points (112, 113) and an orthogonal cross member or beam support adding lateral stiffness and providing a wider back vertical plane for supporting the lift against the front of the vehicle rack or brush guard when installed. In some embodiments, an orthogonal cross member or beam support can be formed of angle iron (e.g., an "L" or "T" cross section), having advantages of compactness and cost efficiency for a required or determined amount of lateral strength. Alternatively, an orthogonal cross member or beam support can be formed of box section (e.g., round, oval, square, or rectangular tubing) having advantages of increased torsional strength and stiffness. Alternatively, an orthogonal cross member or beam support can be formed of welded stock (e.g., flat, angle, or hollow cross section) having advantages of design freedom or customization.

FIG. 1F shows an embodiment where the pivot arms 121, 122, frame members 111, x-plates 130, and modular implement base 140 are arranged in the design to allow at least a partial overlap for compact storage. Embodiments provide a stowed configuration in which the movable frame 120 is adjacent the fixed frame 110 as shown in FIG. 1F, having advantages of simplicity in design and construction and potential for cost reduction. Alternatively, embodiments provide a stowed configuration in which the movable frame 120 is partially overlapped with the fixed frame 110, having advantages of increased compactness for a slight reduction in potential for cost reduction. Alternatively, embodiments provide a stowed configuration in which the movable frame 120 is completely overlapped with the fixed frame 110, having advantages of further increased compactness. Alternatively, embodiments provide a stowed configuration in which the movable frame 120 is within, partially within, or completely within the confines of the fixed frame 110, having advantages of protection, compactness, and improved aesthetic design as shown in FIG. 1A.

By within the confines is meant generally or largely enclosed within or protected by elements of the fixed frame 110, and can include, e.g., a member of the movable frame which overlaps or partially overlaps and is positioned adjacent to a member of the fixed frame, including on the outer edge of the fixed frame. The confines of the fixed frame can include defined and finite areas adjacent an outer edge or surface of a member of the fixed frame within the material thickness of an element of the movable frame 120, or within the material thickness of an element of the fixed frame 110, alternatively about 1.0, 1.5, 2.0, 2.5, or 3 times the material thickness, including ranges, increments, and combinations thereof (e.g., the confines can include an area between about 1.5 and 2.25 times the material thickness on the outside edge and adjacent to one or more elements of the fixed frame 110.) By way of a non-limiting example, a fixed frame 110 with vertical frame members 111 having a material thickness of 10 mm (about ⅜") can define within the confines to include an area between 15 mm and 25 mm (about ⅝" to about 1") beyond one or more outer surfaces of the vertical frame members 111 on each side in any direction.

By partially within or at least partially within is meant the majority of an element is enclosed within or protected by the fixed frame or elements thereof. Partially within is broader than and includes within the confines.

By completely within is meant that the movable frame, one or more components of the movable frame, or another specified member (e.g., a modular attachment 151, 152, 153 or a portion thereof) is completely enclosed or protected by the fixed frame or by one or more elements thereof. Completely within is not meant to exclude minor or inconsequential excursions of elements such as a single layer of material, a fastener, a tab, a latch, a stop, or a connector unless it is explicitly specified that such elements are also completely within the confines of the fixed frame. Completely within is narrower than and included in the scope of within the confines.

The terms within, partially within, or at least partially within the confines of the fixed frame 110 are further meant to include configurations where the movable frame 120, components thereof, or other elements are enclosed within or protected by the fixed frame or elements thereof in two dimensions, but extend within a finite area in a third dimension. By way of a non-limiting example, the movable frame 120 or members thereof can be within, partially within, or at least partially within the confines of the fixed frame 110 by being inside the width W and depth D of the fixed frame 110 while extending above only the height H of the fixed frame 110 when in a stowed configuration, such that the movable frame 120 or elements thereof are enclosed within or protected by a finite vertical extension of the confines of the fixed frame 110 (e.g., a vertical extension of about 0.25, 0.5, 1.0, 1.5, or 2 times the height H, including ranges, increments, and combinations thereof (e.g., the confines can include a finite area extending in one direction between about 0.5 and 1.25 times the height of the fixed frame 110. This could include, for example, upper pivot arms 121 or lower pivot arms 122 which are longer than or which extend beyond the top of vertical frame members 111 when in a stowed configuration.)

Embodiments provide one or more passive (e.g., spring clip, spring loaded retainer, detent, or other automatic lock) or active (e.g., handle, pin, clamp, or other manually actuated lock) retainers 134 to retain the lift in a stowed, deployed, intermediate or other position when not in use, when disconnected from the winch, when on the vehicle, when off the vehicle, or during storage, shipping, or manufacturing.

Embodiments provide one or more passive (e.g., spring clip, spring loaded retainer, detent, or other automatic lock) or active (e.g., handle, pin, clamp, or other manually actuated lock) safety bar locks 1550 to retain safety bar 1540 in a closed position (alternatively, in an open position or in an intermediate position between an open position and a closed position) when not in use, when disconnected from the winch, when on the vehicle, when off the vehicle, or during storage, shipping, or manufacturing.

Figure 14:
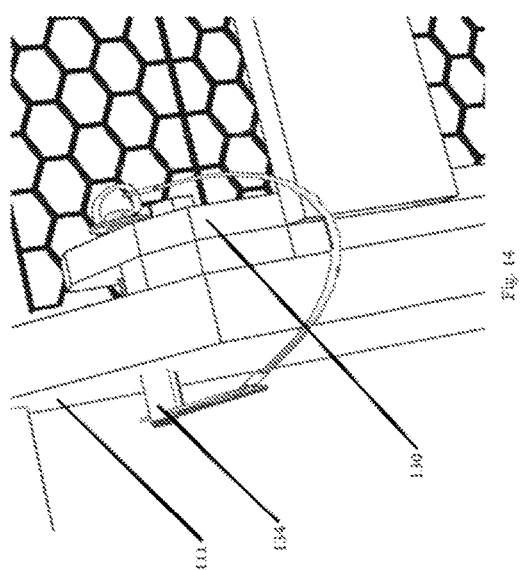
FIG. 14 shows a linchpin for securing the lift in a stowed configuration according to an embodiment of the subject invention.

Embodiments provide a simple linchpin, cotter pin, or clevis pin as a retainer 134 to secure the unit (e.g., when in a stowed configuration as shown in FIG. 14.) Alternatively or additionally, embodiments provide an automatic spring, clip, latch, or other element as a retainer 134 to secure or stabilize the unit in one or more configurations (e.g., a leaf spring mounted on the fixed frame 110 can press against one or more elements of the movable frame 120 to inhibit or prohibit motion when the lift is in a stowed configuration or a deployed configuration, respectively.) Alternatively or additionally, embodiments provide a selective spring, clip, latch, or other element as a retainer 134 to secure or stabilize the unit in one or more configurations (e.g., a manually activated latch mounted on the fixed frame 110 can be held disengaged by a spring, by a cam, or by the force of gravity until a user takes an action to engage the latch with one or more elements of the movable frame 120 to inhibit or prohibit motion when the lift is in a stowed configuration or a deployed configuration, respectively.)

FIG. 1H represents a four-bar mechanism embodiment swinging through a partial arc of motion with three different positions (A, B, C) overlayed in the same view. The modular implement base 140 maintains a constant vertical alignment as the lift is raised and lowered.

A modular implement base 140 can comprise one or more implement bars, implement mounts, or implement receptacles, respectively. For example, the modular implement base 140 shown in FIGS. 1A through 1J comprises three horizontal implement bars of uniform geometry and spacing, each implement bar connecting to one or more x-plates of the opposing pair of x-plates 130. A modular implement base can comprise fewer elements (e.g., one or two implement bars) or additional elements (e.g., one or more motion elements, supporting or connecting elements, braces, or structures.) An implement mount can comprise forms or shapes beyond that of a bar (e.g., a cylinder, pipe, post, peg, hook, boss, threaded rod, or protrusion.) An implement receptacle can include a pocket, slot, hole, recess, or depression. A modular implement base can consist essentially of only one or more implement bars, mounts, or receptacles. Alternatively, a modular implement base 140 can comprise multiple elements, including different combinations (e.g., one or more implement bars, with or without additional supporting or connecting structures, and with or without one or more implement mounts or receptacles.)

A modular implement base 140 can be configured such that implements 151, 152, 153 can be attached or detached with or without additional tools or fasteners and can be advantageously held in place under gravity or secured (e.g., to inhibit theft, or to inhibit accidental disengagement when traveling over rough terrain) either passively or actively at one or more configurations of the lift system.

Specific combinations of elements in a modular implement base 140 have been shown to offer unique advantages. One exemplary combination includes a modular implement base 140 comprising one or more horizontal implement bars wherein implements can be quickly loaded or unloaded without tools in a deployed, extended, or lowered configuration, are held in place under by their own weight under gravity, and then further secured (e.g., by positioning of an upper frame member that blocks removal of the implements or obscures visibility of or access to implements) when in a stowed, retracted, or raised configuration. This combination offers advantages of simplicity in design, manufacture, ease of usage, low cost, security of implements, safety, and speed of implement changes. These advantages can be maximized in some cases by the absence of additional elements. Alternatively, the addition of additional elements (e.g., an implement mount or receptacle) to an implement bar or implement base can provide additional advantages including efficient, repeatable, or reliable positioning of one or more implements, and enhanced security, safety, or structural support.

Embodiments provide specific implements, combinations of implements, and kits including implements providing unique functionality in the subject invention. For example, as shown in FIG. 1I, a trailer hitch ball 152 can be mounted and used with or without additional implements (e.g., a pair of loading forks, a hay bale spear, or a riding seat.) Alternatively, a kit or set of trailer hitch implements (e.g., including three different size hitch balls, or featuring one or more selectable hitch drop heights, or being configured to mount at multiple heights on the implement base) can offer users of the subject invention benefits including rapid change between different trailers or flexibility to raise, lower, or move trailers at various heights, angles, or orientations. Embodiments further provide implements that can be reversed or redirected on the modular implement base (e.g., an implement with a 2" trailer ball on one side can lift up, rotate 180-degrees in a horizontal plane, and drop back down to provide a 1⅞" ball on the opposite side; or the modular implement base can provide multiple mounting locations configured to provide access to implements at differing heights of angles (e.g., implements accessible straight out the front of the vehicle in a first configuration and at an angle or to the side of the vehicle in a second configuration.)

FIGS. 2A through 2E show a self-powered or independently powered modular lift conversion system 100 for mounting on an existing vehicle rack or guard in accordance with an embodiment of the subject invention in perspective view. In FIG. 2A the lift is in a stowed configuration and ready for mounting on a vehicle. In FIG. 2B the lift is in a stowed configuration mounted on a vehicle. In FIG. 2C the lift is in a deployed position mounted on a vehicle. In FIG. 2D the lift is in a deployed position mounted on a vehicle with a modular forklift implement installed. In FIG. 2E the lift is depicted from the rear in a deployed position mounted on a rack with no vehicle shown to more clearly show elements of the invention. In each of FIGS. 2A through 2E the vehicle winch 170A is available for other uses while the lift is installed or in use. Alternatively, the lift is operable in the absence of a vehicle winch, or in the event of failure of a vehicle winch. Alternatively, in this or many other embodiments contemplated under the subject invention, the lift can be provided with or configured to accept a lift winch in addition to or in place of any vehicle winch. The lift winch can be operable in addition to or in parallel with linear actuators 170B and can be used to power the lift or to accomplish other tasks. Embodiments advantageously provide mounting options for multiple actuators (e.g., one or more winches, one or more linear actuators, other lifting devices, or combinations of lifting devices.) Upper frame member 116 can connect or support opposing vertical frame members 111 as well as optional handle 117.

As depicted in FIGS. 2A through 2E, the lift system 100 comprises a fixed frame 110 and a movable frame 120. Vertical frame members 111 connect upper pivot point 112, lower pivot point 113, and hook 114; while providing in this embodiment support surface 115. Upper pivot arms 121 connect at a near end 121A to upper pivot point 112 and at a far end 121B to adjustable upper pivot point 131. Lower pivot arms 122 connect at a near end 122A to lower pivot point 113 of x-plate 130 and at a far end 122B to adjustable lower pivot point 132 of x-plate 130. One or more integrated linear actuators 170B can operate with or without a cable (not shown in FIGS. 2A through 2E) routing in contact with cable interface points, comprising one or more rollers 160A and one or more attachment points 160B, respectively, such that tension applied to the linear actuators 170B can create a downward or rearward pressure on the fixed frame 110 and a motion imparting force on the movable frame 120. Cable interface points 160A, 160B or associated supporting structures (e.g., axles, bolts, brackets, rods, or bosses) can be advantageously employed as linear actuator mounting points. Modular implement base 140 spans between x-plates 130 to support and align modular lifting fork implement 151, modular trailer ball implement 152 (not shown in FIGS. 2A through 2E), and modular passenger carrying seat implement 153 (not shown in FIGS. 2A through 2E).

Figure 3A:
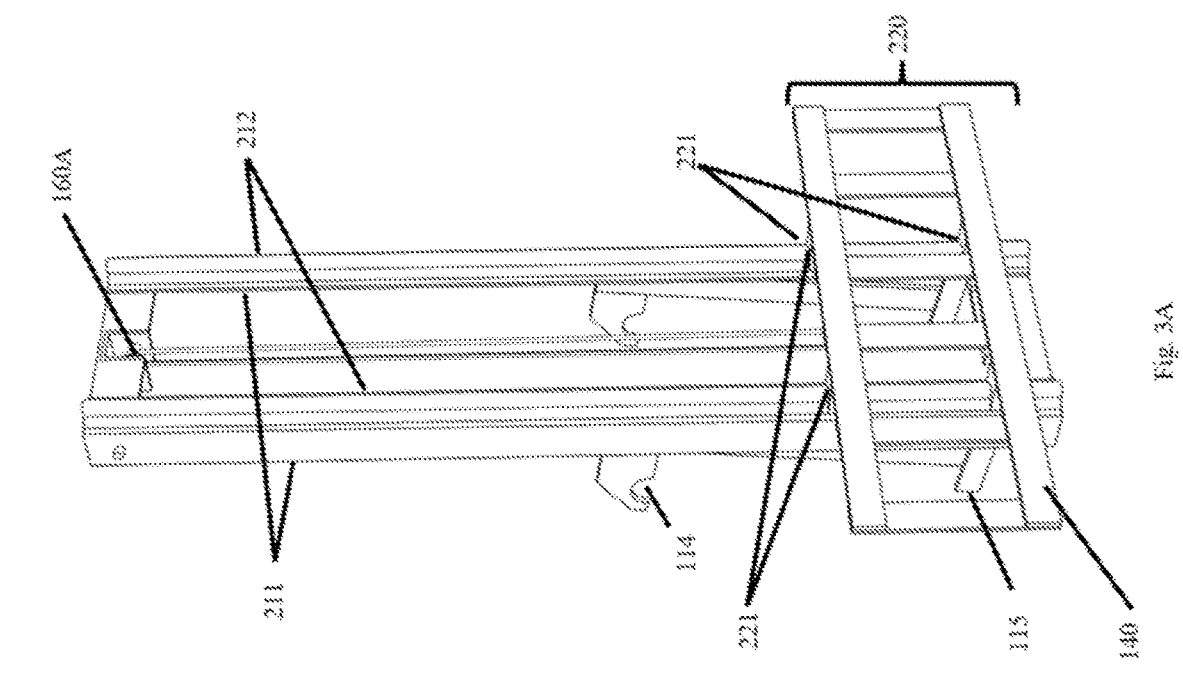
FIG. 3A shows a modular vertical slide lift conversion system for mounting on an existing vehicle rack or guard in accordance with an embodiment of the subject invention in perspective view. The lift is in a stowed configuration and ready for mounting on a vehicle.

FIGS. 3A through 3C show a modular vertical slide lift conversion system for mounting on an existing vehicle rack or guard in accordance with an embodiment of the subject invention in perspective view. In FIG. 3A the lift is in a stowed configuration and ready for mounting on a vehicle. In FIG. 3B the lift is in a stowed configuration mounted on a vehicle. In FIG. 3C the lift is in a stowed configuration mounted on a vehicle with a modular forklift implement installed. Embodiments provide a vertical lift configured to raise or lower directly under tension from a cable (e.g., pulled by a winch installed on the vehicle or on the lift.) The cable can extend from the winch over an interface point located at or near the top of the vertical guiderails and down to an interface point on, proximal, or connected to the modular implement base or x-plate.

As depicted in FIGS. 3A through 3C, the lift system 200 comprises a fixed frame 210 and a movable frame 220. Vertical frame members 211 support vertical guiderails 212 and connect in this embodiment to rails providing support surface 115. Vehicle mounted winch 170A is shown with cable 171 routing in contact with cable interface points, comprising one or more rollers 160A and one or more attachment points 160B, respectively, such that tension applied to the cable can create a downward or rearward pressure on the fixed frame 210 and a motion imparting force on the movable frame 220. Pulley 160A is shown near the top of the fixed frame 210. Modular implement base 140 spans rail followers 221 to support and align modular lifting fork implement 151, modular trailer ball implement 152 (not shown in FIGS. 3A through 3C), and modular passenger carrying seat implement 153 (not shown in FIGS. 3A through 3C).

FIGS. 4A through 4D show a modular independently powered vertical slide lift conversion system for mounting on an existing vehicle rack or guard in accordance with an embodiment of the subject invention in perspective view. In FIG. 4A the lift is in a stowed configuration and ready for mounting on a vehicle. In FIG. 4B the lift is in a deployed position with no vehicle shown to more clearly show elements of the invention. In FIG. 4C the lift is in a stowed configuration mounted on a vehicle. In FIG. 4C the lift is in a stowed configuration and ready for mounting on a vehicle. In FIG. 4D the lift is in a deployed position mounted on a vehicle with a modular forklift implement 151 installed. Embodiments provide one or more linear actuators 170B that drives up the lift either directly or through a cable, chain, cord, linkage, or other connector 271 to raise the lift. The connection can be direct or one to one, or the connection can provide a leverage or multiplier (e.g., a two to one ratio of lift motion per actuator motion as depicted in FIGS. 4A through 4D.)

As depicted in FIGS. 4A through 4D, the lift system 200 comprises a fixed frame 210 and a movable frame 220. Vertical frame members 211 support vertical guiderails 212 and connect in this embodiment to rails providing support surface 115. One or more integrated linear actuators 170B can operate with or without a cable 271 routing in contact with cable interface points, comprising one or more rollers 160A and one or more attachment points 160B, respectively, such that tension applied to the linear actuators 170B can create a downward or rearward pressure on the fixed frame 110 and a motion imparting force on the movable frame. pulley 160 is shown near the top of the fixed frame 110, while cable interface points 160A, 160B or associated supporting structures (e.g., axles, bolts, brackets, rods, or bosses) can be advantageously employed as linear actuator mounting points. In this embodiment linear actuator 170B carries rotation point 160, driving cable 271 away from fixed mounting point 160B to raise movable frame 220 at a two to one ratio. Modular implement base 140 spans rail followers 221 to support and align modular lifting fork implement 151, modular trailer ball implement 152 (not shown in FIGS. 3A through 3C), and modular passenger carrying seat implement 153 (not shown in FIGS. 3A through 3C).

Figure 5B:
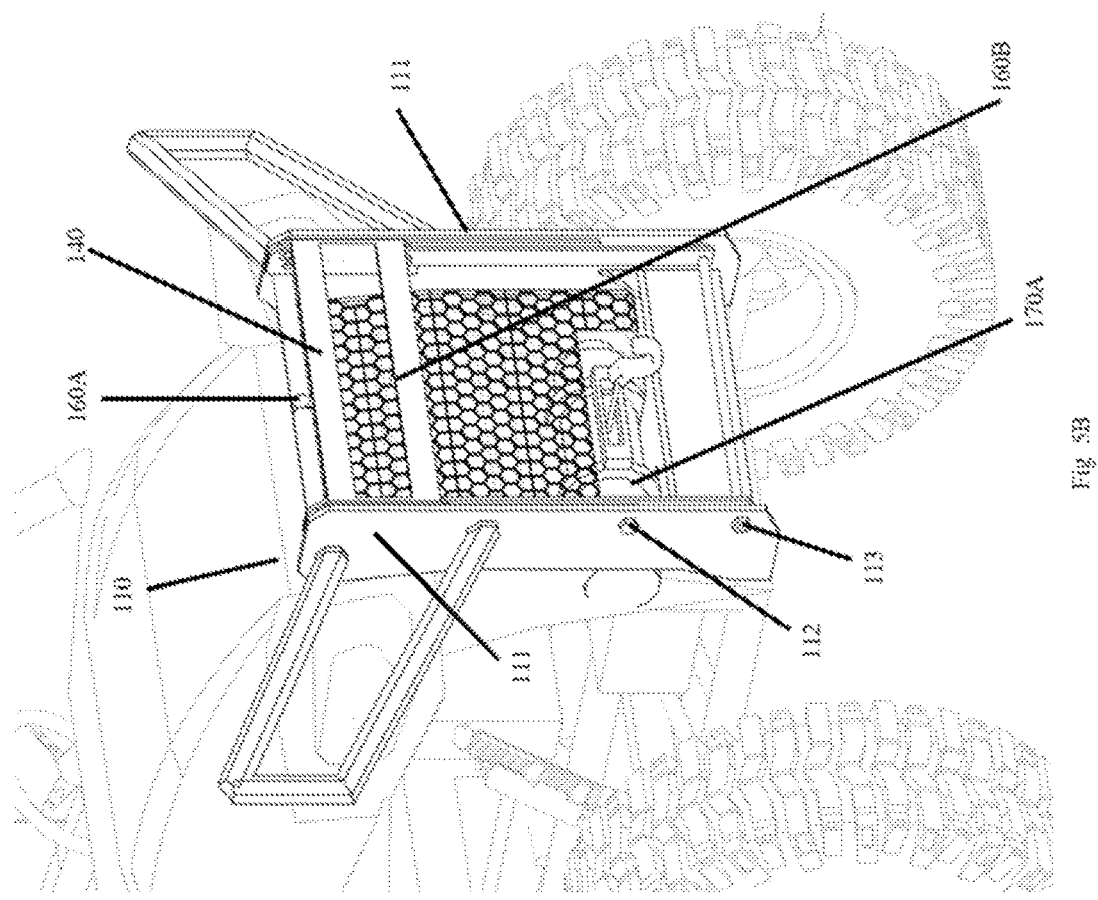
FIG. 5B shows an integrated modular brush guard and lift conversion system for mounting on an existing vehicle in accordance with an embodiment of the subject invention in perspective view. The lift is in a stowed configuration mounted on a vehicle.
Figure 5A:
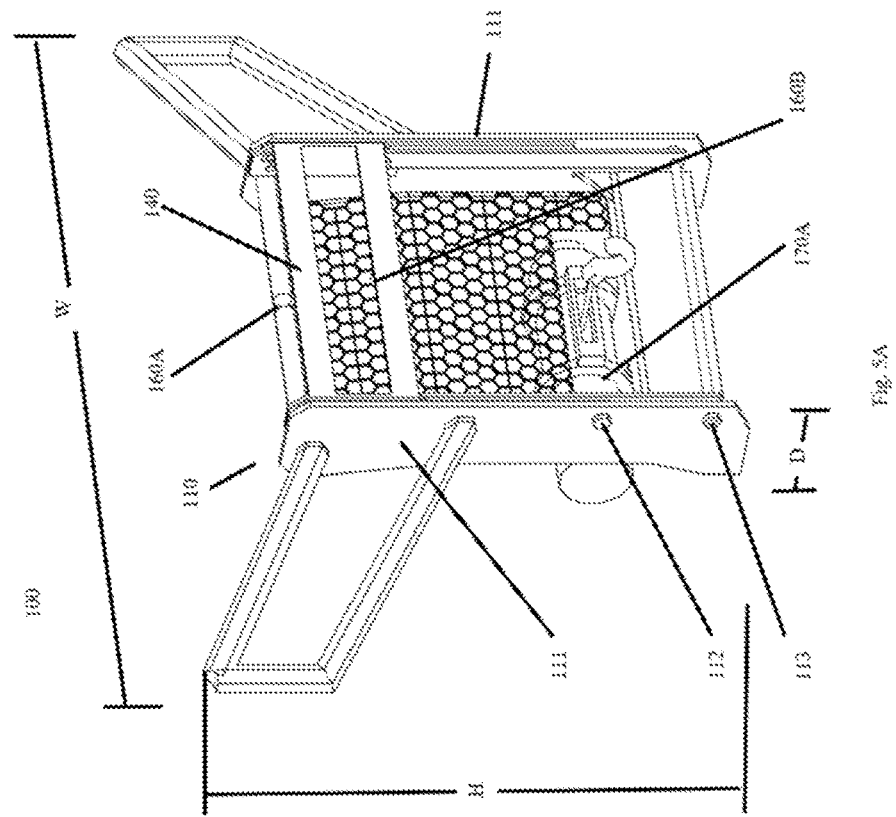
FIG. 5A shows an integrated modular brush guard and lift conversion system for mounting on an existing vehicle in accordance with an embodiment of the subject invention in perspective view. The lift is in a stowed configuration and ready for mounting on a vehicle.

FIGS. 5A through 5D show an individually powered integrated modular brush guard and lift conversion system for mounting on an existing vehicle in accordance with an embodiment of the subject invention in perspective view. In FIG. 5A the lift including a lift winch 170A is in a stowed configuration and ready for mounting on a vehicle. In FIG. 5B the lift is in a stowed configuration mounted on a vehicle. In FIG. 5C the lift is in a deployed position mounted on a vehicle. In FIG. 5D the lift is in a deployed position mounted on a vehicle with a modular forklift implement installed. Embodiments provide a lift that is self powered (e.g., by an onboard battery) or powered from the vehicle (e.g., by receiving electrical power from the vehicle.) In some embodiments the winch can be quickly and easily connected to or disconnected from the lift by routing up and over a cable interface point (e.g., a slide or roller on the fixed frame, such as that shown in FIGS. 5A through 5D) before connecting to the movable frame, x-plate, or modular implement base (e.g., by hooking into a cable interface point, such as that shown in FIGS. 5A through 5D) to drive the lift upward when tension is applied to the cable.

As depicted in FIGS. 5A through 5D, the lift system 100 comprises a fixed frame 110 having a frame width W, a frame depth D, and a frame height H and a movable frame 120. Vertical frame members 111 connect upper pivot point 112, lower pivot point 113, and hook 114; while providing support for vehicle frame mounting points (not shown.). Upper pivot arms 121 connect at a near end 121A to upper pivot point 112 and at a far end 121B to adjustable upper pivot point 131. Lower pivot arms 122 connect at a near end 122A to lower pivot point 113 of x-plate 130 and at a far end 122B to adjustable lower pivot point 132 of x-plate 130. Small circle 133A represents the angular adjustability of x-plates 130. Vehicle mounted winch 170A is shown with cable 171 routing in contact with cable interface points, comprising one or more rollers 160A and an attachment point 160B, respectively, such that tension applied to the cable can create a downward or rearward pressure on the fixed frame 110 and a motion imparting force on the movable frame 120. Attachment points and other elements can be hidden from view in some figures. Modular implement base 140 spans between x-plates 130 to support and align modular lifting fork implement 151.

Figure 6B:
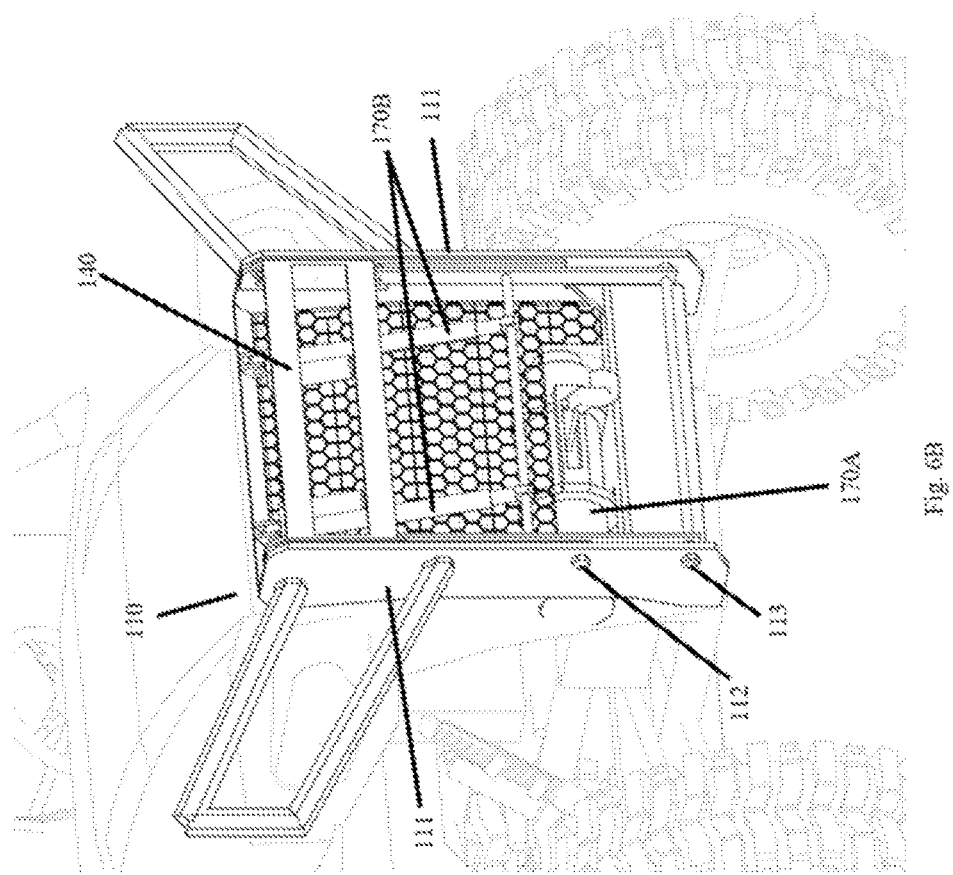
FIG. 6B shows an integrated modular brush guard and lift conversion system for mounting on an existing vehicle in accordance with an embodiment of the subject invention in perspective view. The lift is in a stowed configuration mounted on a vehicle.
Figure 6A:
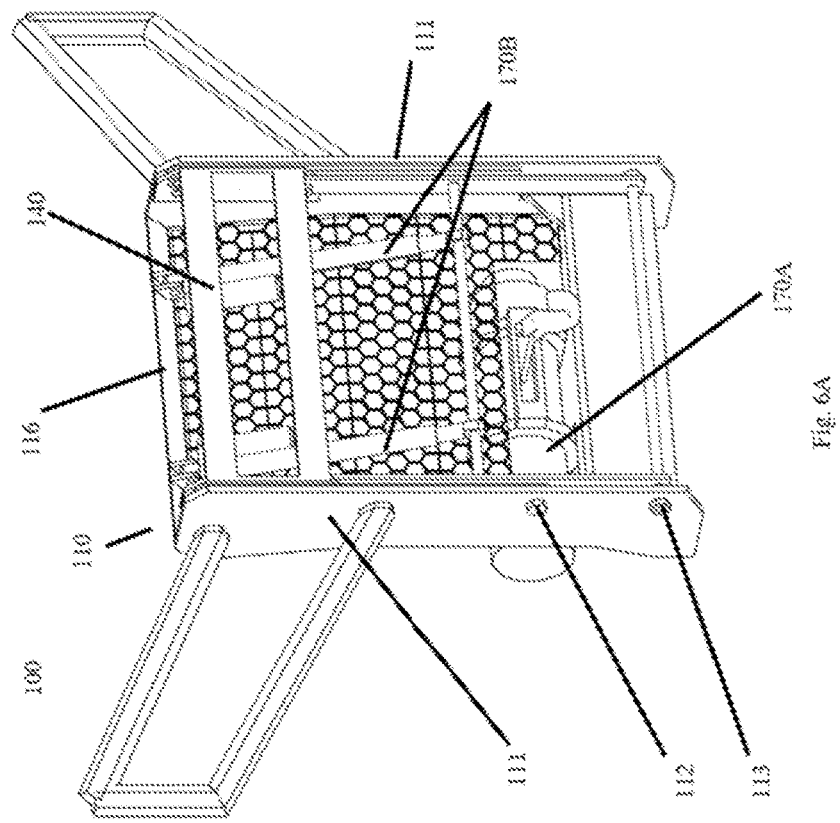
FIG. 6A shows an integrated modular brush guard and lift conversion system for mounting on an existing vehicle in accordance with an embodiment of the subject invention in perspective view. The lift is in a stowed configuration and ready for mounting on a vehicle.
Figure 6D:
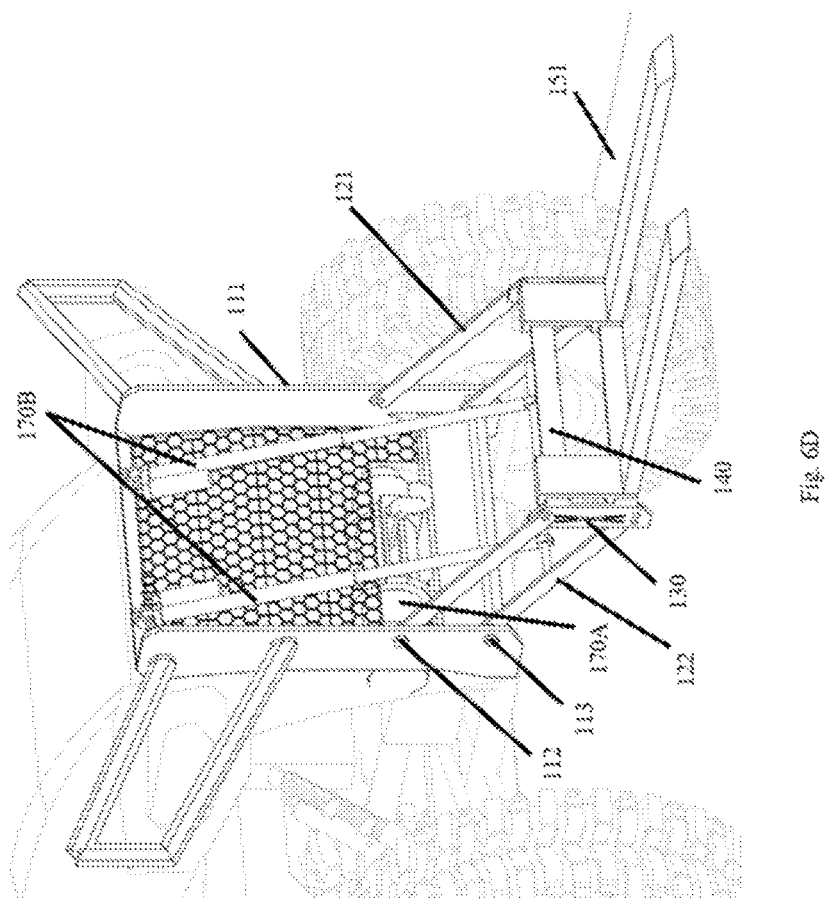
FIG. 6D shows an integrated modular brush guard and lift conversion system for mounting on an existing vehicle in accordance with an embodiment of the subject invention in perspective view. The lift is in a deployed position mounted on a vehicle with a modular forklift implement installed.
Figure 6C:
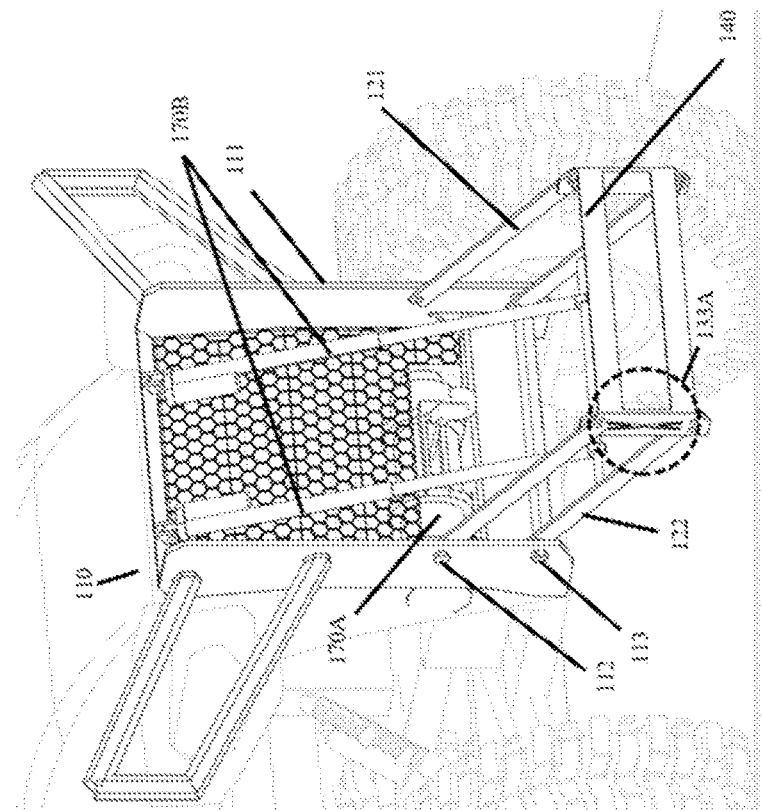
FIG. 6C shows an integrated modular brush guard and lift conversion system for mounting on an existing vehicle in accordance with an embodiment of the subject invention in perspective view. The lift is in a deployed position mounted on a vehicle.

FIGS. 6A through 6D show an independently powered integrated modular brush guard and lift conversion system for mounting on an existing vehicle in accordance with an embodiment of the subject invention in perspective view. In FIG. 6A the lift is in a stowed configuration and ready for mounting on a vehicle. In FIG. 6B the lift is in a stowed configuration mounted on a vehicle. In FIG. 6C the lift is in a deployed position mounted on a vehicle. In FIG. 6D the lift is in a deployed position mounted on a vehicle with a modular forklift implement installed. Embodiments provide a lift winch as depicted in FIG. 6A, or make use of a vehicle winch.

As depicted in FIGS. 6A through 6D, the lift system 100 comprises a fixed frame 110 and a movable frame 120. Vertical frame members 111 connect upper pivot point 112, lower pivot point 113, and hook 114; while providing support for vehicle frame mounting points (not shown.) Upper pivot arms 121 connect at a near end 121A to upper pivot point 112 and at a far end 121B to adjustable upper pivot point 131. Lower pivot arms 122 connect at a near end 122A to lower pivot point 113 of x-plate 130 and at a far end 122B to adjustable lower pivot point 132 of x-plate 130. One or more integrated linear actuators 170B can operate with or without a cable (not shown in FIGS. 6A through 6D) routing in contact with cable interface points, comprising one or more rollers 160A and one or more attachment points 160B, respectively, such that tension applied to the linear actuators 170B can create a downward or rearward pressure on the fixed frame 110 and a motion imparting force on the movable frame 120. Cable interface points 160A, 160B or associated supporting structures (e.g., axles, bolts, brackets, rods, or bosses) can be advantageously employed as linear actuator mounting points. Modular implement base 140 spans between x-plates 130 to support and align modular lifting fork implement 151, modular trailer ball implement 152 (not shown in FIGS. 6A through 6D), and modular passenger carrying seat implement 153 (not shown in FIGS. 6A through 6D).

Figure 7A:
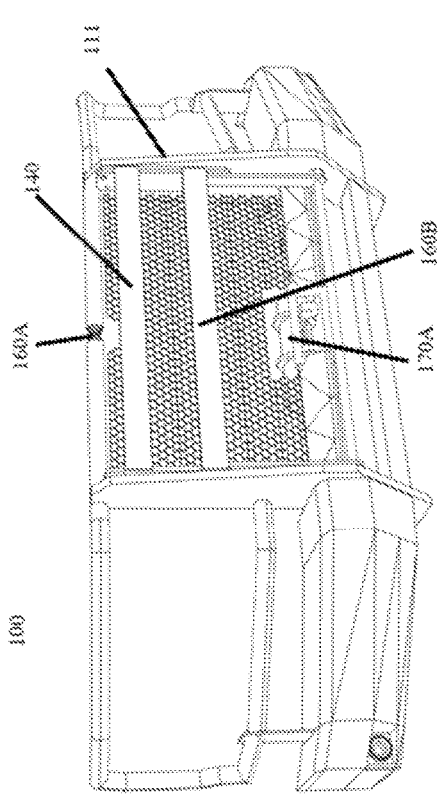
FIG. 7A shows an integrated modular brush guard and lift conversion system for mounting on an existing vehicle in accordance with an embodiment of the subject invention in perspective view. The lift is in a stowed configuration and ready for mounting on a vehicle.
Figure 7B:
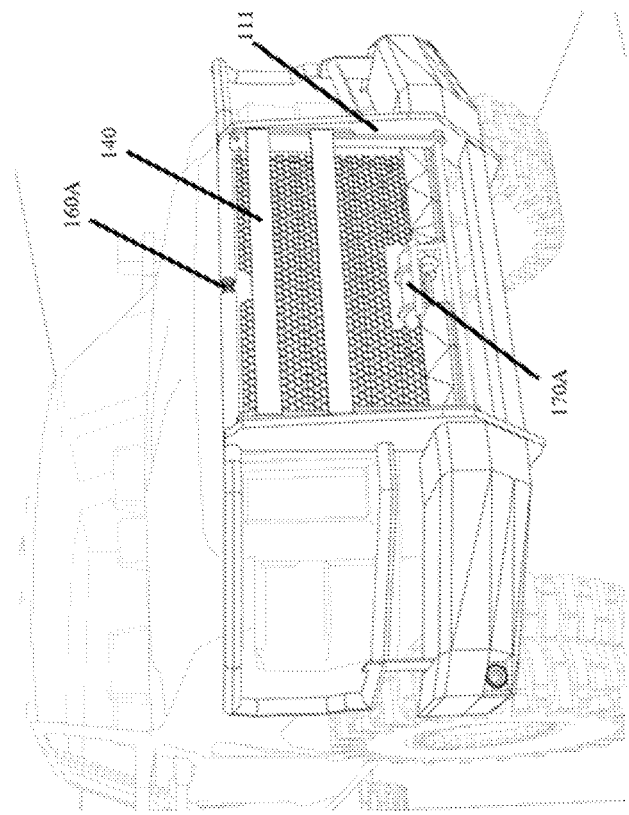
FIG. 7B shows an integrated modular brush guard and lift conversion system for mounting on an existing vehicle in accordance with an embodiment of the subject invention in perspective view. The lift is in a stowed configuration mounted on a vehicle.
Figure 7C:
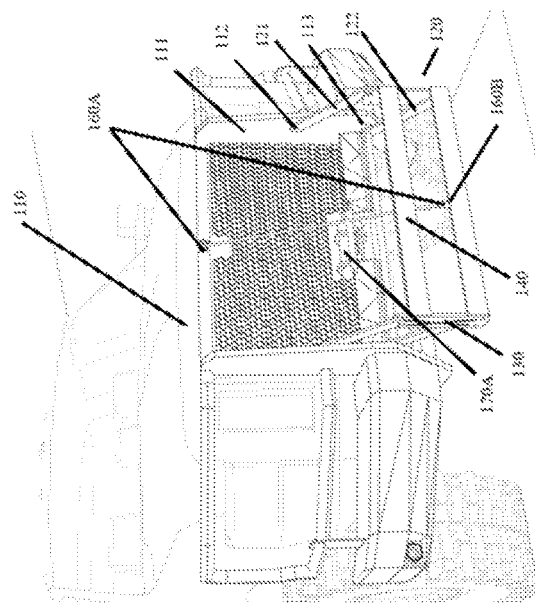
FIG. 7C shows an integrated modular brush guard and lift conversion system for mounting on an existing vehicle in accordance with an embodiment of the subject invention in perspective view. The lift is in a deployed position mounted on a vehicle.
Figure 7D:
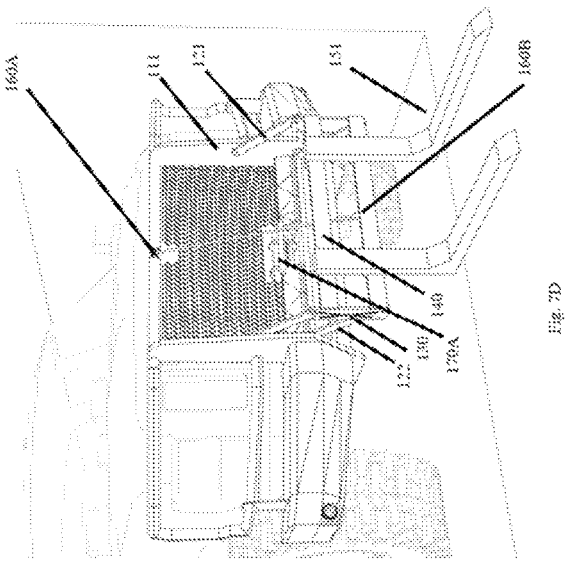
FIG. 7D shows an integrated modular brush guard and lift conversion system for mounting on an existing vehicle in accordance with an embodiment of the subject invention in perspective view. The lift is in a deployed position mounted on a vehicle with a modular forklift implement installed.

FIGS. 7A through 7D show an integrated modular brush guard and lift conversion system for mounting on an existing vehicle in accordance with an embodiment of the subject invention in perspective view. In FIG. 7A the lift is in a stowed configuration and ready for mounting on a vehicle. In FIG. 7B the lift is in a stowed configuration mounted on a vehicle. In FIG. 7C the lift is in a deployed position mounted on a vehicle. In FIG. 7D the lift is in a deployed position mounted on a vehicle with a modular forklift implement 151 installed. Embodiments provide a movable frame (e.g., comprising a modular implement base 140, x-plate 130, and movable arms or slides (e.g., 121, 122, 221) configured to fit within the confines of a fixed frame when in a stowed configuration. Alternatively, the movable frame can fit within the width of the fixed frame and fit within either the height or the depth of the fixed frame, but not both. The movable frame can fit within the width of the fixed frame and fit within the height of the fixed frame, but extend a distance beyond the depth of the fixed frame when in a stowed configuration (e.g., extending beyond by 0.1, 0.2, 0.3, 0.4, 0.5, 0.6, 0.7, 0.8, 0.9, 1, 2, or 3 times the depth of the fixed frame including ranges, increments, and combinations thereof.) Alternatively, the movable frame can fit within the width of the fixed frame and fit within the depth of the fixed frame, but extend a distance beyond the height of the fixed frame when in a stowed configuration (e.g., extending beyond by 0.1, 0.2, 0.3, 0.4, 0.5, 0.6, 0.7, 0.8, 0.9, or 1 times the height of the fixed frame including ranges, increments, and combinations thereof.)

As depicted in FIGS. 7A through 7D, the lift system 100 comprises a fixed frame 110 having a frame width (not shown), a frame depth (not shown), and a frame height (not shown) and a movable frame 120. Vertical frame members 111 connect upper pivot point 112, lower pivot point 113, and hook 114; while providing support for vehicle frame mounting points (not shown.). Upper pivot arms 121 connect at a near end 121A to upper pivot point 112 and at a far end 121B to adjustable upper pivot point 131. Lower pivot arms 122 connect at a near end 122A to lower pivot point 113 of x-plate 130 and at a far end 122B to adjustable lower pivot point 132 of x-plate 130. Vehicle mounted winch 170A is shown with cable 171 routing in contact with cable interface points, comprising one or more rollers 160A and an attachment point 160B, respectively, such that tension applied to the cable can create a downward or rearward pressure on the fixed frame and a motion imparting force on the movable frame. Attachment points and other elements can be hidden from view in some figures. Modular implement base 140 spans between x-plates 130 to support and align modular lifting fork implement 151.

Figure 8A:
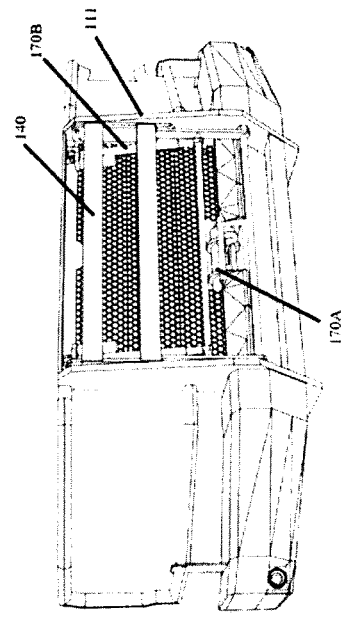
FIG. 8A shows an integrated modular brush guard and lift conversion system for mounting on an existing vehicle in accordance with an embodiment of the subject invention in perspective view. The lift is in a stowed configuration and ready for mounting on a vehicle.
Figure 8C:
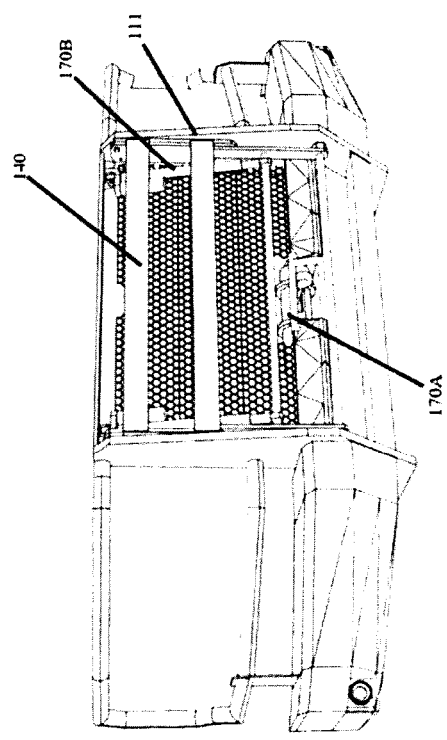
FIG. 8C shows an integrated modular brush guard and lift conversion system for mounting on an existing vehicle in accordance with an embodiment of the subject invention in perspective view. The lift is in a deployed position mounted on a vehicle.
Figure 8B:
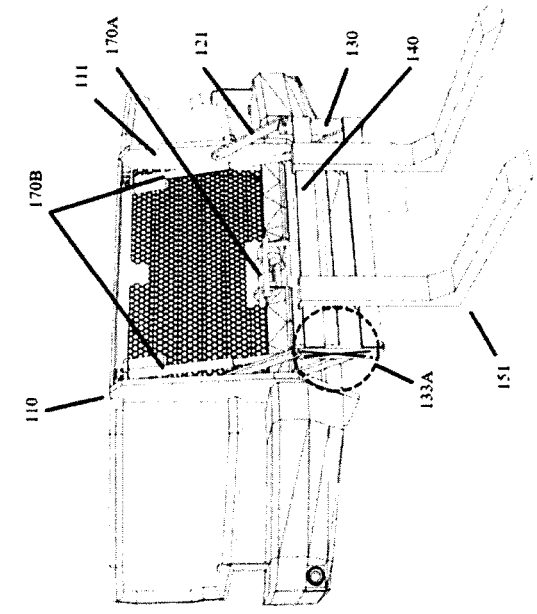
FIG. 8B shows an integrated modular brush guard and lift conversion system for mounting on an existing vehicle in accordance with an embodiment of the subject invention in perspective view. The lift is in a stowed configuration mounted on a vehicle.
Figure 8D:
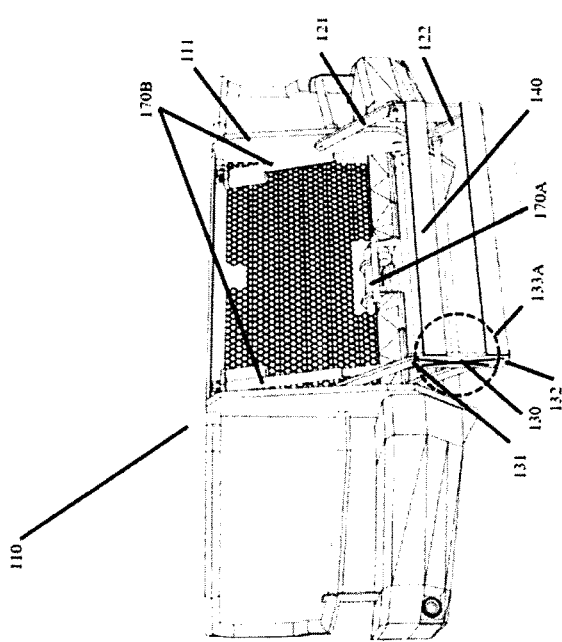
FIG. 8D shows an integrated modular brush guard and lift conversion system for mounting on an existing vehicle in accordance with an embodiment of the subject invention in perspective view. The lift is in a deployed position mounted on a vehicle with a modular forklift implement installed.

FIGS. 8A through 8D show an integrated independently powered modular brush guard and lift conversion system for mounting on an existing vehicle in accordance with an embodiment of the subject invention in perspective view. In FIG. 8A the lift is in a stowed configuration and ready for mounting on a vehicle. In FIG. 8B the lift is in a stowed configuration mounted on a vehicle. In FIG. 8C the lift is in a deployed position mounted on a vehicle. In FIG. 8D the lift is in a deployed position mounted on a vehicle with a modular forklift implement installed. Embodiments provide a lift winch in addition to or in place of a vehicle winch. The lift winch can be used in addition to or in place of the linear actuators to drive the lift.

Figure 9D:
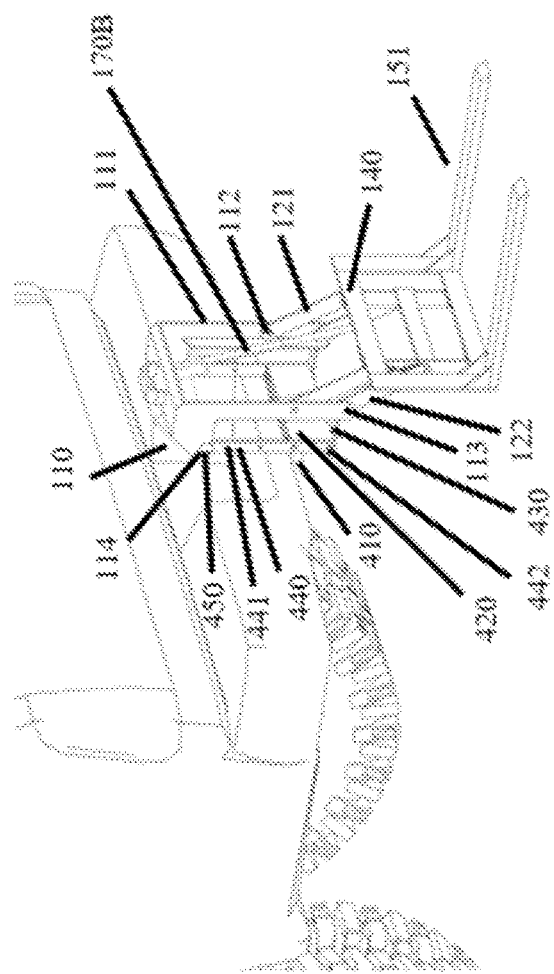
FIG. 9D shows a modular lift conversion system and 2-inch receiver adapter for mounting on an existing vehicle hitch receiver in accordance with an embodiment of the subject invention in perspective view. The lift is in a deployed position mounted on a vehicle with a modular forklift implement installed.
Figure 9C:
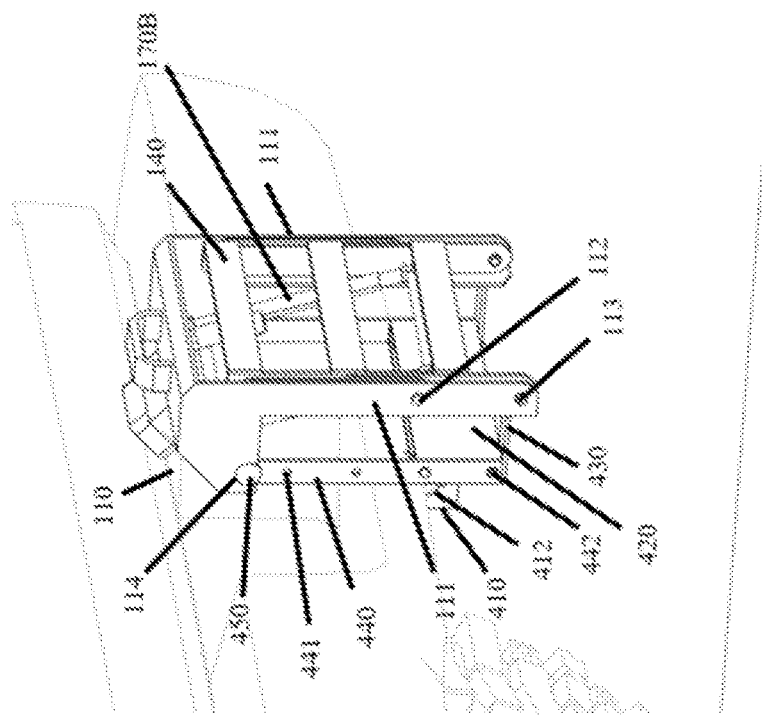
FIG. 9C shows a modular lift conversion system and 2-inch receiver adapter for mounting on an existing vehicle hitch receiver in accordance with an embodiment of the subject invention in perspective view. The lift is in a stowed configuration on the adapter and mounted on a vehicle.
Figure 9F:
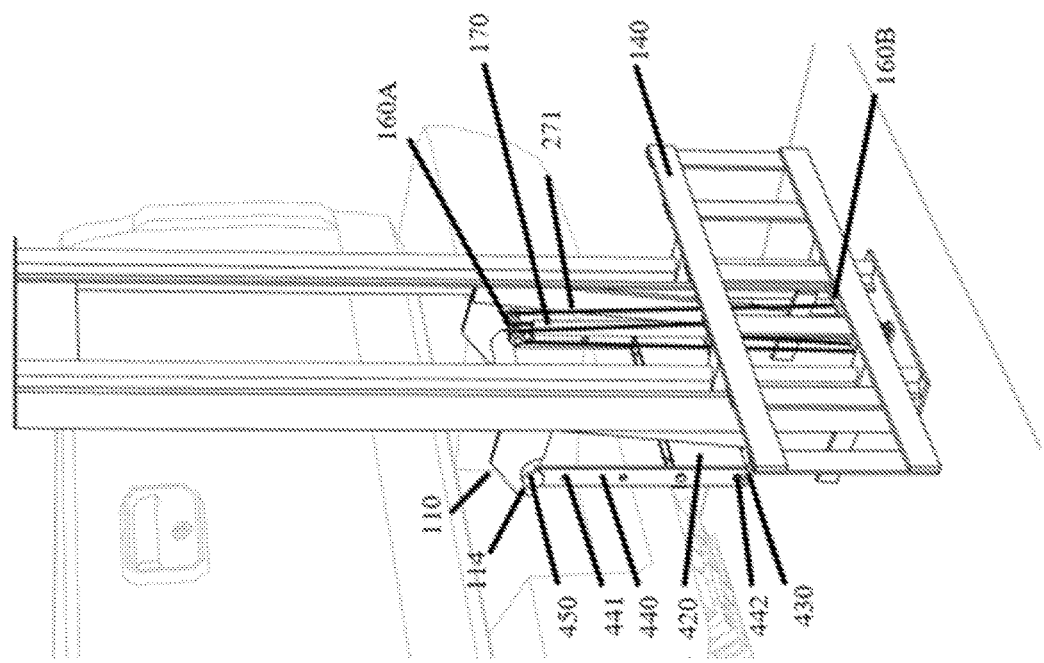
FIG. 9F shows a modular vertical lift conversion system and 2-inch receiver adapter for mounting on an existing vehicle hitch receiver in accordance with an embodiment of the subject invention in perspective view. The lift is in a stowed configuration mounted on the adapter mounted on a vehicle.
Figure 9E:
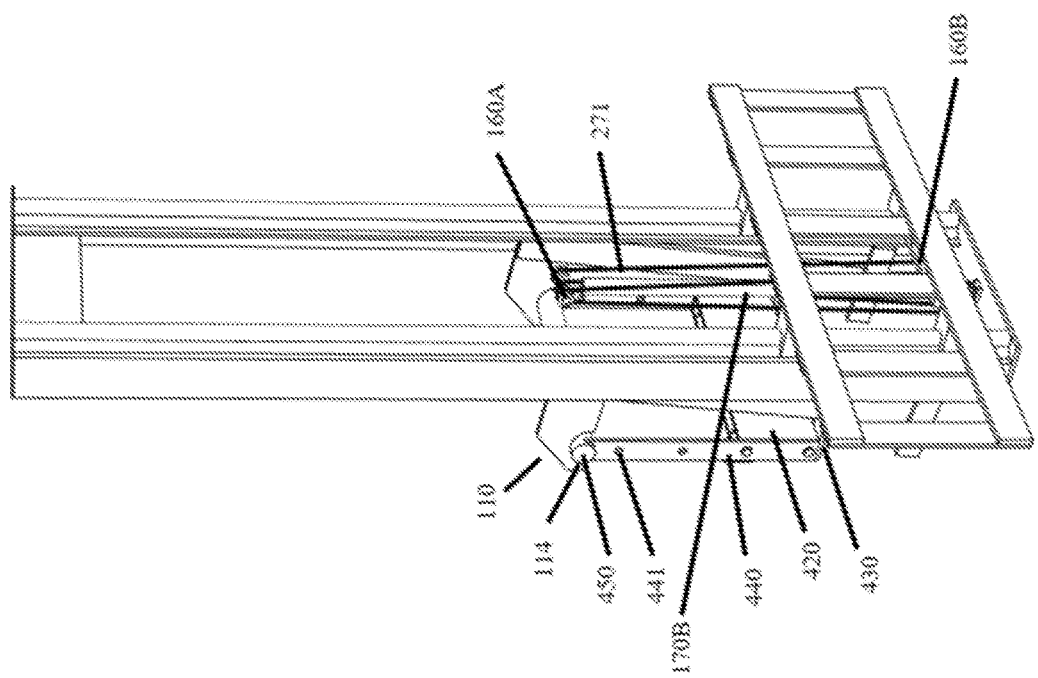
FIG. 9E shows a modular vertical lift conversion system and 2-inch receiver adapter for mounting on an existing vehicle hitch receiver in accordance with an embodiment of the subject invention in perspective view. The lift is in a stowed configuration mounted on the adapter and ready for mounting on a vehicle.

FIGS. 9A through 9F show a modular lift conversion system and 2-inch receiver adapter 400 for mounting on an existing vehicle hitch receiver in accordance with an embodiment of the subject invention in perspective view. In FIG. 9A the 2-inch receiver adapter is ready for mounting on a vehicle. Embodiments include a 2-inch receiver draw-bar mount or other standard or non-standard size mount (e.g., 1¼", 2½", 3", or 50 mm.) In FIG. 9B the lift is in a stowed configuration mounted on the adapter and ready for mounting on a vehicle. In FIG. 9C the lift is in a stowed configuration mounted on a vehicle. In FIG. 9D the lift is in a deployed position mounted on a vehicle with a modular forklift implement installed. In FIG. 9E the lift is in a stowed configuration mounted on the adapter and ready for mounting on a vehicle. In FIG. 9F the lift is in a stowed configuration mounted on the adapter mounted on a vehicle.

Embodiments provide an adapter that allows the modular lift to mount supported by a standard hitch receiver (e.g., a 1¼", 2", or 2½" receiver) on a vehicle in much the same manner as the lift would mount on a brush guard or rack. The adapter can provide a 2" (or 1¼", or 2½") box section sized to fit a standard hitch receiver and of a length sufficient to mount firmly in the receiver, support the adapter, and clear surrounding structures (e.g., providing clearance for a bumper, body panel, tailgate, or trunk.) The adapter can be secured in the receiver by a pin and circlip, locking pin, anti-rattle device, or other means known in the art. The adapter can incorporate or accommodate a winch mounting plate. The adapter can be rigidly constructed, configurable, or adjustable to compensate for factors such as vehicle height, receiver height, lift size, or vertical or horizontal offset.

As shown in FIG. 9A, in an embodiment, the box section 410 supports a subframe 420 with access portal 421 that then holds one or more frame supports 430 and adapter arms 440 finally supporting mounting rail 450. The box section 410 can be secured to a vehicle with pin 412 passing through hole 411 and secured by circlip 413. Each connection between elements of the adapter can be made by methods known in the art (e.g., welding or rivets for strength and simplicity, pins for quick change adjustability, or bolts for a balance of strength and adjustability.) The frame supports can be supported by and move with the adapter arms. Alternatively, the frame supports can be supported by and move with the subframe. In this embodiment, holes 441 hold pins 442 to connect adapter arms and subframe. A circlip 443 is visible securing one pin. Other pins and circlips are hidden or partially hidden in this view. Pins can be removed and replaced to select different holes for different configurations (e.g., changing height of the adapter arms relative to the subframe.)

FIG. 9B depicts a lift installed on a hitch adapter in accordance with the subject invention. Embodiments provide an adapter and lift of the same, similar, or about the same width, as shown in FIG. 9B. Alternatively, the adapter width can be greater than the frame width of the lift (e.g., 1 inch greater, alternatively one-half, 2, 3, 4, 5, or 6 inches greater including ranges, increments, and combinations thereof.) Alternatively, the adapter width can be less than the frame width of the lift (e.g., 1 inch less, alternatively one-half, 2, 3, 4, 5, or 6 inches less including ranges, increments, and combinations thereof.) The adapter my fit inside the fixed frame of the lift. The adapter can provide a rail or mounting location (e.g., similar to the rack or brush guard of a vehicle.) Alternatively, the adapter can provide a unique mounting feature, or a selection of different mounting features, or a modular mounting feature to support a single lift configuration; to support a family of lift configurations with a single adapter; to support a single adapter configuration with a family of different lift configurations; or to support a family of lift configurations with a family of different lift configurations. Various kits are contemplated within the scope of the subject invention comprising one or more lifts, one or more adapters, and optionally one or more accessories (e.g., one or more fasteners, alignment elements, brackets, covers, trim pieces, or other functional or decorative elements) intended for use with the lifts or adapters.

The adapter or the lift can provide an alignment or registration feature, or a pair of mating or opposing features (e.g., a protrusion, wall, stop, washer, edge, ridge, pin, post, detent, slot, hole, depression, convex feature, concave feature, or other feature) that assists in lateral alignment of the lift on the adapter. Alternatively, the lift and adapter can be reversibly joined, registered, fastened, mated, or aligned together (e.g., by a pin, linchpin, bolt, snap-ring, clip, strap, clamp, cam-lock, or other fastener known in the art.) Alternatively, the lift and adapter can be permanently or semi-permanently joined, registered, fastened, mated, or aligned together (e.g., by one or more security bolts, rivets, welds, press-fits, shrink fits, or other methods known in the art.) Alternatively, a lift can be provided as a single unit comprising some or all elements of the adapter (e.g., a receiver adapter can be welded or bolted directly to a fixed frame of a lift, with or without additional elements of the adapter.)

Embodiments provide frame supports as shown or similar to the supports shown in FIGS. 9A-9F (e.g., horizontal flat, angle, or box section structures located at or near the bottom of the adapter, optionally configured to engage the lift at or near the bottom of the fixed frame height.) Alternatively, frame supports can take different forms or be provided in different locations (e.g., vertical or angled supports, curved supports, round pipe sections, extensions of the box section, subframe, adapter arms, or mounting rail.

Alternative adapter configurations are contemplated within the scope of the subject invention, some of which can function in the absence of one or more individual elements disclosed herein or depicted in FIGS. 9A-9F (e.g., some or all functionality of the subframe can be achieved by features of the box section.) While FIG. 9A depicts a symmetric two-sided design for elements of the adapter, alternative designs are contemplated (e.g., asymmetric, monolithic, central, three, or four sided designs are contemplated.)

Figure 10A:
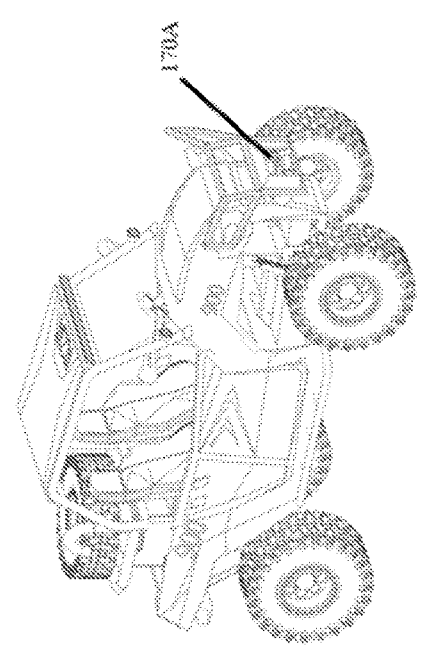
FIG. 10A shows a UTV vehicle with a rack or guard and winch installed.
Figure 10C:
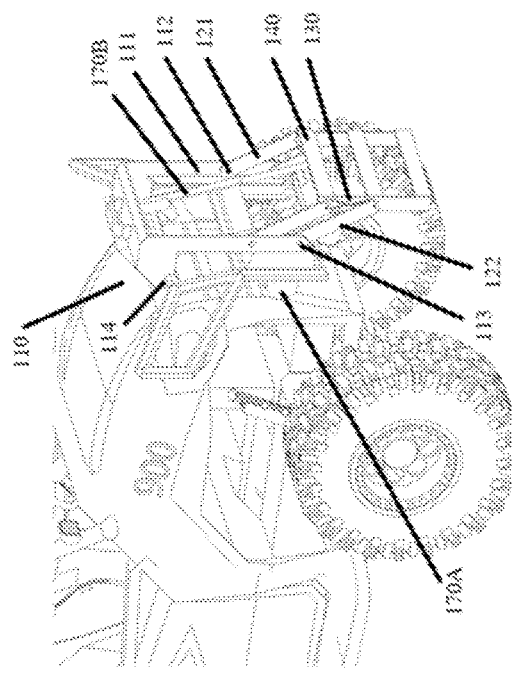
FIG. 10C shows a modular lift conversion system for mounting on an existing vehicle rack or guard in accordance with an embodiment of the subject invention in perspective view. The lift is in a deployed position mounted on a UTV.
Figure 10B:
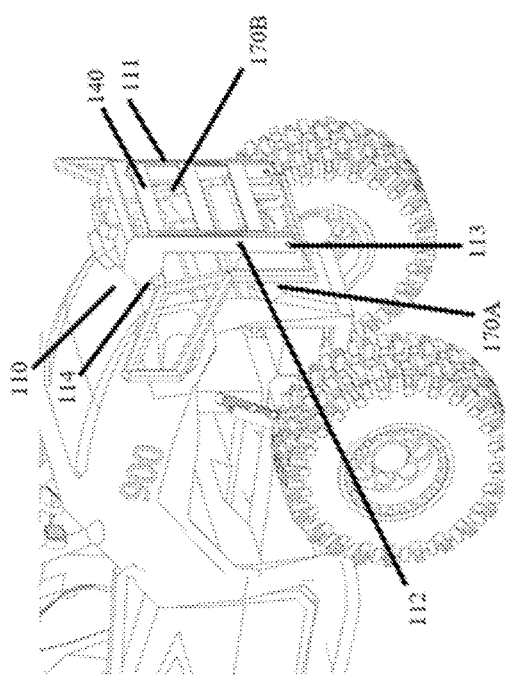
FIG. 10B shows a modular lift conversion system for mounting on an existing vehicle rack or guard in accordance with an embodiment of the subject invention in perspective view. The lift is in a stowed configuration mounted on a UTV.
Figure 10D:
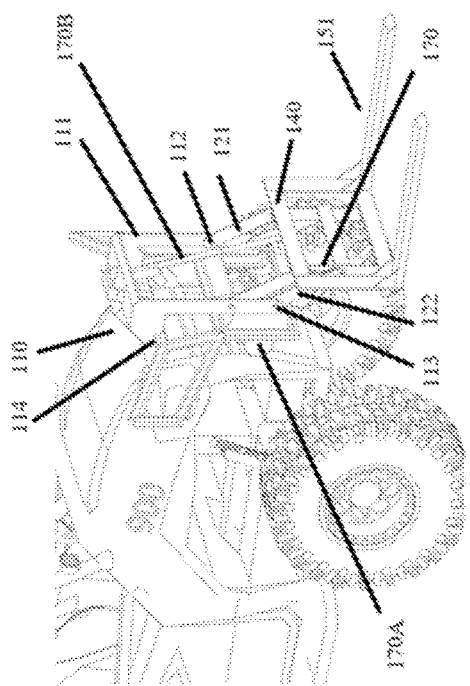
FIG. 10D shows a modular lift conversion system for mounting on an existing vehicle rack or guard in accordance with an embodiment of the subject invention in perspective view. The lift is in a deployed position mounted on a UTV with a modular forklift implement installed.

FIGS. 10A through 10D show a UTV vehicle with a rack or guard and winch installed, and a self-powered (e.g., battery powered) modular lift conversion system for mounting on the UTV vehicle rack or guard in accordance with an embodiment of the subject invention in perspective view. FIG. 10A shows the UTV vehicle with a rack or guard and winch installed. In FIG. 10B the lift is in a stowed configuration mounted on a UTV without using the vehicle winch. In FIG. 10C the lift is in a deployed position mounted on a UTV. In FIG. 10D the lift is in a deployed position mounted on a UTV with a modular forklift implement installed. In each of FIGS. 10A through 10D the vehicle winch is available for other uses while the lift is installed or in use. Alternatively, the lift is operable in the absence of a vehicle winch, or in the event of failure of a vehicle winch.

Figure 11:
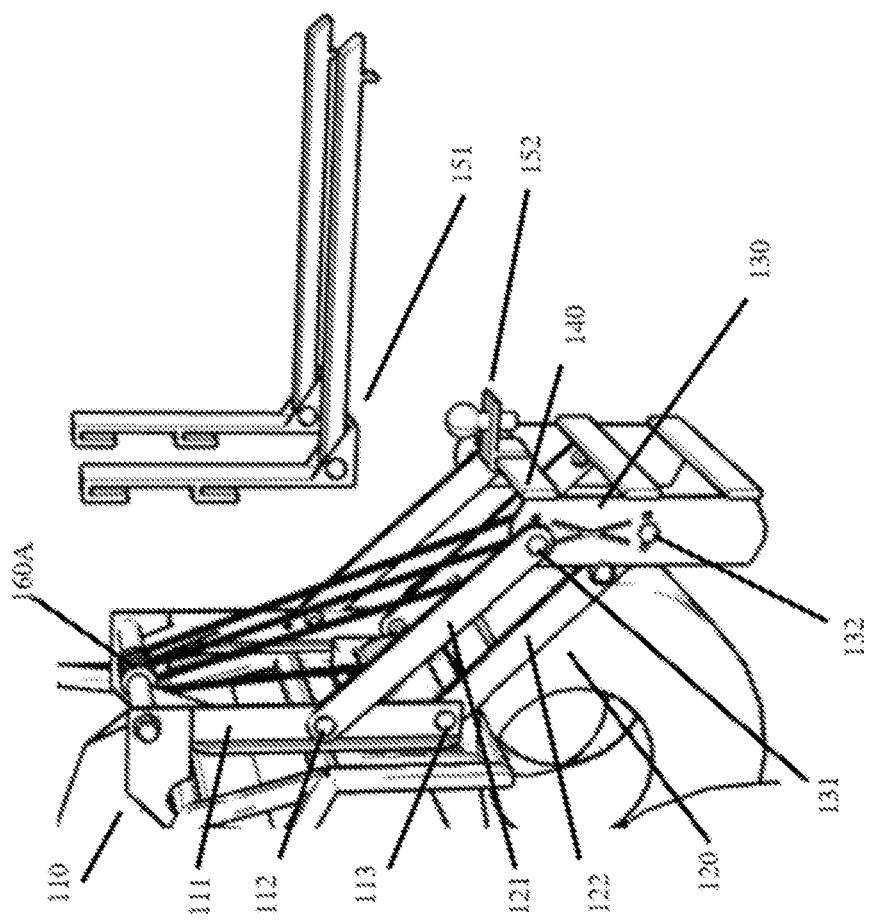
FIG. 11A shows an integrated modular brush guard and lift conversion system for mounting on an existing vehicle in accordance with an embodiment of the subject invention in perspective view. The lift is in a stowed configuration mounted on a truck.
FIG. 11B shows an integrated modular brush guard and lift conversion system for mounting on an existing vehicle in accordance with an embodiment of the subject invention in perspective view. The lift is in a deployed position mounted on a truck.
FIG. 11C shows an integrated modular brush guard and lift conversion system for mounting on an existing vehicle in accordance with an embodiment of the subject invention in perspective view. The lift is in a deployed position mounted on a truck with a modular forklift implement installed.
FIG. 11D shows an integrated modular brush guard and lift conversion system for mounting on an existing vehicle in accordance with an embodiment of the subject invention in perspective view. The lift is in a deployed position mounted on a truck with a modular forklift implement installed and engaged to lift and carry a loaded pallet.

FIGS. 11A through 11D show an independently powered (e.g., battery powered, or drawing electrical or other power from the vehicle without reliance on the vehicle winch); integrated modular brush guard and lift conversion system for mounting on an existing vehicle in accordance with an embodiment of the subject invention in perspective view. In FIG. 11A the lift is in a stowed configuration mounted on a truck having a vehicle winch. In FIG. 11B the lift is in a deployed position mounted on a truck. In FIG. 11C the lift is in a deployed position mounted on a truck with a modular forklift implement installed. In FIG. 11D the lift is in a deployed position mounted on a truck with a modular forklift implement installed and engaged to lift and carry a loaded pallet. In each of FIGS. 11A through 11D the vehicle winch is available for other uses while the lift is installed or in use. Alternatively, the lift is operable in the absence of a vehicle winch, or in the event of failure of a vehicle winch.

Embodiments provide a lift comprising a lift winch separate from any vehicle winch. The linear actuators or lift winch can be powered by a battery, by electrical power from the vehicle, or by other means known in the art.

Figure 12B:
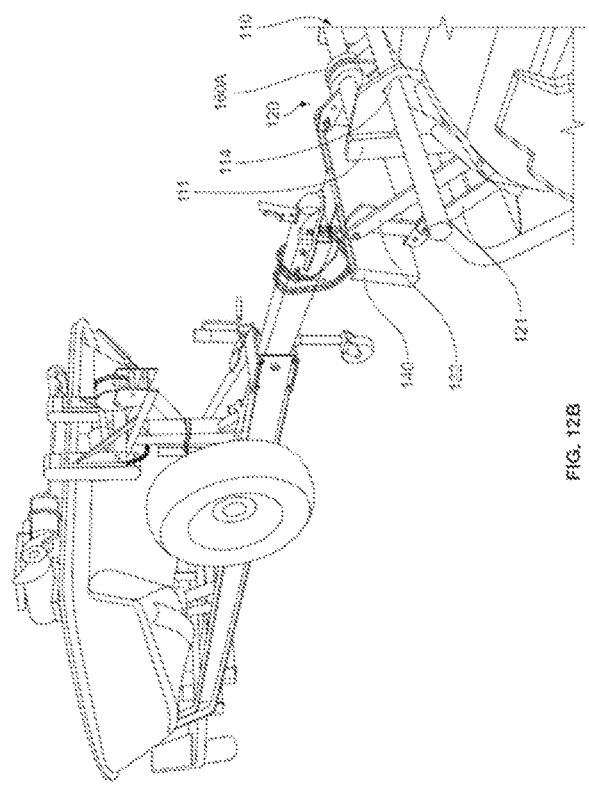
FIG. 12B shows the prototype lift of Example 1 in use moving a trailer.
Figure 12D:
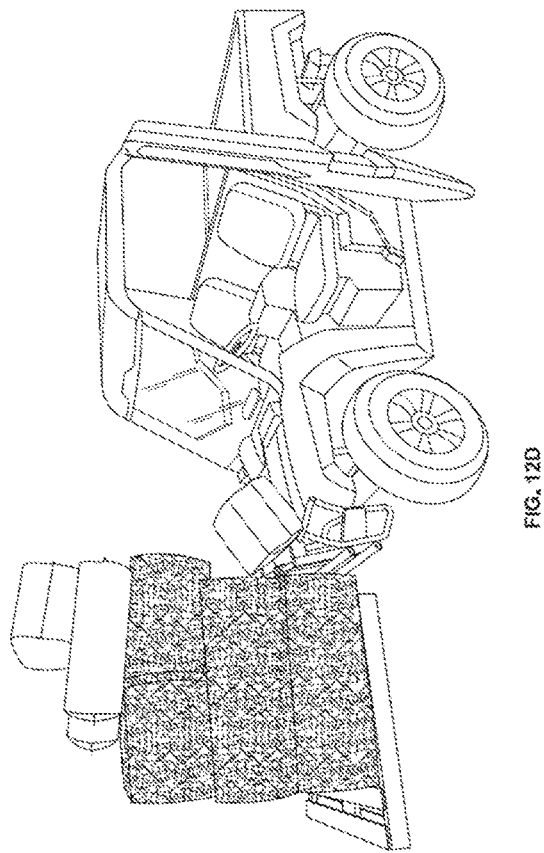
FIG. 12D shows the prototype lift of Example 1 in use carrying a load.
Figure 12A:
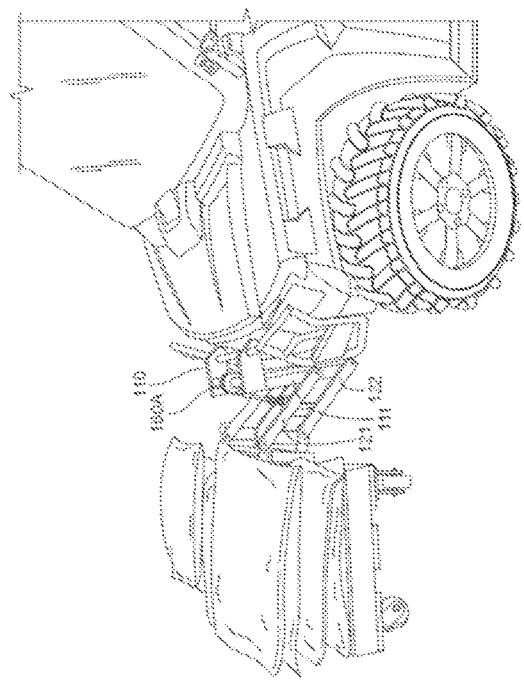
FIG. 12A shows the prototype lift of Example 1 in use carrying a load.

FIG. 12A shows the prototype lift of Example 1 in use carrying a load of topsoil on a pallet.

FIG. 12B shows the prototype lift of Example 1 in use moving a boat trailer.

Figure 12C:
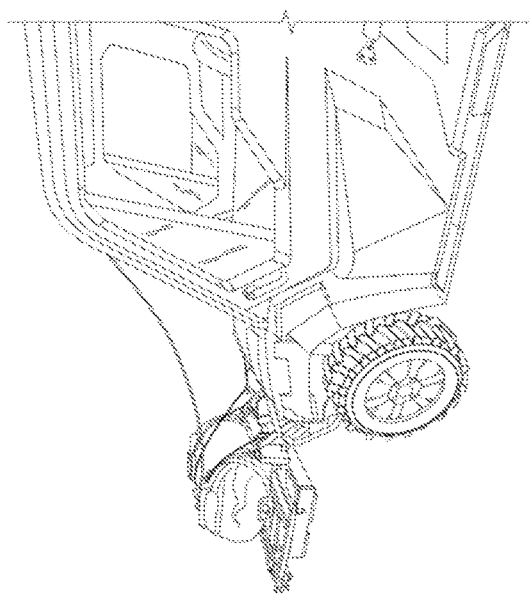
FIG. 12C shows the prototype lift of Example 1 in use carrying a load.

FIG. 12C shows the prototype lift of Example 1 in use carrying a chemical sprayer tank on a pallet.

FIG. 12D shows the prototype lift of Example 1 in use carrying a load of hay bales on a pallet.

Figure 12G:
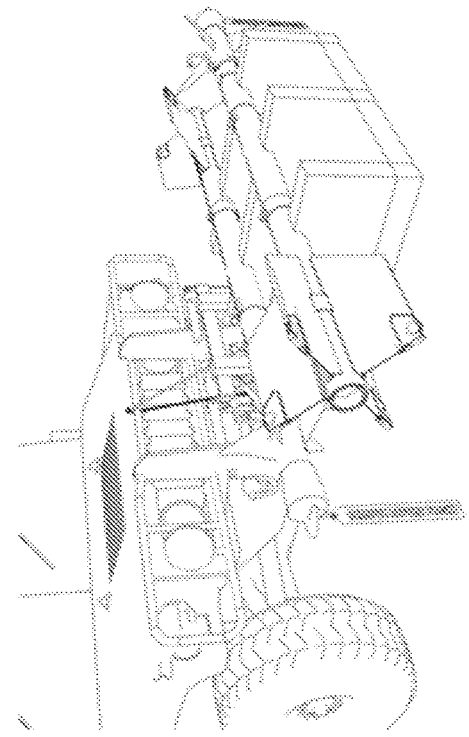
FIG. 12G shows an integrated modular brush guard and lift conversion system for mounting on an existing vehicle in accordance with an embodiment of the subject invention in perspective view. The lift is depicted in a lowered position with a modular cargo carrying military implement for transporting air to air missiles across the tarmac to a waiting aircraft.
Figure 12H:
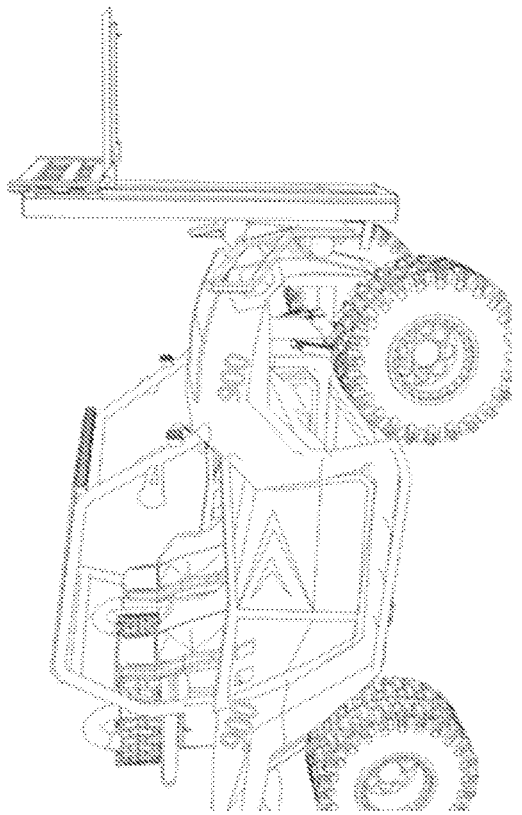
FIG. 12H shows a modular vertical slide lift conversion system for mounting on an existing vehicle rack or guard in accordance with an embodiment of the subject invention in perspective view. The lift is in a deployed position mounted on a vehicle with a modular forklift implement installed.
Figure 12E:
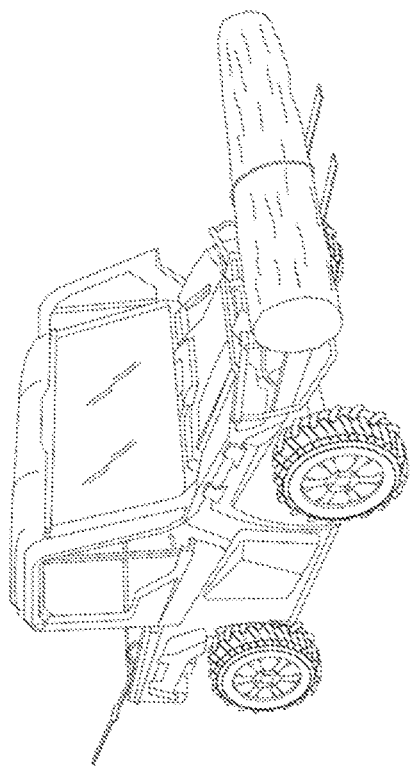
FIG. 12E shows the prototype lift of Example 1 in use carrying a load.

FIG. 12E shows the prototype lift of Example 1 in use carrying a portion of a downed tree.

Figure 12F:
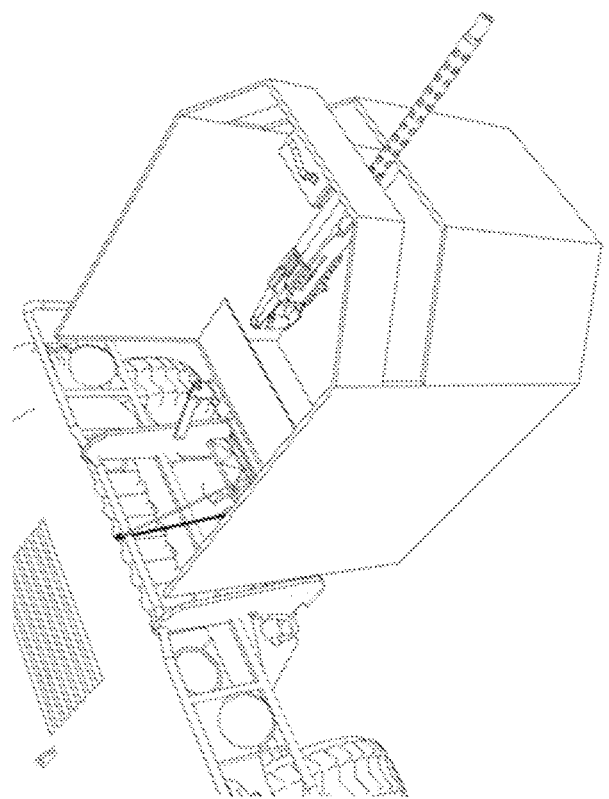
FIG. 12F shows an integrated modular brush guard and lift conversion system for mounting on an existing vehicle in accordance with an embodiment of the subject invention in perspective view. The lift is depicted in a lowered position with a modular armored manned turret military implement.
Figure 13:
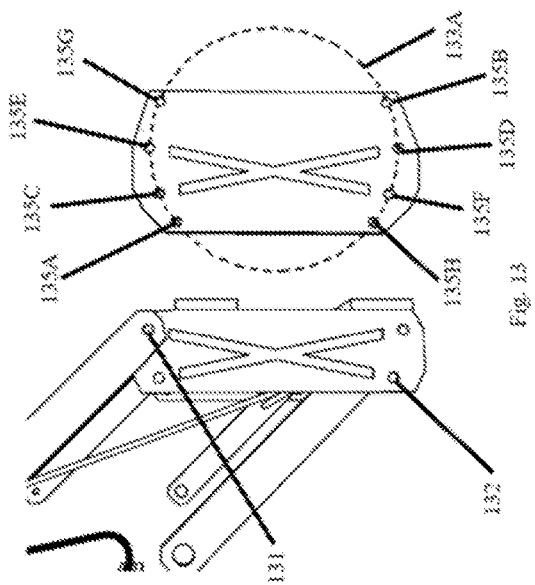
Figure 13J:
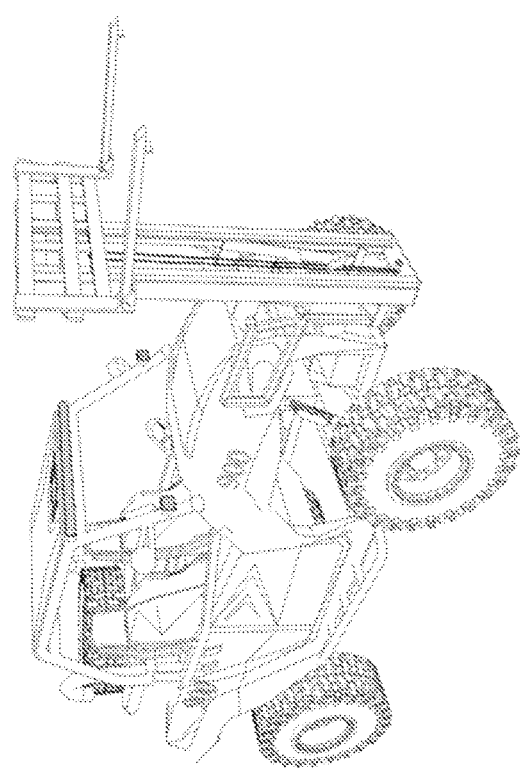

FIG. 12F shows an integrated modular brush guard and lift conversion system for mounting on an existing vehicle in accordance with an embodiment of the subject invention in perspective view. The lift is depicted in a lowered position with a modular armored manned turret military implement.

FIG. 12G shows an integrated modular brush guard and lift conversion system for mounting on an existing vehicle in accordance with an embodiment of the subject invention in perspective view. The lift is depicted in a lowered position with a modular cargo carrying military implement for transporting air to air missiles across the tarmac to a waiting aircraft.

FIG. 12H shows a modular vertical slide lift conversion system for mounting on an existing vehicle rack or guard in accordance with an embodiment of the subject invention in perspective view. The lift is in a deployed position mounted on a vehicle with a modular forklift implement installed.

FIG. 12I shows a modular vertical slide lift conversion system for mounting on an existing vehicle rack or guard in accordance with an embodiment of the subject invention in perspective view. The lift is in a deployed position mounted on a vehicle with a modular forklift implement installed.

FIG. 13 shows two x-plate designs according to embodiments of the subject invention wherein the opposing x-plate mounting points (135A-135H) are laid in a circular pattern along smaller circle 133A such that the x-plate can have multiple opposing points of rotation allowing for angular adjustment of the modular implement base. Embodiments provide x-plate mounting points 135 that are holes, or alternatively slots, pins, pegs, protrusions, depressions, openings, bayonet mounts, or other means of connection known in the art. Embodiments provide x-plate mounting points that are opposing or non-opposing. The x-plate mounting point 135A is opposing 135B, x-plate mounting point 135C is opposing 135D, x-plate mounting point 135E is opposing 135F, x-plate mounting point 135G is opposing 135H. In this embodiment, pairs of opposing x-plate mounting points around small circle 133A can be selected to alter the angle of the x-plate 130 and modular implement base 140 when mounted to upper pivot arms 121 and lower pivot arms 122, while preserving the linkage ratios and angular motion characteristics of upper pivot arms 121 and lower pivot arms 122. Alternatively, embodiments provide x-plate mounting points which are non-opposing (e.g., configured in an ellipse, line, irregular, or other non-circular pattern, or configured in multiple non-concentric circular or arcuate patterns, not shown) and which do alter the linkage ratios and angular motion characteristics of upper pivot arms 121 and lower pivot arms 122 when a new mounting configuration is chosen.

FIG. 14 shows a linchpin retainer 134 for securing the lift in a stowed configuration according to an embodiment of the subject invention. The retainer 134 passes through a vertical frame member 111 of the fixed frame 110 and x-plate 130 of the movable frame 120 to secure the lift in a stowed configuration within the confines of the fixed frame 110.

Figure 15:
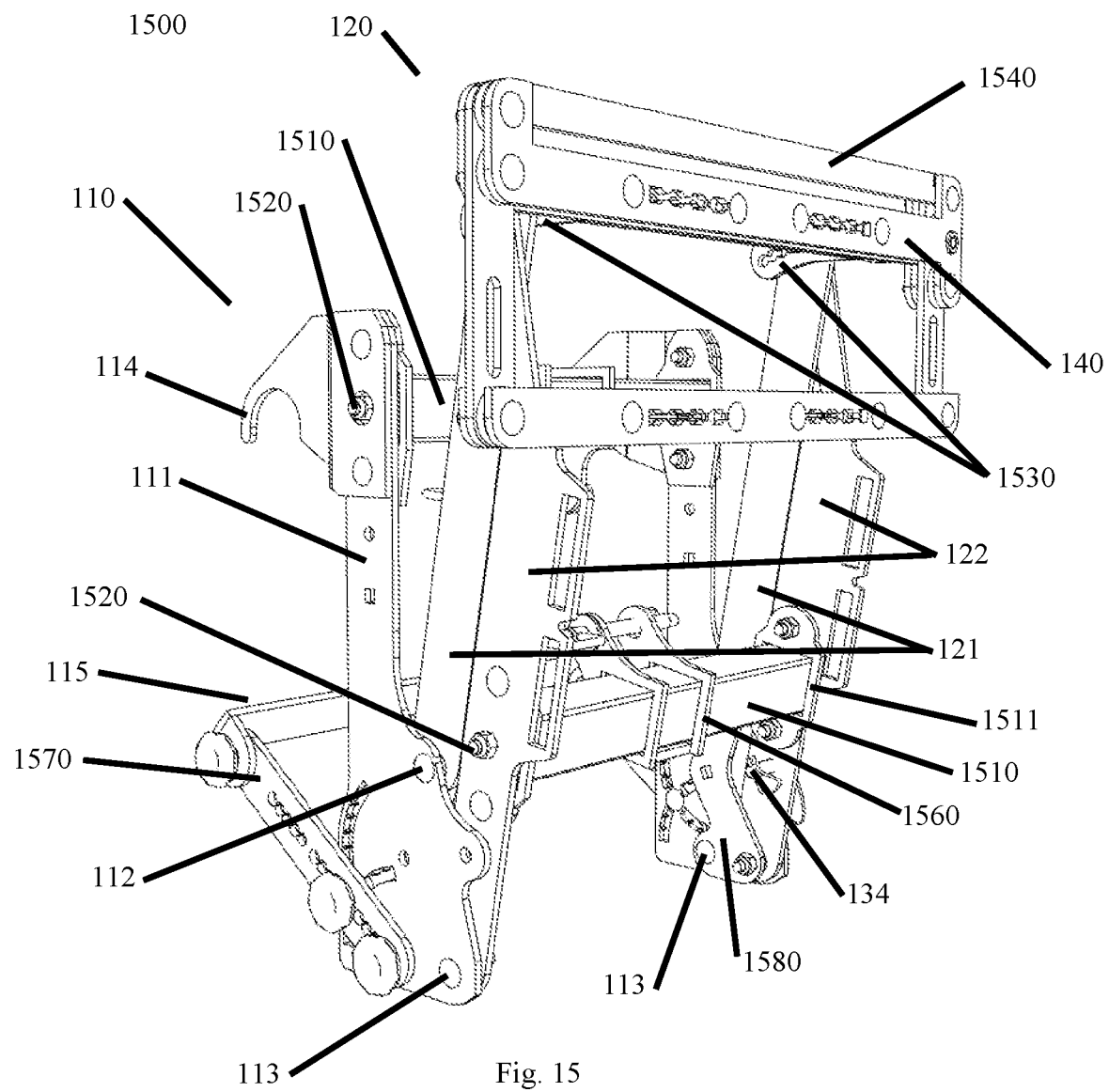
FIG. 15 shows a modular lift conversion system including a multiaxial adjustable support brace, a first modular tension rod on the fixed frame, a second modular tension rod on the movable frame, a first modular compression bar on the fixed frame, a second modular compression bar on the movable frame, a first modular interface point on the fixed frame, a second modular interface point on the movable frame, and a modular implement safety bar according to an embodiment of the subject invention.

FIG. 15 shows a modular lift conversion system including a multiaxial adjustable support brace, a first modular tension rod on the fixed frame, a second modular tension rod on the movable frame, a first modular compression bar on the fixed frame, a second modular compression bar on the movable frame, a first modular interface point on the fixed frame, a second modular interface point on the movable frame, and a modular implement safety bar according to an embodiment of the subject invention.

The specific embodiment shown in FIG. 15 provides a modular lift conversion system 1500 comprising a fixed frame 110 and movable frame 120. Fixed frame 110 comprises an opposing pair of vertical frame members 111, each with a respective upper pivot 112, lower pivot 113, hook 114, and support surface 115. In certain embodiments, support surface 115 is connected to vertical frame members 111 by multiaxial adjustable support brace 1570. Opposing sides of fixed frame 110 are structurally supported and connected by a compression member 1510 and tension member 1520. Movable frame 120 comprises an opposing pair of upper pivot arms 121 and an opposing pair of lower pivot arms 122, each respectively connected by an adaptive mounting plate 1530 to modular implement base 140. Opposing sides of movable frame 120 are structurally supported and connected by a compression member 1510 and tension member 1520, the compression member 1510 located on each lower pivot arm 122, respectively, by a capture bracket 1511. Compression member 1510 supports accessory bracket 1560. Support plates 1580 provide support to the movable frame 120, and retainer 134 secures the movable frame in a stowed position and/or stowed configuration.

Figure 16A:
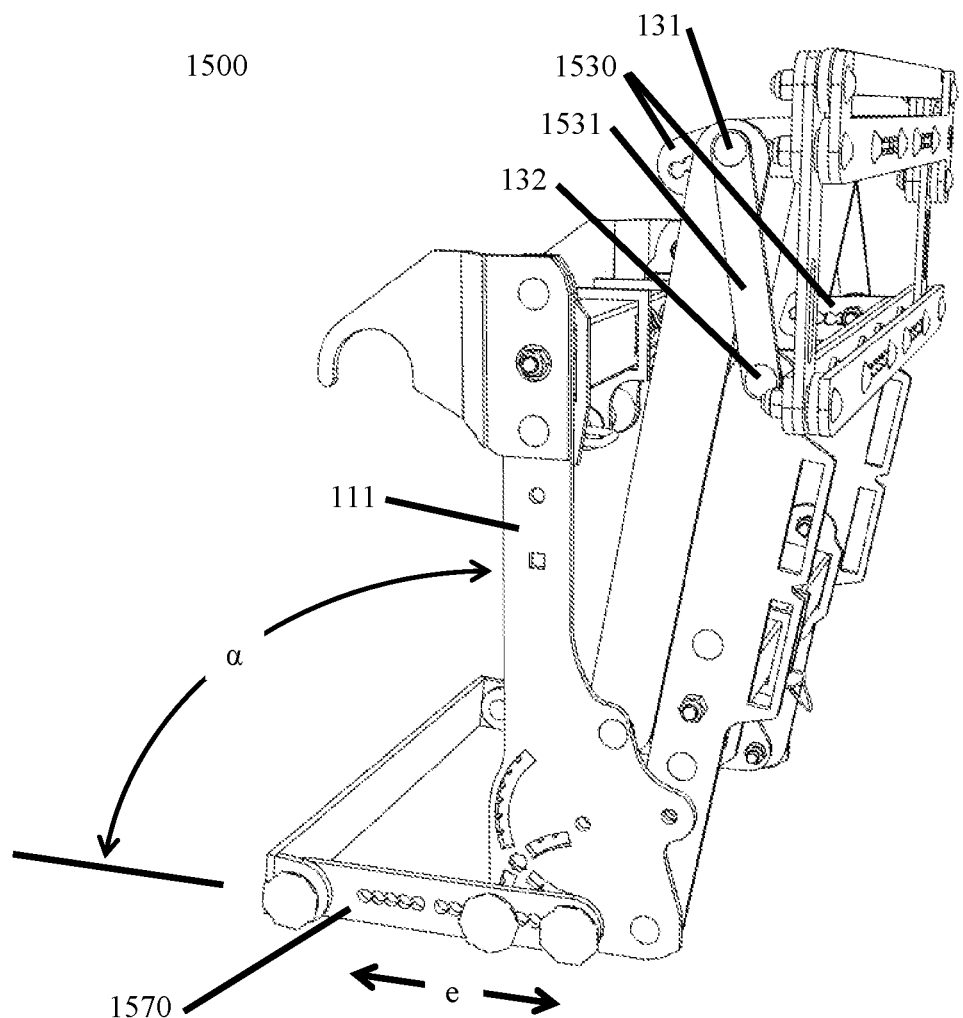
FIG. 16A shows a modular lift conversion system with a multiaxial adjustable support brace configured in a generally horizontal orientation according to an embodiment of the subject invention.

FIG. 16A shows a modular lift conversion system with a multiaxial adjustable support brace configured in a generally horizontal orientation according to an embodiment of the subject invention. The multiaxial adjustable support brace is adjustable, with the axis being movable between two different points, and being adjustable from each axis. This enables bracing of the entire unit against a wide variety of different brush guard, bumper, or frame designs, including independent adjustment of an angle α and an extension e of the multiaxial adjustable support brace 1570 with respect to the vertical frame member 111. Adaptive mounting plates 1530 are supported by stabilizer link 1531 between adjustable upper pivot point 131 and adjustable lower pivot point 132.

Figure 16B:
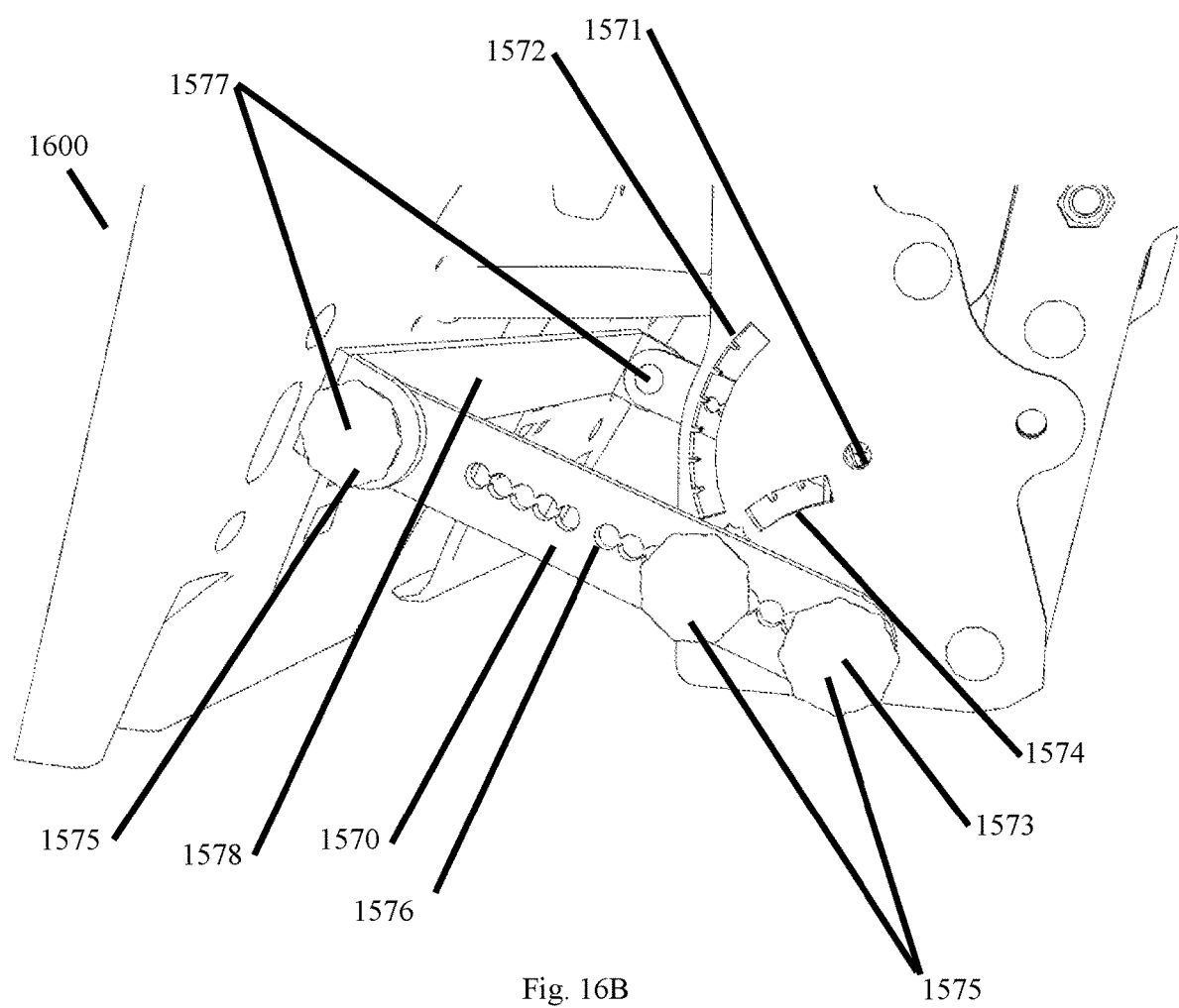
FIG. 16B shows a modular lift conversion system with a multiaxial adjustable support brace configured in an angled orientation according to an embodiment of the subject invention.

FIG. 16B shows a modular lift conversion system with a multiaxial adjustable support brace 1570 configured in an angled orientation according to an embodiment of the subject invention. The multiaxial adjustable support brace 1570 is configured to support the modular lift conversion system at a desired angle while firmly contacting the exemplary UTV brush guard 1600 shown. In this embodiment, the multiaxial adjustable support brace 1570 comprises a second adjustable support brace member 1578. Alternative embodiments provide a multiplicity of (e.g., 2, 3, 4, 5, or more) adjustable support brace members 1578. A first (e.g., upper) pivot point 1571 (not in use) is centered on a first (e.g., upper) locking point arc 1572; while a second (e.g., lower) pivot point 1573 (hidden from view) is centered on a second (e.g., lower) locking point arc 1574. Linear locking point array 1576 provides linear adjustment of multiaxial adjustable support brace 1570. Alternative embodiments provide multidimensional arrays that expand the adjustment of linear locking point array 1576 or pivot points 1571, 1573 and locking point arcs 1572, 1574 (e.g., by providing adjustment along one or more lines, curves, or arcs in 1, 2, or 3 dimensions). Alternative embodiments provide a uniaxial (e.g., one dimensional, single axis of adjustment including linear, curvilinear, or rotational adjustment). Alternative embodiments provide biaxial (e.g., two dimensional, double axis of adjustment including linear, curvilinear, or rotational adjustment). Alternative embodiments provide non-orthogonal, overlapping, or interdependent axes of adjustment (e.g., two distinct centers of rotation 1571, 1573 that align at discrete points along a common locking point arc (e.g., either 1572 or 1574) by attaching to different points along a linear locking pivot array 1576). Alternative embodiments provide either one or more linear locking point arrays 1576 and/or one or more locking point arcs 1572, 1574 located on a component of the fixed frame (e.g., vertical frame members 111) or on a component of the multiaxial adjustable support brace (e.g., 1570, adjustable support brace member 1578, or other components not shown).

Locking points (e.g., thumbscrews) 1575 connect and secure the multiaxial adjustable support brace 1570 and the adjustable support brace member 1578. The adjustable support brace member 1578 is adjustably fixed about connection points 1577. Alternative embodiments provide translation, rotation, or a combination thereof in one or more dimensions (e.g., rotation about a first axis and translation perpendicular to the first axis) prior to being fixed in place (e.g., by locking points 1575).

Figure 16C:
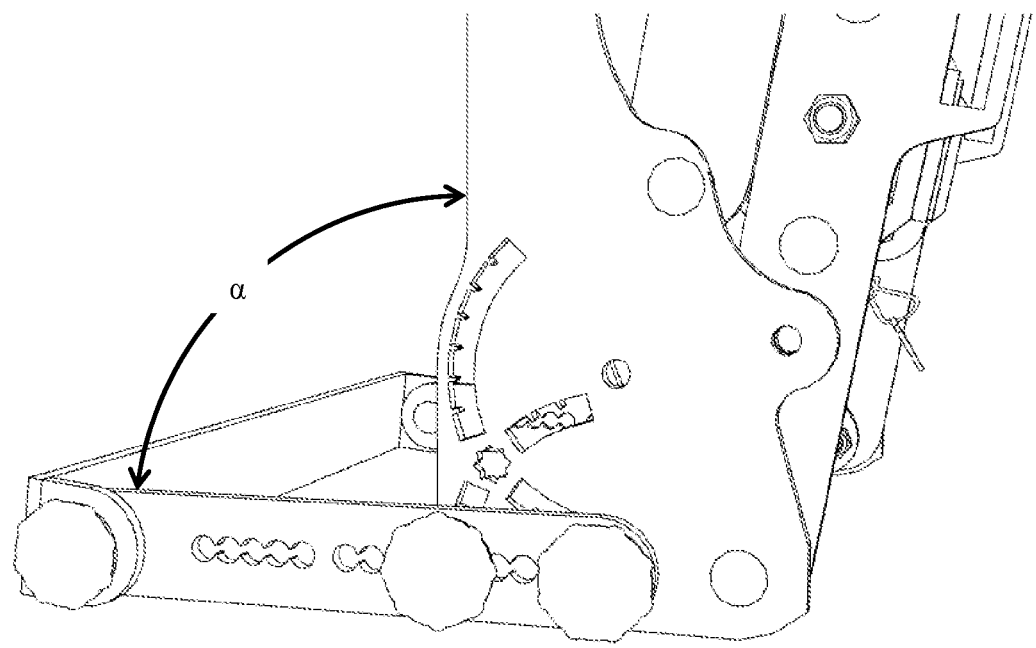
FIG. 16C shows a detailed view of a modular lift conversion system with a multiaxial adjustable support brace configured in a generally horizontal orientation according to an embodiment of the subject invention.

FIG. 16C shows a detailed view of a modular lift conversion system with a multiaxial adjustable support brace configured in a generally horizontal orientation according to an embodiment of the subject invention. The multiaxial adjustable support brace can lock in at any of several lock points on the fixed frame of the modular lift conversion system. In this embodiment angle α is approximately 90 degrees.

Figure 16D:
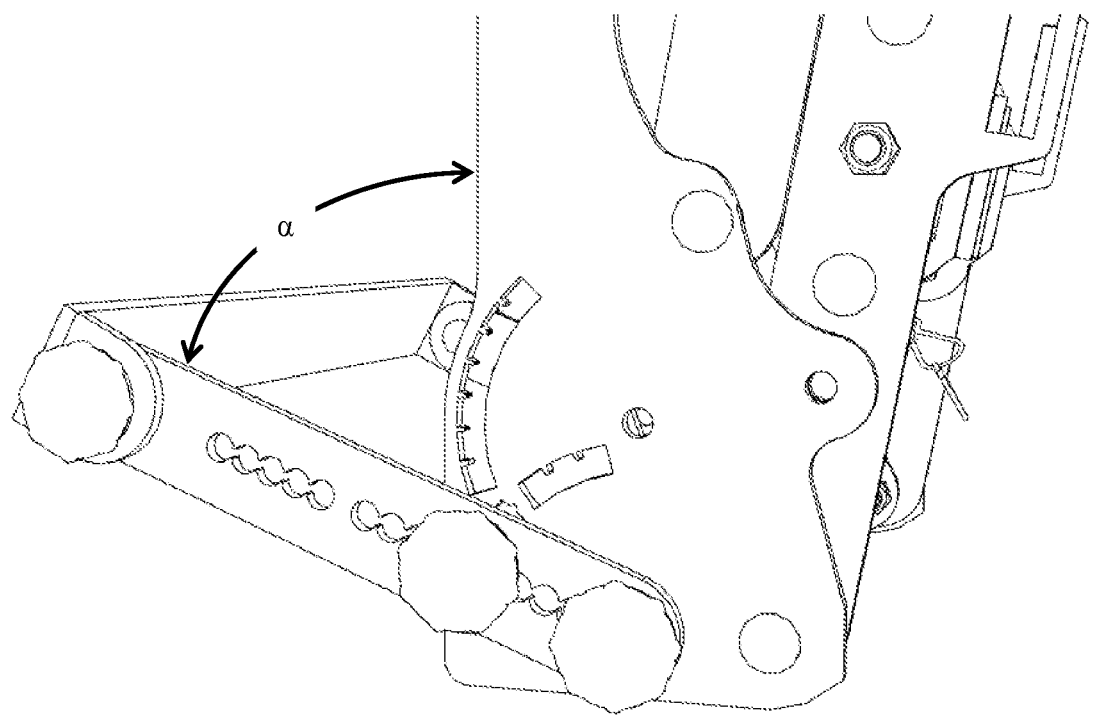
FIG. 16D shows a detailed view of a modular lift conversion system with a multiaxial adjustable support brace configured in an angled orientation according to an embodiment of the subject invention.

FIG. 16D shows a detailed view of a portion of a modular lift conversion system with a multiaxial adjustable support brace configured in an angled orientation according to an embodiment of the subject invention. The multiaxial adjustable support brace can rotate and translate around or along a multiplicity of pivot points to adjust angle and reach, while the brush guard brace contact plate can rotate independently to allow for flush contact with a vehicle brush guard, bumper, frame, or other structure. In this embodiment angle α is approximately 60 degrees. In certain embodiments, various angles (e.g., an angle between multiaxial adjustable support brace 1570 and adjustable support brace member 1578) can be similarly adjusted according to the desired application.

Figure 17A:
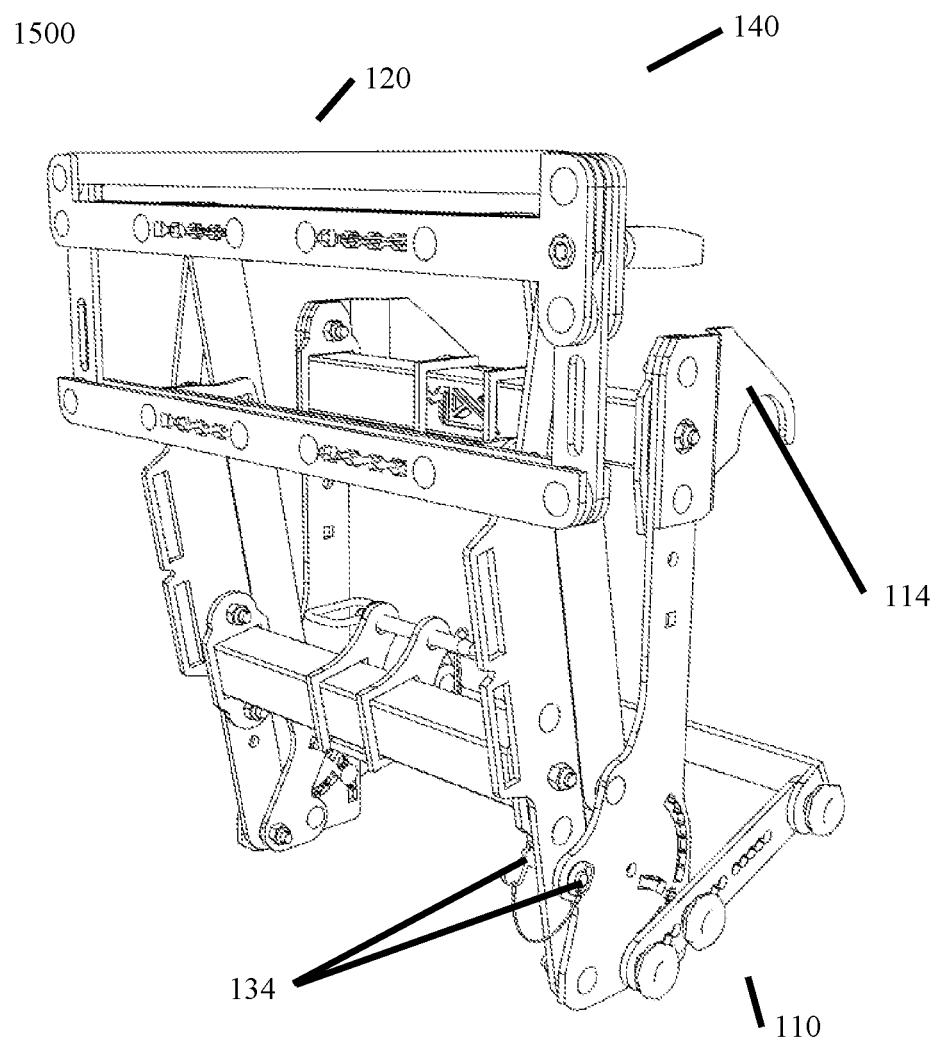
FIG. 17A shows a modular lift conversion system in a raised position with a closed and locked safety bar according to an embodiment of the subject invention.

FIG. 17A shows a modular lift conversion system 1500 in a raised position with a closed and locked safety bar according to an embodiment of the subject invention. The safety bar, when in the closed position, inhibits implements from accidentally bouncing out, and keeps them from being removed. The locking handle, when locked (e.g., secured with a key), inhibits the implements from being lifted out or stolen. In this embodiment hook 114 removably attaches fixed frame 110 to a target vehicle. Movable frame 120 supports modular implement base 140 and is held in a stowed position or stowed configuration by retainer 134.

Figure 17B:
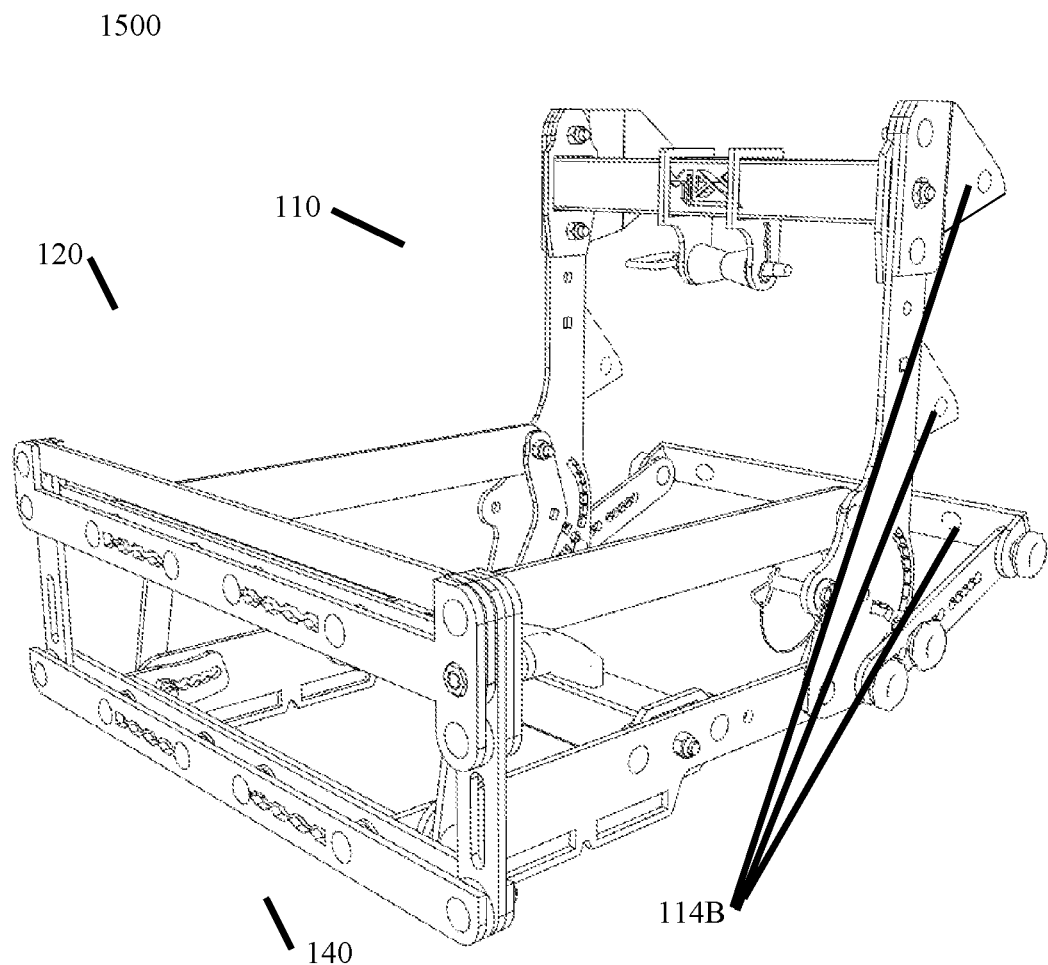
FIG. 17B shows a modular lift conversion system in a lowered position with a closed and locked safety bar according to an embodiment of the subject invention.

FIG. 17B shows a modular lift conversion system in a lowered position with a closed and locked safety bar according to an embodiment of the subject invention. In this embodiment vehicle mount 114B permanently (e.g., by welding or rivets) or semi-permanently (e.g., by bolts or retainers) attaches fixed frame 110 to a target vehicle. Movable frame 120 supports modular implement base 140 and is released from a stowed position or stowed configuration to reach an extended position or extended configuration by removal of retainer 134.

FIG. 17C1 shows a detailed view of a modular lift conversion system with a closed and locked safety bar 1540 and laterally connected but vertically separated adaptive mounting plates 1530 according to an embodiment of the subject invention. Adaptive mounting plates 1530 are supported by stabilizer link 1531 between respective far ends 121B and 122B. In this embodiment, adaptive mounting plates 1530 are advantageously manufactured from a single piece of material connecting opposing sides of the lift while still providing adaptive alignment functionality. This provides advantages or improved strength and reduced part count.

FIG. 17C2 shows a detailed view of a modular lift conversion system with a closed and locked safety bar 1540 and laterally interdigitating but vertically connected adaptive mounting plates 1530 according to an embodiment of the subject invention. In this embodiment, adaptive mounting plates 1530 are advantageously shaped to contact, register, align, or interdigitate with each other to facilitate ease of assembly, alignment, and manufacture. This provides benefits of improved dimensional accuracy, material utilization, and freedom of design choices to positively impact other areas of the design. In particular, embodiments be assembled (either in a manufacturing environment or by the end user) more reliably and efficiently when a convex member is mated with a concave member (alternatively, two mating features such as a protrusion and a depression, or two flat, parallel, angled or irregular surfaces) alignment and spacing of parts for assembly can be advantageously improved. In this embodiment, adaptive mounting plates 1530 are advantageously manufactured from a single piece of material connecting upper and lower pivot arms of the lift while still providing adaptive alignment functionality. This provides advantages or improved strength and reduced part count. Also shown are modular accessory bracket 1560 holding interface point 160A with optional alignment notch 1561A and positioning element (e.g., mounting bolt) 1562.

Figure 3E:
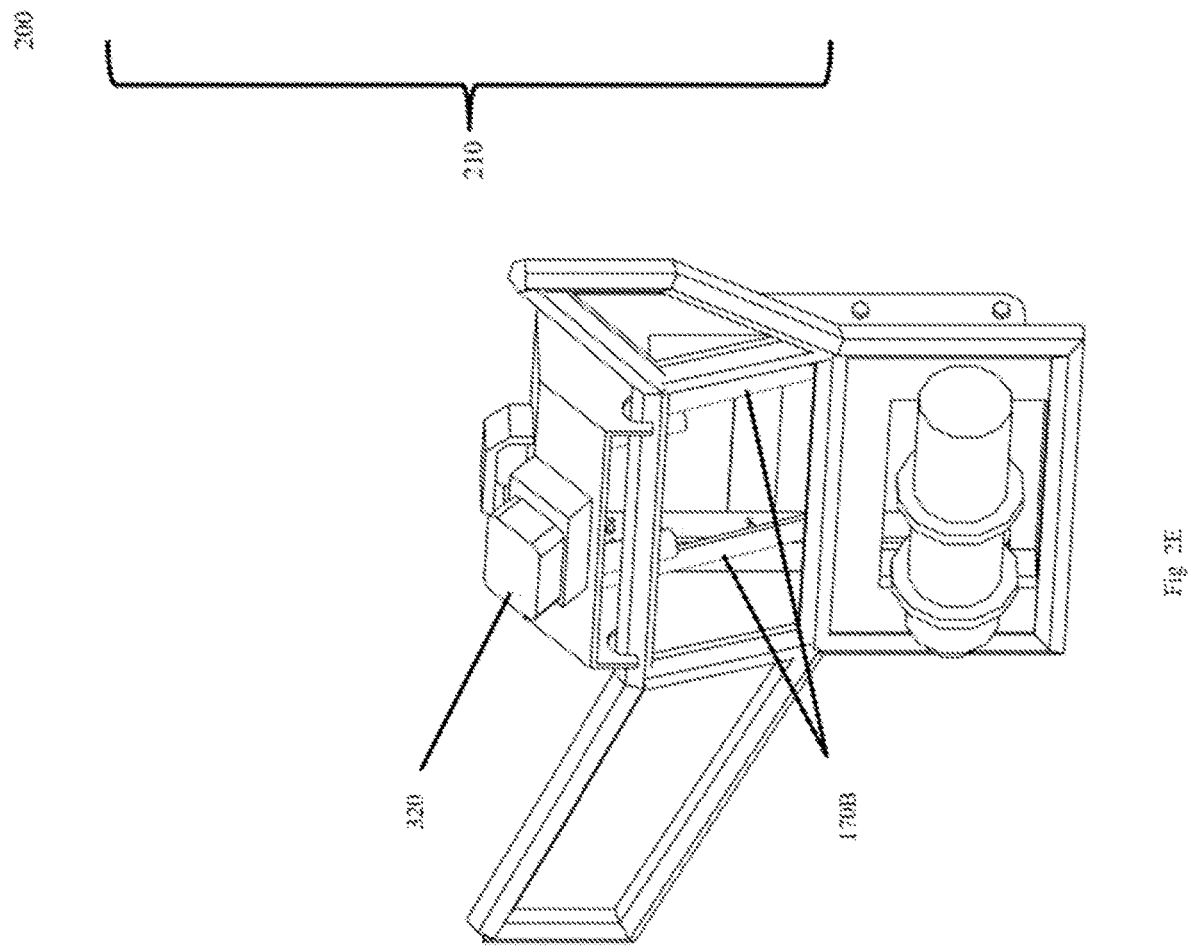

FIG. 17C3 shows a detailed view of a modular lift conversion system with a closed and locked safety bar 1540 and laterally separated but vertically connected adaptive mounting plates 1530 according to an embodiment of the subject invention. In this embodiment, adaptive mounting plates 1530 are advantageously shaped to align and register with a small gap, advantageously allowing for variances in assembled width of the lift. In particular, embodiments be assembled (either in a manufacturing environment or by the end user) more reliably and efficiently when a convex member is slightly offset from a concave member (alternatively, two mating features such as a protrusion and a depression, or two flat, parallel, angled or irregular surfaces) alignment and spacing of parts for assembly can be advantageously improved. In this embodiment, adaptive mounting plates 1530 are advantageously manufactured from a single piece of material connecting upper and lower pivot arms of the lift while still providing adaptive alignment functionality. This provides advantages or improved strength and reduced part count.

Figure 17D:
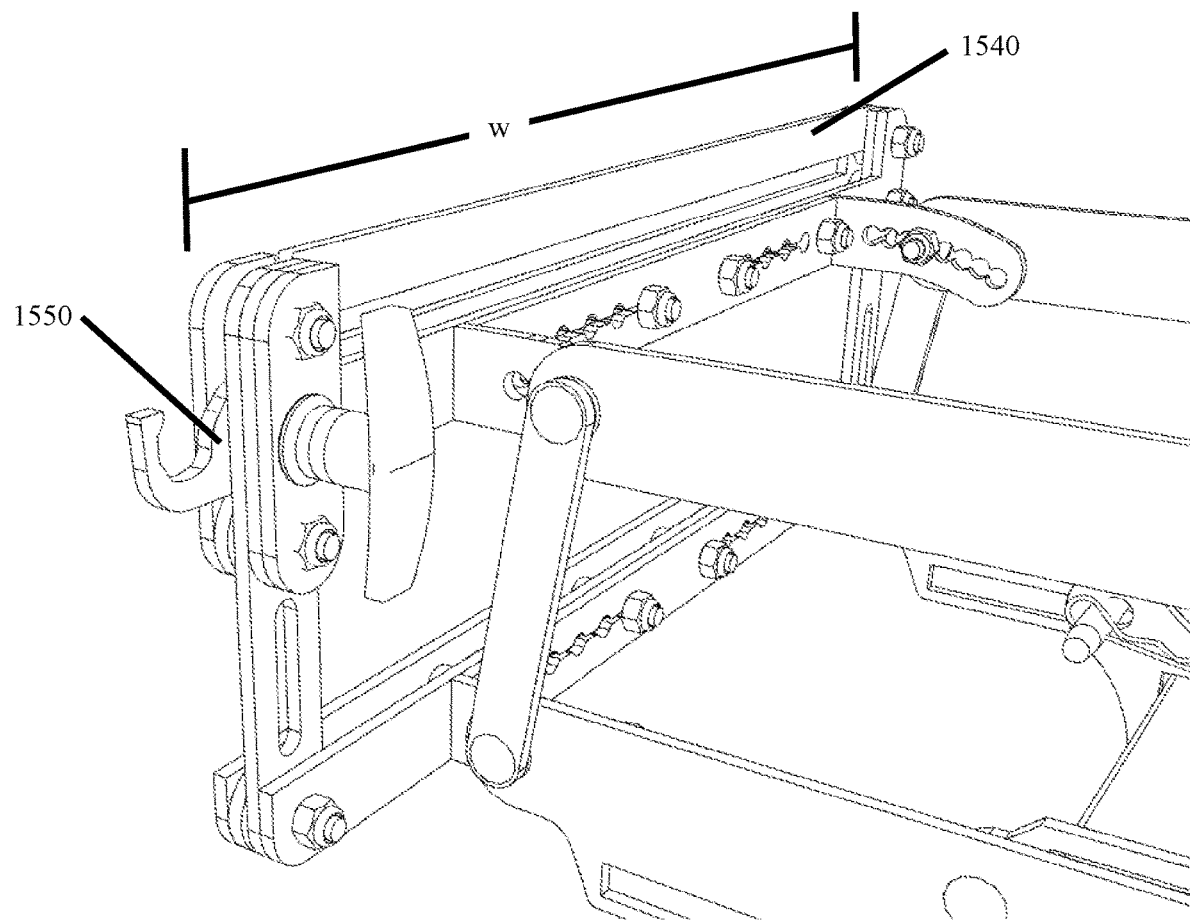
FIG. 17D shows a detailed view of a modular lift conversion system with a closed and unlocked safety bar according to an embodiment of the subject invention.

FIG. 17D shows a detailed view of a modular lift conversion system with a closed and unlocked safety bar according to an embodiment of the subject invention. A safety bar 1540 spans across a width w of the modular implant base and is held in a closed position by safety bar lock 1550.

Figure 17E:
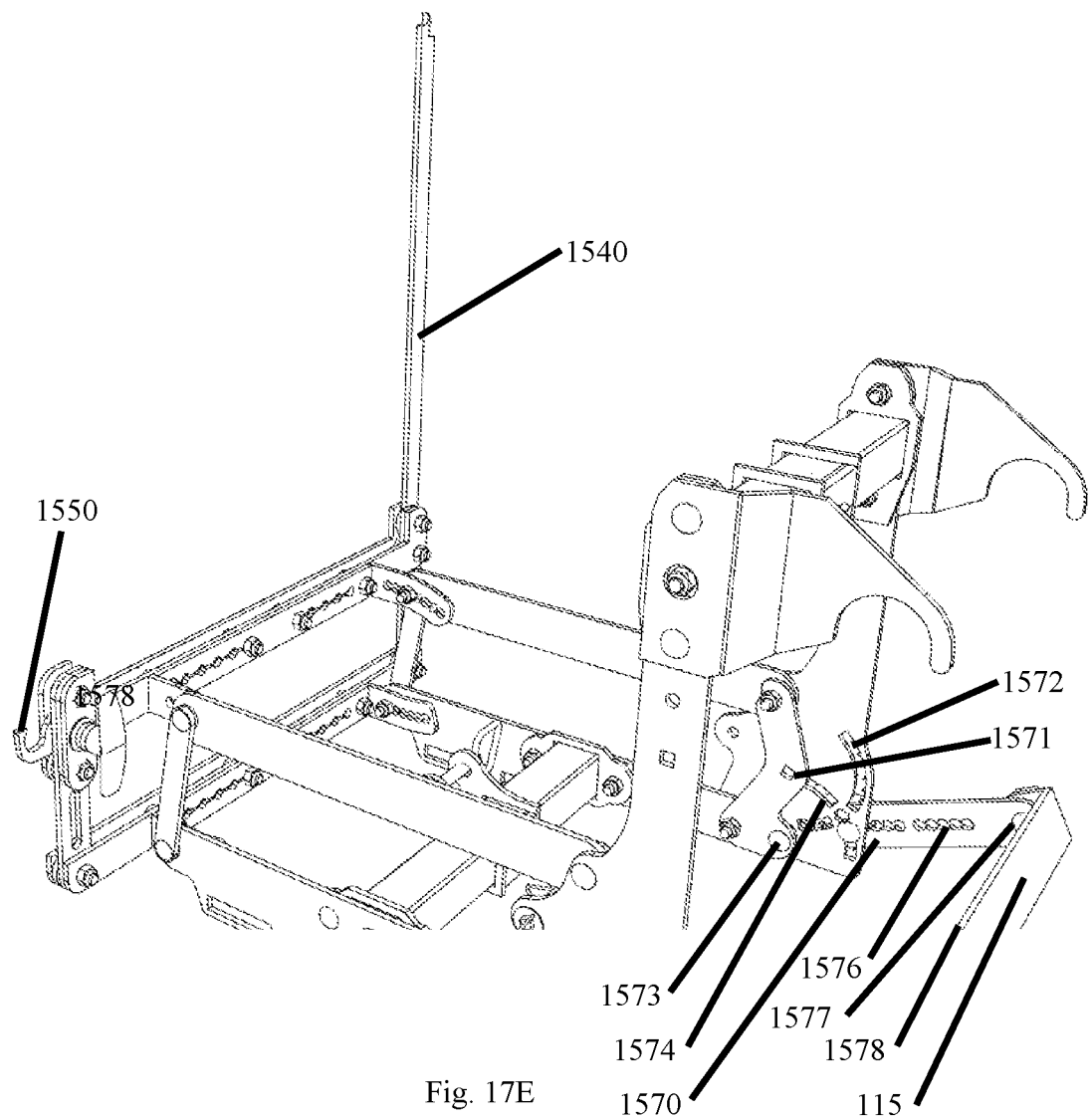
FIG. 17E shows a rear perspective view of a modular lift conversion system with an opened and unlocked safety bar according to an embodiment of the subject invention.

FIG. 17E shows a rear perspective view of a modular lift conversion system with an opened safety bar 1540 and unlocked safety bar lock 1550 according to an embodiment of the subject invention. Also visible are multiaxial adjustable support brace 1570, adjustable support brace member 1578, first (e.g., upper) pivot point 1571 (not engaged for this embodiment, as shown) centered on a first (e.g., upper) locking point arc 1572 (not engaged for this embodiment, as shown), second (e.g., lower) pivot point 1573 is centered on a second (e.g., lower) locking point arc 1574, and linear locking point array 1576 that provides linear adjustment of multiaxial adjustable support brace 1570. Adjustable support brace member 1578 is adjustably fixed (e.g., reversibly locked in place at a desired position or rotation) about connection point 1577.

Figure 17F:
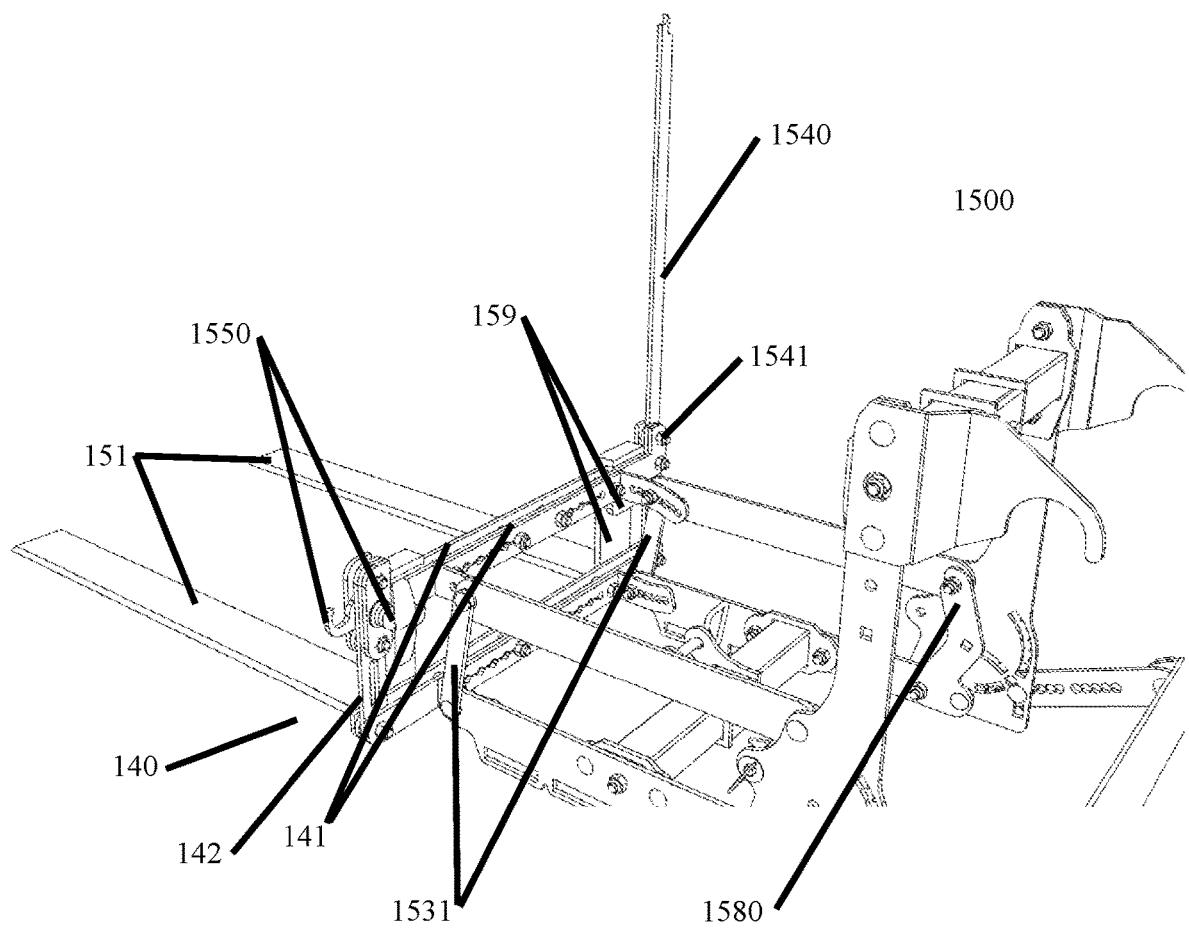
FIG. 17F shows a rear perspective view of a modular lift conversion system with an opened and unlocked safety bar and a pair of modular fork implements installed according to an embodiment of the subject invention.

FIG. 17F shows a rear perspective view of a modular lift conversion system with an opened safety bar 1540 and unlocked safety bar lock 1550 on modular implement base 140 according to an embodiment of the subject invention. Also visible are a pair of modular lifting fork implements 151 installed according to an embodiment of the subject invention when the safety bar was in an open position. One or more mounting bars 141 support the respective modular lifting fork implements 151 by contacting support surfaces 159. Connecting member 142 connects mounting bars 141, safety bar lock 1550, pivot 1541, and optionally adaptive mounting plates 1530. Stabilizer links 1531 and support plate 1580 support their respective mounting bolts to inhibit binding within the system and also shield bolts and nuts from rotational motions of the movable frame, inhibiting loosening of the respective bolts.

Figure 17G:
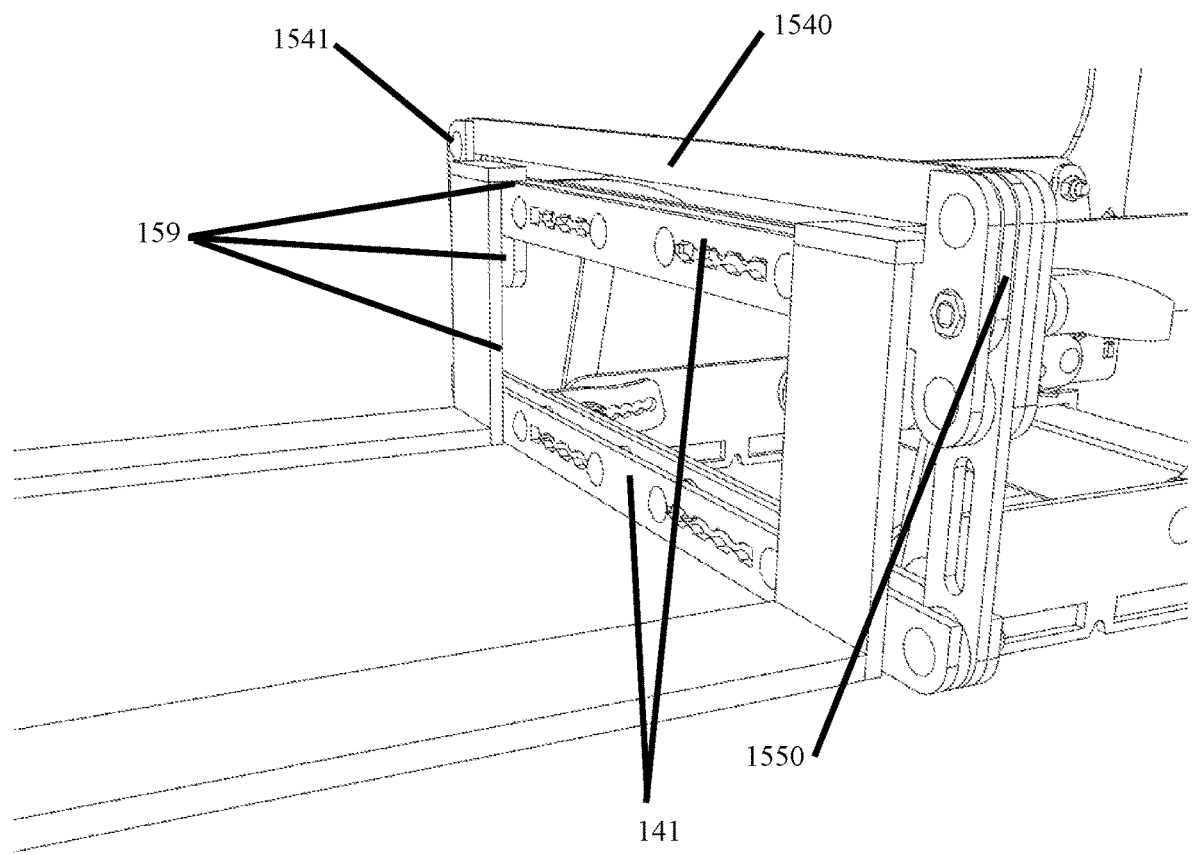
FIG. 17G shows a front perspective view of a modular lift conversion system with a closed and locked safety bar and a pair of modular fork implements installed according to an embodiment of the subject invention.

FIG. 17G shows a front perspective view of a modular lift conversion system with a closed safety bar 1540, held at a first end by pivot 1541 and at a second end by locked safety bar lock 1550, Also shown are a pair of modular lifting fork implements 151 installed according to an embodiment of the subject invention. One or more mounting bars 141 support the respective modular lifting fork implements 151 by contacting support surfaces 159.

Figure 17H:
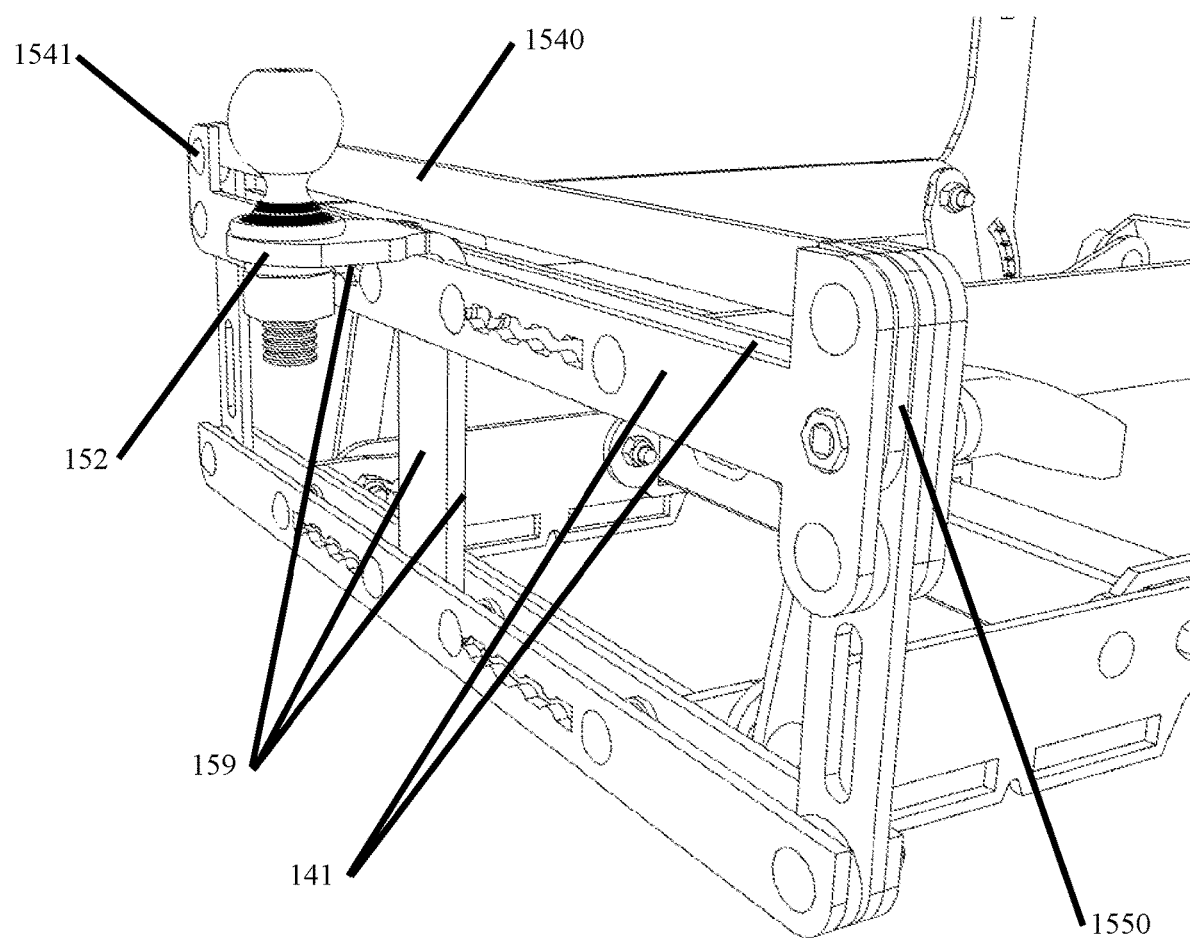
FIG. 17H shows a front perspective view of a modular lift conversion system with a closed and locked safety bar and a modular trailer hitch implement installed according to an embodiment of the subject invention.

FIG. 17H shows a front perspective view of a modular lift conversion system with a closed safety bar 1540, held at a first end by pivot 1541 and at a second end by locked safety bar lock 1550, Also shown is a modular trailer ball implement 152 installed according to an embodiment of the subject invention. One or more mounting bars 141 support the modular trailer ball implement 152 by contacting support surfaces 159.

Figure 18A:
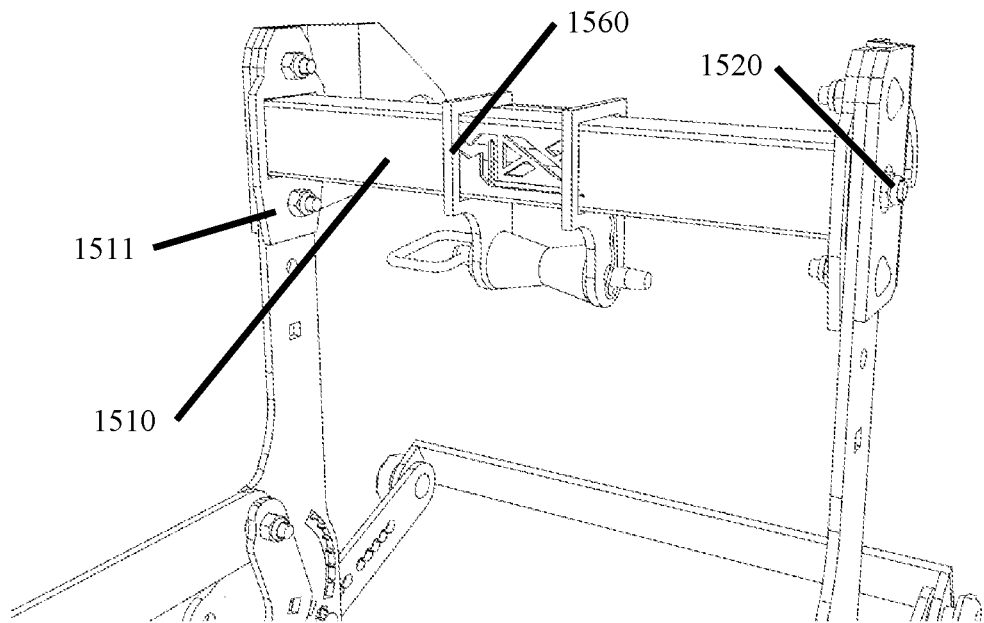
FIG. 18A shows a modular lift conversion system with a modular tension rod on the fixed frame, a modular compression bar on the fixed frame, and a modular interface point on the fixed frame according to an embodiment of the subject invention.

FIG. 18A shows a modular lift conversion system with a modular tension member 1520 on the fixed frame, a modular compression member 1510 on the fixed frame, and a modular accessory bracket 1560 on the fixed frame according to an embodiment of the subject invention. As opposed to using welds, the modular lift conversion system in this embodiment is fastened together by a tension member 1520 comprising a threaded rod. In this embodiment, the threaded rod generates inward pressure between opposing frame members against the center square tubing of the compression member 1510. The threaded rod runs inside of the center square tubing. Thus, when the nuts on the threaded rod are tightened, the opposing frame members become securely affixed to the center square tubing, and to one another.

Figure 18B:
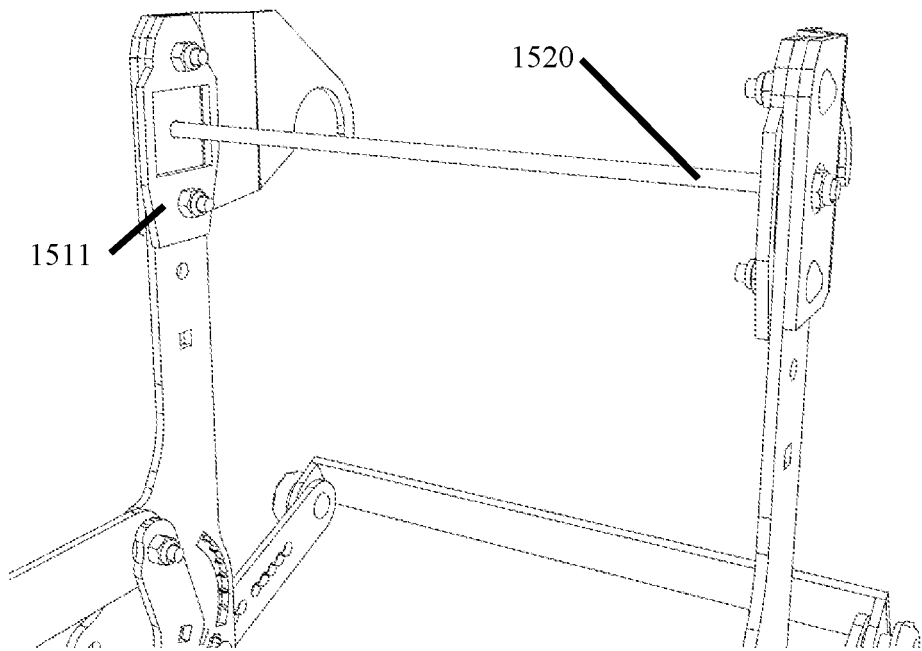
FIG. 18B shows a modular lift conversion system with a modular tension rod on the fixed frame according to an embodiment of the subject invention. The modular compression bar on the fixed frame and the modular interface point on the fixed frame are hidden from this view to better show the modular tension rod and other components.

FIG. 18B shows a modular lift conversion system with a modular tension member 1520 on the fixed frame according to an embodiment of the subject invention. The modular compression member 1510 on the fixed frame and the modular accessory bracket 1560 (e.g., supporting one or more interface points 160A, 160B) on the fixed frame are hidden from this view to better show the modular tension member 1520, capture bracket 1511, and other components. In this embodiment the threaded rod runs inside the tension member (e.g., square tube, not shown), and the square tube is located and/or stabilized by the capture brackets (e.g., square tube brackets). In alternative embodiments the function of the capture brackets 1511 is provided by one or more brackets of a different shape, by specific features advantageously arranged on other components, or by one or more flanges, extensions, extrusions, flaps, slots, recesses, tabs, bolts, studs, other fasteners, or other geometric features (e.g., folded sheet metal features including folded, punched, or lanced tabs or protrusions) configured and adapted to hold the compression member 1510, the tension member 1520, or both in place during and after assembly.

Figure 18C:
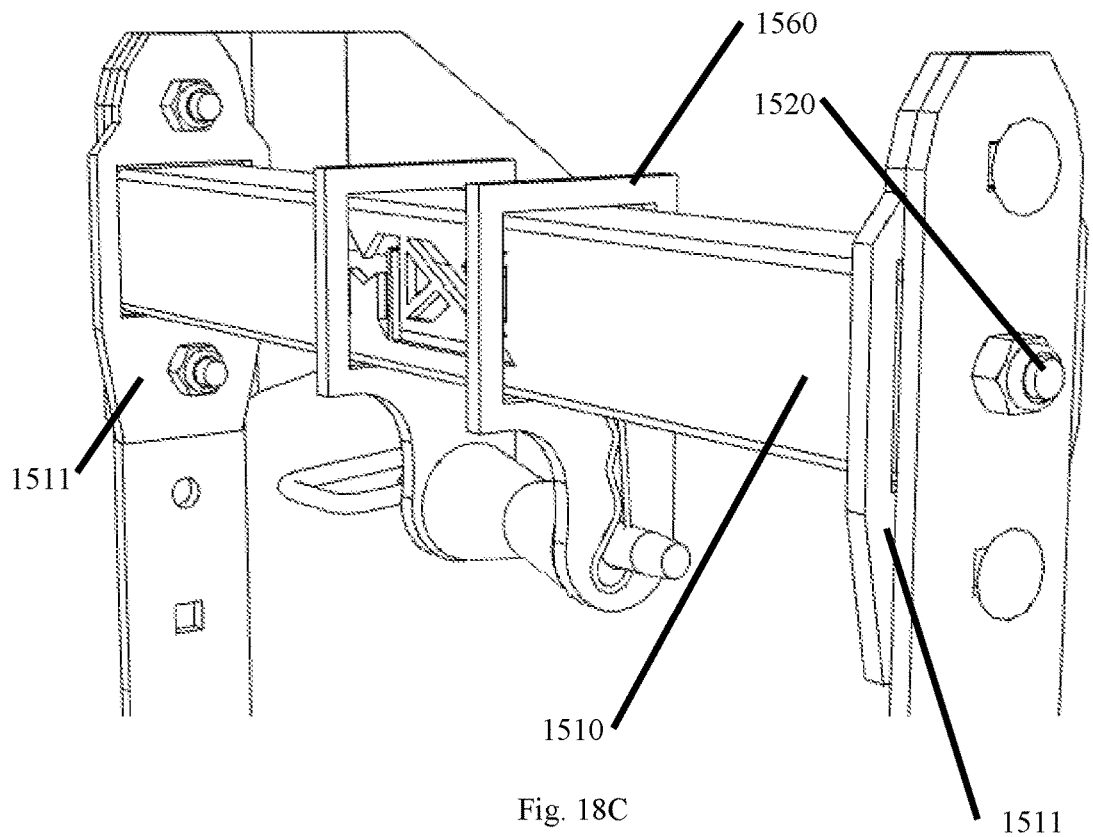
FIG. 18C shows a detailed view of the modular lift conversion system of FIG. 18A, according to an embodiment of the subject invention.

FIG. 18C shows a detailed view of the modular lift conversion system of FIG. 18A, according to an embodiment of the subject invention. In this embodiment the threaded rod of the tension member 1520 generates inward pressure on the opposing frame members against the center square tubing of the compression member 1510, which is held in place by the capture brackets 1511.

Figure 18D:
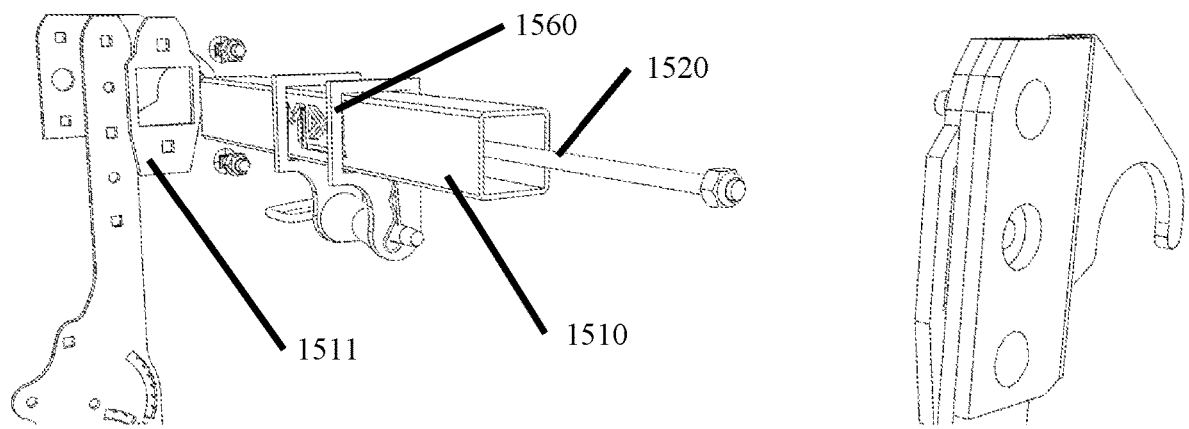
FIG. 18D shows a partially exploded detailed view of the modular lift conversion system of FIG. 18A, according to an embodiment of the subject invention.

FIG. 18D shows a partially exploded detailed view of the modular lift conversion system of FIG. 18A, according to an embodiment of the subject invention. In this embodiment the threaded rod of the tension member 1520 generates inward pressure on the opposing frame members against the center square tubing of the compression member 1510, which is held in place by the capture brackets 1511, thus supporting modular accessory bracket 1560 (e.g., supporting one or more interface points 160A, 160B).

Figure 18E:
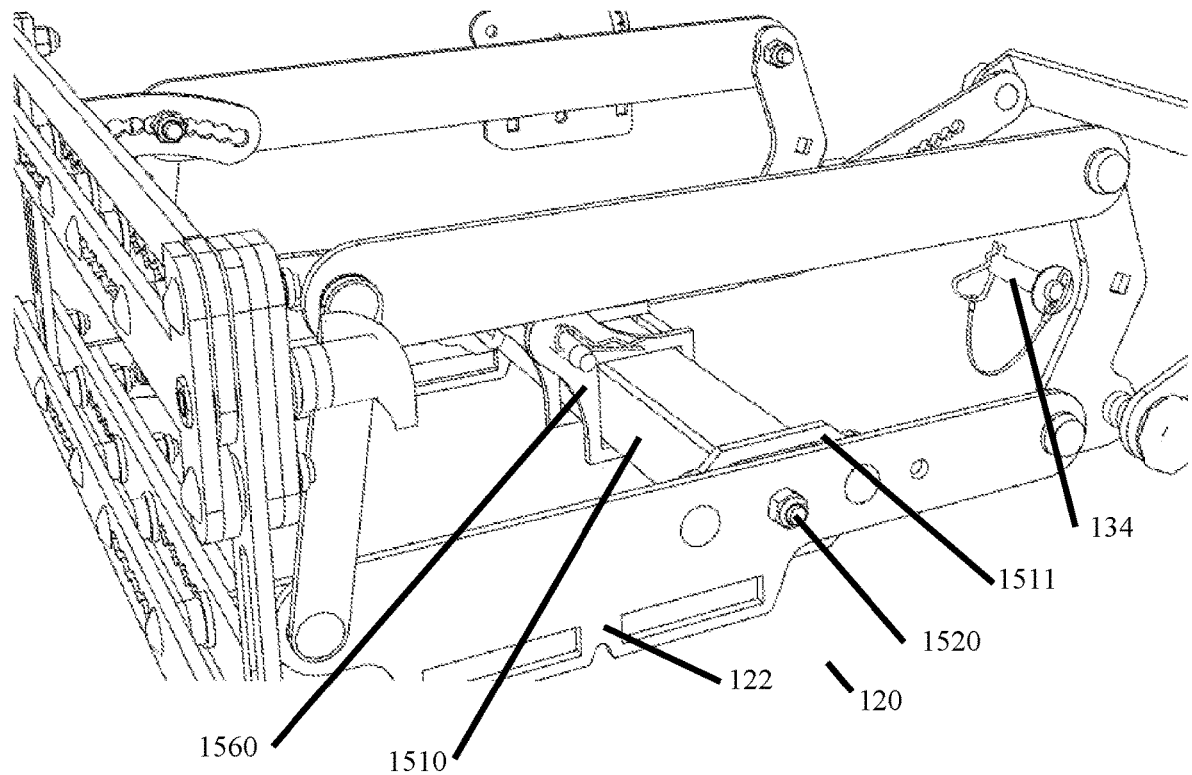
FIG. 18E shows a detailed view of the movable frame of a modular lift conversion system with a modular tension rod on the movable frame, a modular compression bar on the movable frame, and a modular interface point on the movable frame according to an embodiment of the subject invention.

FIG. 18E shows a detailed view of the movable frame 120 of a modular lift conversion system with a modular tension member 1520 on the movable frame, a modular compression member 1510 on the movable frame, and a modular accessory bracket 1560 (e.g., supporting one or more interface points 160A, 160B) on the movable frame according to an embodiment of the subject invention. In this embodiment the tension member 1520 is used to structurally join two opposing lower arms 122 together through the compression member 1510. This gives the lower arm set and the movable frame 120 enhanced rigidity. The square tubing of the compression member 1510 also serves to support and locate the modular accessory bracket 1560 (e.g., supporting one or more interface points 160A, 160B) (e.g., for attaching a winch hook). When an attached winch cable is retracted, upward force is applied to the modular accessory bracket 1560 (e.g., supporting one or more interface points 160A, 160B) and to the lower arm set through the square tubing of the compression member 1510, thus lifting the lower arm set, and thus lifting the entire movable frame 120 up and around the pivot points.

Figure 18F:
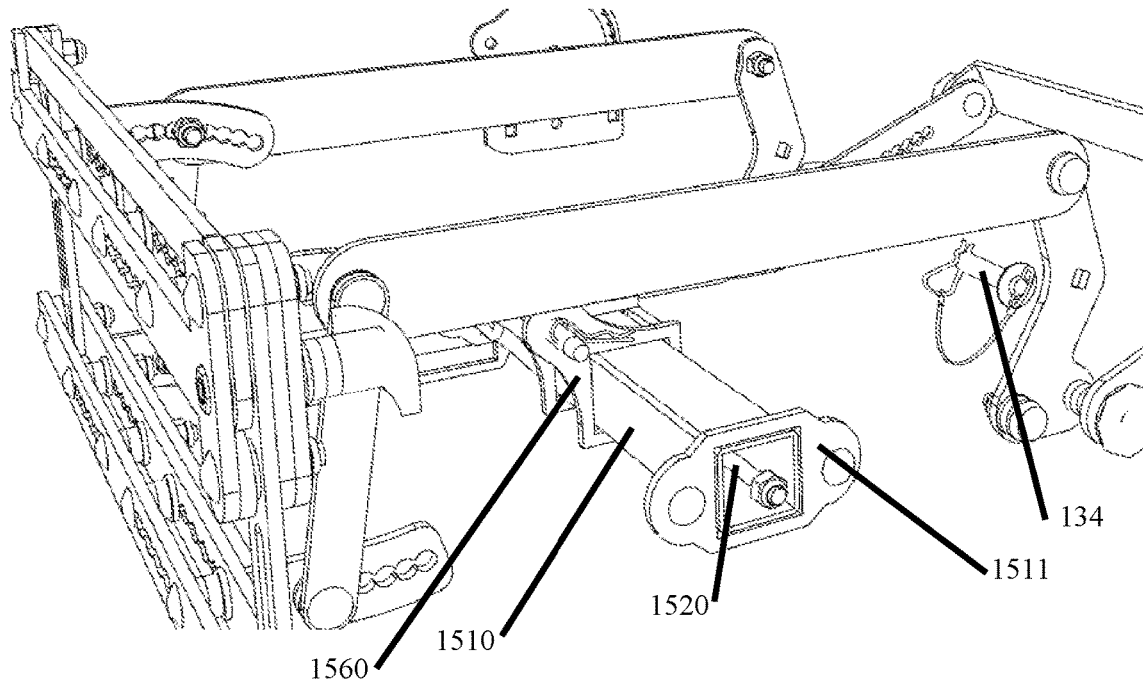
FIG. 18F shows a partially exploded detailed view of the modular lift conversion system of FIG. 18E, according to an embodiment of the subject invention. The lower arm of the movable frame is hidden from this view to better show the modular compression bar, modular tension rod, and other components.

FIG. 18F shows a partially exploded detailed view of the modular lift conversion system of FIG. 18E, according to an embodiment of the subject invention. The lower pivot arm 122 of the movable frame 120 is hidden from this view to better show the modular compression member 1510, modular tension member 1520, and other components.

The subject invention may be understood in part by reference to certain exemplary and non-limiting embodiments, including the following examples.

Embodiment 1

A stowable, modular lift conversion system 100 configured for aftermarket application to a truck hitch receiver, all-terrain vehicle (ATV), or utility task vehicle (UTV), the system comprising:
  a fixed frame 110 configured to mount to the vehicle, the fixed frame comprising:
    an opposing pair of vertical frame members 111 having a frame height H and a frame depth D, separated by a frame width W, wherein the frame height, the frame depth, and the frame width define the confines of the fixed frame; the frame height H optionally being between 16.75 and 28.75 inches, the frame width W optionally being between 10 and 22 inches, and the frame depth D optionally being between 6 and 14 inches,
    an upper pivot point 112 on each of the vertical frame members, and
    a lower pivot point 112 on each of the vertical frame members; and
  a movable frame 120 configured to lift loads and movable from a stowed configuration to an extended or deployed configuration, the movable frame comprising:
    an opposing pair of upper pivot arms 121, each having a near end 121A respectively connected to one of the upper pivot points, and a far end 121B opposite the near end,
    an opposing pair of lower pivot arms 122, each having a near end 122A respectively connected to one of the lower pivot points, and a far end 122B opposite the near end,
    an opposing pair of x-plates 130, each connected to the far end of one of the upper pivot arms, and to the far end of one of the lower pivot arms, and
    a modular implement base 140 connecting the opposing pair of x-plates;
  wherein the movable frame is configured to fit within the confines of the fixed frame when in a stowed configuration.

In this and other embodiments, the frame height H can be greater than both the fame width W and the frame depth D. The frame width can be greater than the frame depth. The frame height can be about 1.5 times the frame width, alternatively about 1.25, 1.75, 2.0, 2.5, 3, 4, 5, or 10 times the frame width, including ranges, increments, and combinations thereof (e.g., the frame height can be between about 1.5 and 2.0 times the frame width, e.g., for application to a vehicle which is either tall or narrow or both, such as an off-road UTV or ATV.) The frame height can be about 3 times the frame depth, alternatively about 2.0, 2.5, 3.5, 4, 5, 6, 7, 8, 9, 10, 15, or 20 times the frame depth, including ranges, increments, and combinations thereof (e.g., the frame height can be between about 2.5 and 3.5 times the frame depth.) The frame width can be about 2 times the frame depth, alternatively about 1.0, 1.5, 2.5, 3.5, 4, 5, 6, 7, 8, 9, 10, 15, or 20 times the frame depth, including ranges, increments, and combinations thereof (e.g., the frame width can be between about 1.5 and 2.5 times the frame depth.)

In this and other embodiments, the frame width W can be greater than both the fame height H and the frame depth D. The frame height can be greater than the frame depth. The frame width can be about 1.5 times the frame height, alternatively about 1.25, 1.75, 2.0, 2.5, 3, 4, 5, or 10 times the frame height, including ranges, increments, and combinations thereof (e.g., the frame width can be between about 1.5 and 2.0 times the frame height, e.g., for application to a vehicle which is either low or wide or both, such as a small-wheeled truck or car.)

The specification of frame height H, frame width W, and frame depth D, either independently or in concert can advantageously be chosen to provide maximum lifting power, lifting range, speed of motion, or security of the lift assembly when installed. Of particular advantage in certain embodiments be the ratios providing a large height in comparison to the width or depth, that takes advantage of the unique design of the subject invention to provide a large lifting range in a compact space (e.g., a relatively smaller frame width or frame depth for a relatively larger frame height; e.g., a frame height about 1, 1.25, 1.5, 1.75, 2, 2.5, 3, 3.5, 4, 4.5, 5 times the frame width including ranges, increments, and combinations thereof or about 2, 3, 4, 5, 6, 7, 8, 9, or 10 times the fame depth including ranges, increments, and combinations thereof; e.g., a frame height between 2.4 to 4.6 times the frame width and also about 3.5 to 5.8 times the frame depth), while maintaining modularity and adaptability of the design (e.g., providing the above ratios together with an x-plate, and modular hook mounting feature, a four bar linkage system, or a vertical or near vertical frame member to provide a compact, modular, stowable lift that fits on the available depth and width of a vehicle grill or frame to provide desirable lift, security and ground clearance in operation).

Embodiment 2

The system according to embodiment 1, wherein each vertical frame member 111 and x-plate 130, respectively, operates in a unique vertical plane across the frame width W, such that each of the x-plates 130 can overlap each other and overlap each of the vertical frame members 111 to fit within the confines of the fixed frame 110 when in a stowed configuration. Embodiments provide spacers, bushings, washers, bearings, bosses or other design elements known in the art to ensure proper spacing and support of frame members and lift components together with lateral alignment and rigidity required in a lift in accordance with the subject invention. For example, upper pivot arms 121 or lower pivot arms 122 can be on opposite sides of a vertical frame member 111 and x-plate 130. The arms, frame member, and x-plate can each operate in a unique vertical plane, or the frame member and x-plate can share a vertical plane of operation while the arms each operate in a separate plane. Embodiments provide cut-outs or clearance features (e.g., allowing an x-plate to fit into a cut-out or recess of a vertical frame member operating in the same vertical plane). Embodiments also provide, together or in the alternative, limited vertical height of elements operating in the same or different vertical planes (e.g., allowing an x-plate to extend above the top of a vertical frame member operating in the same vertical plane). Embodiments also provide two or more elements (e.g., two or more of an upper pivot arm 121 or a lower pivot arm 122) operating in the same vertical plane, but configured for sufficient clearance to fit within the confines of the fixed frame 110 when in a stowed configuration. By way of non-limiting example, a lower pivot arm 122 could rest in front of, adjacent, or touching an upper pivot arm 121 or upper pivot point 112 when in a stowed configuration. Alternatively, a first portion of a lower pivot arm 122 could rest in front of, adjacent, or touching a first portion of a lower pivot arm 121 or upper pivot point 112, while a second portion of the lower pivot arm 122 could overlap, clear, or pass adjacent to a second portion of the lower pivot arm 121 or upper pivot point 112, when in a stowed configuration. Embodiments provide one or more notches, slots, holes, concavities, curvatures, to allow two elements to fit more closely together. Embodiments provide one or more spacers, bosses, washers, bushings, or bearings to align members in specific vertical planes in operation or when in a stowed configuration.

Embodiment 3

The system according to embodiment 2, wherein the opposing pair of vertical frame members 111, the opposing pair of upper pivot arms 121, the opposing pair of lower pivot arms 122, and the opposing pair of x-plates 130 form an opposing pair of four-bar linkages configured to maintain a consistent angle between the vertical frame members 111 and the x-plates 130. Embodiments provide parallel four-bar linkages, non-parallel four-bar linkages, adjustable four bar linkages, pivots, lever arms, and other linkages that are not four-bar linkages.

Embodiment 4

The system according to embodiment 3, comprising at least one modular implement (151, 152, 153) configured to mount on the modular implement base 140, wherein the implement is not removable from the modular implement base 140 when in a stowed configuration. Embodiments provide features inhibiting or deterring theft or accidental loss or removal of implements when in a stowed configuration or during operation (e.g., a frame member or protrusion blocking the exit path of an implement).

Embodiments provide a securing element to prevent or inhibit removal of implements. For example, an upper frame member 116 or vertical frame member 111 be configured to be in proximity to and blocking the removal of an implement 151, 152, 153 when in a stowed configuration. Alternatively, a protrusion, a tab, or a key engage with or inhibit motion of an implement in a given configuration (e.g., in a stowed configuration.) By way of non-limiting example, an upper frame member 116 be located vertically above a modular implement base 140 when in a stowed configuration, thus blocking removal of an implement (e.g., 151, 152, 153) and providing benefits including security during transport or theft deterrence during storage.

Embodiment 5

The system according to embodiment 3, the fixed frame comprising a hook 114 configured to drop down onto the vehicle from above and inhibit motion of the fixed frame in more than one direction, and a support surface 115 configured to support the frame against rotation. Embodiments provide a full round, oval, polygonal, square, or angled notch or slot, alternatively two or more flat or curved surfaces, alternatively one or more frame members that inhibit motion of the frame in one or more directions and a second body, face, or surface that inhibits motion of the frame in another direction.

Embodiment 6

The system according to embodiment 5, the system comprising at least two cable interface points (160A, 160B) configured to simultaneously generate a downward force on the fixed frame 110 and an upward force on the movable frame 120 when tension is applied to a cable 171 originating from the vehicle and routed in contact with the two cable interface points. Embodiments provide cable interface points configured to produce a force pulling the lift into contact with the vehicle when tension is applied to the cable.

Embodiment 7

The system according to embodiment 6, the two cable interface points (160A, 160B) comprising at least one of a pulley, a pin, a sliding support, an eyelet, a hook, or a clamp. Embodiments comprise one movable interface point (e.g., a slider or roller) and one fixed interface point (e.g., an eyelet, hook, or clamp).

Embodiment 8

The system according to embodiment 3, the fixed frame 110 configured to mount permanently to the vehicle by means of being integrated into a brush guard permanently mounted to the frame of the vehicle by means of bolts, rivets, clamps, or welding. Embodiments provide a lift with a fixed frame configured to mount to existing holes or structures of the vehicle frame.

Embodiment 9

The system according to embodiment 8, comprising a cable winch 170A configured to generate motion of the movable frame 120 with respect to the fixed frame 110. Embodiments provide a cable winch mounted on the fixed frame with a cable attachment point 160B on the movable frame 120, and optionally a cable slide or pivot 160A mounted on either the fixed frame 110 or the movable frame 120.

Embodiment 10

The system according to embodiment 3, comprising one or more linear actuators 170B configured to generate motion of the movable frame 120 with respect to the fixed frame 110. Embodiments provide electrically powered linear actuators mounted to the fixed frame with a movable end attached to the movable frame.

Embodiment 11

A stowable, modular implement lift system 100 configured for aftermarket application to an existing utility vehicle having an existing rack, guard, or bumper, the lift system comprising:
a vertical hook 114 configured to allow installation of the lift system onto the existing rack, guard, or bumper in a vertical direction, and inhibit motion of the lift system in a non-vertical direction;
a frame member 111 configured to engage an outward surface of the existing rack, guard, or bumper in rotational opposition to the vertical hook such that the lift system is aligned in a vertical or near-vertical orientation when installed;
an upper pivot point 112 on the frame member;
a lower pivot point 113 on the frame member;
an upper arm 121 rotatably connected to the upper pivot point;
a lower arm 122 rotatably connected to the lower pivot point;
an x-plate 130 movable from a stowed configuration to an extended position, the x-plate comprising an adjustable upper pivot point 131, an adjustable lower pivot point 132, and a modular implement base 140; and
at least one modular implement (151, 152, 153) configured to allow installation on the modular implement base 140;
wherein the x-plate 130 is configured to allow adjustment of the modular implement base 140 to align vertically when the lift system is installed on the vehicle.

Embodiment 12

The system according to embodiment 11, at least one of the adjustable upper pivot point 131 or the adjustable lower pivot point 132 comprising a plurality of attachment points selectable to rotatably connect the x-plate 130 to either the upper pivot arm 121 or the lower pivot arm 122 while adjusting an angle of alignment between the x-plate 130 and the frame member 111. The x-plate and respective frame members are affixed to one another by way of a nut and bolt, spring clip, retaining ring, clevis pin, or any other similar device that attaches said frame members to the x-plate but still allows for rotation during raising or lowering.

Embodiment 13

The system according to embodiment 12, wherein each of the frame member 111 and the x-plate 130, respectively, operates in a unique vertical plane across a width of the lift system, such that the x-plate 130 overlaps the frame member 111 at one or more points in operation of the lift system.

It is contemplated that overlap can include fully or partially overlapping components, that the amount of or condition of overlap can change within a configuration or when moving between configurations, and that two components can operate in a unique vertical plane with respect to each other in a case where a portion of a first component overlaps with a second component but another portion of the first component extends into or crosses the vertical plane of the second component. (e.g., one flange of an angle-iron, "L" or "T" cross-section member can operate in a unique vertical plane across the width of the lift system, even though the angled, bent, or flanged portion of the same member does not. In this manner, a first member can overlap a second member in part and operate in a unique vertical plane across a width of the lift system while partially overlapping and while having a portion which extends across or into the unique vertical plane of the second member, either with or without a corresponding or mating notch, cutout, hole, concavity, or opening in the second member. Alternatively, a tab or flange can be extruded, bent, formed, welded, bolted, or riveted in place to form a stop or catch which inhibits overlap or limits travel between two components beyond a specified point but still operates in a unique vertical plane across a width of the lift system, overlaps, and (e.g., in the case of a member of the movable frame 120) fits within the confines of the fixed frame 110 when in a stowed configuration.

Embodiment 14

The system according to embodiment 13, further comprising an actuator (170A or 170B) configured to generate motion of the x-plate 130 with respect to the frame member 111.

Embodiment 15

The system according to embodiment 14, the actuator comprising a winch cable (171A) originating from a winch 170A on the vehicle.

Embodiment 16

The system according to embodiment 14, the actuator comprising a winch cable (171A) originating from a winch 170A mounted to the frame member.

Embodiment 17

The system according to embodiment 14, the actuator comprising a linear actuator 170B.

Embodiment 18

The system according to embodiment 14, comprising at least one modular implement 151, 152, 153 configured to mount on the modular implement base 140, wherein the implement 151, 152, 153 is not removable from the modular implement base 140 when in a stowed configuration.

Embodiment 19

A stowable, modular lift conversion system 100 configured for aftermarket application to a truck, all-terrain vehicle (ATV), or utility task vehicle (UTV), the system comprising:
  a fixed frame 110 configured to mount to the vehicle, the fixed frame comprising:
    an opposing pair of vertical frame members 111 having a frame height H and a frame depth D, separated by a frame width W, wherein the frame height, the frame depth, and the frame width define the confines of the fixed frame 110, and
    an upper pivot point 112 on each of the vertical frame members 111, and
    a lower pivot point 113 on each of the vertical frame members 111; and
  a movable frame 120 configured to lift loads, and movable from a stowed configuration to an extended position, the movable frame comprising:
    an opposing pair of upper pivot arms 121, each having a near end 121A respectively connected to one of the upper pivot points 112, and a far end 121B opposite the near end 121A,
    an opposing pair of lower pivot arms 122, each having a near end 122A respectively connected to one of the lower pivot points 113, and a far end 122B opposite the near end 122A,
    an opposing pair of x-plates 130, each connected to the far end 121B of one of the upper pivot arms 121, and to the far end 122B of one of the lower pivot arms 122, and
    a modular implement base 140 connecting the opposing pair of x-plates 130;
  wherein the movable frame 120 is configured to fit within the confines of the fixed frame 110 when in the stowed configuration;
  wherein each vertical frame member 111 and x-plate 130, respectively, operates in a unique vertical plane across the frame width W, such that the x-plates 130 can overlap each other and overlap each of the vertical frame members 111 to fit within the confines of the fixed frame 110 when in the stowed configuration;
  wherein the opposing pair of vertical frame members, the opposing pair of upper pivot arms, the opposing pair of lower pivot arms, and the opposing pair of x-plates form an opposing pair of four-bar linkages configured to maintain a consistent angle between the vertical frame members and the x-plates;
  wherein the system further comprises at least one modular implement 151, 152, 153 configured to mount on the modular implement base 140, wherein the implement 151, 152, 153 is not removable from the modular implement base 140 when in a stowed configuration;
  wherein the fixed frame 110 further comprises a hook 114 configured to drop down onto the vehicle from above and inhibit motion of the fixed frame 110 in more than one direction when installed, and a support surface 115 configured to support the fixed frame 110 against rotation;
  wherein the system further comprises at least two cable interface points 160A, 160B configured to simultaneously generate a downward force on the fixed frame 110 and an upward force on the movable frame 120 when tension is applied to a cable 171A originating from the vehicle and routed in contact with the two cable interface points 160A, 160B; and
  wherein the two cable interface points 160A, 160B further comprise at least one of a pulley, a pin, a sliding support, an eyelet, a hook, or a clamp.

Embodiment 20

The system according to embodiment 19, each of the x-plates 130 comprising an adjustable upper pivot point 131 and an adjustable lower pivot point 132, for connecting to the far end of one of the upper pivot arms 121, and to the far end of one of the lower pivot arms 122, respectively;
  wherein each of the x-plates 130 is configured to allow adjustment of the modular implement base 140 to align vertically when the lift system is installed on the vehicle;
  wherein at least one of the adjustable upper pivot point 112 or the adjustable lower pivot point 113 on each of the x-plates 130 comprises a plurality of attachment points selectable to rotatably connect the x-plate 130 to the far end 121B of one of the upper pivot arms 121, or to the far end 122B of one of the lower pivot arms 122, respectively, while adjusting an angle of alignment between the x-plate 130 and the fixed frame 110; and
  wherein the system further comprises an actuator configured to generate motion of the x-plate with respect to the frame member, the actuator comprising a winch cable 171A originating from a winch 170A on the vehicle.

Embodiment 21

A passive lift conversion system (200) configured for aftermarket application to a vehicle, the system comprising:

a fixed frame 210 configured to mount to the vehicle, the fixed frame comprising:
  an opposing pair of vertical frame members 211, and
  an opposing pair of vertical guiderail 212 each attached to one of the vertical frame members, respectively; and
a movable frame 220 configured to lift loads, and movable from a stowed configuration to an extended position, the movable frame comprising:
  an opposing pair of rail followers 221, each movably connected to one of the respective vertical guiderails, and
  a modular implement base 140 connecting the opposing pair of rail followers; and
at least two cable interface points (160A, 160B) configured to simultaneously generate a downward force on the fixed frame and an upward force on the movable frame when tension is applied to a cable originating from the vehicle and routed in contact with the two cable interface points.

Embodiment 22

The system according to embodiment 21, the two cable interface points comprising at least one of a pulley, a pin, a sliding support, an eyelet, a hook, or a clamp.

Embodiment 23

The system according to embodiment 22, the two cable interface points comprising a roller bar 160A and an attachment point 160B.

Embodiment 24

The system according to embodiment 23, comprising at least one modular implement (151, 152, 153) configured to mount on the modular implement base.

Embodiment 25

The system according to embodiment 23, the fixed frame comprising a hook 114 configured to drop down onto the vehicle from above and inhibit motion of the fixed frame 110 in more than one direction when installed, and a support surface configured to support the frame against rotation.

Embodiment 26

A lift conversion system configured to affix on a brush guard, bumper, or frame of an all-terrain or utility-task vehicle, the system comprising:
  a hook 114 having a vertical entrance located a distance away from the center of mass of the system, configured to drop down onto the vehicle vertically;
  a vertical support surface 115 located between the hook and the center of mass of the system, configured to hang in place on the vehicle at a vertical or nearly vertical angle when the system is installed on the vehicle;
  a vertical guiderail 212 supported by an interaction of the hook and the support surface against the brush guard, bumper, or frame of the vehicle;
  a modular implement base 140 slidably mounted on the vertical guiderail; and
  at least two cable interface points (160A, 160B) configured to simultaneously generate an additional downward force on the fixed frame and an upward force on the modular implement base when tension is applied to a cable originating from the vehicle and routed in contact with the two cable interface points.

Embodiment 27

The system according to embodiment 26, the at least two cable interface points comprising at least one roller bar 160A and at least one attachment point 160B. Wherein the roller bar can comprise a pulley or pulley bar having one or more sidewalls, guides, or depressions configured to guide or align the cable.

Embodiment 28

The system according to embodiment 27, the at least one attachment point 160B attached to the modular implement base.

Embodiment 29

A lift conversion system (200) configured to affix on a brush guard, bumper, or frame of an all-terrain or utility-task vehicle, the system comprising:
  a hook 114 having a vertical entrance located a distance away from the center of mass of the system, configured to drop down onto the vehicle vertically;
  a vertical support surface 115 located between the hook and the center of mass of the system, configured hang in place on the vehicle at a vertical or nearly vertical angle when the system is installed on the vehicle;
  a vertical guiderail 212 supported by an interaction of the hook and the support surface against the brush guard, bumper, or frame of the vehicle;
  a modular implement base 140 slidably mounted on the vertical guiderail; and
  a linear actuator 170B configured to move the modular implement base along the vertical guiderail when supplied with power from a remote source.

Embodiment 30

The system according to embodiment 29, wherein the linear actuator is configured to receive power from a rotary hand tool, a manual crank arm, or a cordless power tool battery.

Embodiment 31

The system according to embodiment 30, wherein the linear actuator is configured to receive mechanical power from a rotary hand tool.

Embodiment 32

The system according to embodiment 30, wherein the linear actuator is configured to receive electrical power from a cordless hand tool battery 320.

Embodiment 33

The system according to embodiment 29, wherein the linear actuator is configured to move the modular implement base directly. (not shown)

Embodiment 34

The system according to embodiment 29, wherein the linear actuator is configured to move the modular implement base indirectly. (see, e.g., FIG. 4B)

Embodiment 35

The system according to embodiment 29, wherein the linear actuator is configured to move the modular implement base indirectly by acting on a cable, the cable connected at a first end to an attachment point attached to either the vehicle or the system, the cable connected at a second end to an attachment point attached to the modular implement base. (see, e.g., FIG. 4A)

Embodiment 36

The system according to embodiment 29, wherein the linear actuator is configured to move the modular implement base two inches for every one inch or extension of the linear actuator. (see, e.g., FIG. 4A)

Embodiment 37

A stowable modular lift conversion system (1500) configured for application to a vehicle, the system comprising:
- a fixed frame (110) configured to mount to the vehicle, the fixed frame comprising:
- an opposing pair of vertical frame members (111),
- a first compression member (1510) captured between the opposing pair of vertical frame members (111),
- a first tension member (1520) configured and adapted to generate inward pressure between opposing frame members against the first compression member (1510),
- an upper pivot point (112) on each of the vertical frame members (111),
- a lower pivot point (113) on each of the vertical frame members (111),
- a hook (114) configured to inhibit translational motion of the fixed frame (110) in more than one direction, and
- a multiaxial adjustable brace (1570) comprising a support surface (115) configured to support the fixed frame (110) against rotation; and
- a movable frame (120) configured and adapted to lift a load and to move from a stowed configuration to an extended position, the movable frame comprising:
- an opposing pair of upper pivot arms (121), each having a near end (121A) respectively connected to one of the upper pivot points (112), and a far end (121B) opposite the near end,
- an opposing pair of lower pivot arms (122), each having a near end (122A) respectively connected to one of the lower pivot points (113), and a far end (122B) opposite the near end,
- a second compression member (1510) captured and located between either the opposing pair of upper pivot arms (121), or the opposing pair of lower pivot arms (122),
- a second tension member (1520) configured and adapted to generate inward pressure between opposing pivot arms (121, or 122) against the second compression member (1510),
- an opposing pair of adaptive mounting plates (1530), each connected to the far end (121B) of one of the upper pivot arms (121) or to the far end (122B) of one of the lower pivot arms (122),
- a modular implement base (140) connected to the opposing pair of adaptive mounting plates (1530), and
- a safety bar (1540) movable from an open position to a closed position with respect to the modular implement base (140);
- wherein the modular implement base (140) and the safety bar (1540) are each respectively adapted and configured such that a multiplicity of modular implements (151), (152), (153) can be detached from the modular implement base when the safety bar (1540) is in the open position, but not when the safety bar (1540) is in the closed position.

Embodiment 38

The system according to embodiment 37, comprising a safety bar lock (1550) movable from a locked configuration to an unlocked configuration, the safety bar lock (1550) configured and adapted to selectively inhibit movement of the safety bar (1540) from the closed position to the open position when in the locked configuration.

Embodiment 39

The system according to embodiment 38, wherein the opposing pair of vertical frame members (111), the opposing pair of upper pivot arms (121), the opposing pair of lower pivot arms (122), and the opposing pair of adaptive mounting plates (1530) form an opposing pair of four-bar linkages configured to maintain a desired angle between the vertical frame members (111) and the adaptive mounting plates (1530).

Embodiment 40

The system according to embodiment 39, wherein the opposing pair of adaptive mounting plates are a first opposing pair of adaptive mounting plates (1530) and the opposing pair of four-bar linkages further comprise a second opposing pair of adaptive mounting plates (1530) and an optional stabilizer link (1531) pivotably connected between the opposing pair of upper pivot arms (121), the opposing pair of lower pivot arms (122).

Embodiment 41

The system according to embodiment 37, wherein at least one vertical frame member (111) of the opposing pair of vertical frame members (111) connects at least one upper pivot point (112), at least one lower pivot point (113), the hook (114), and the multiaxial adjustable brace (1570).

Embodiment 42

The system according to embodiment 41, comprising at least two cable interface points (160A), (160B) configured to simultaneously generate a downward force on the fixed frame and an upward force on the movable frame when tension is applied to a cable (171) originating from the vehicle and routed in contact with the two cable interface points.

Embodiment 43

The system according to embodiment 42, wherein the two cable interface points (160A), (160B) comprise a roller (160A), and an attachment point (160B) both operating in a vertical plane aligned with a center of mass of the system; the attachment point (160B) configured to detachably receive a winch hook at a first end of the cable.

Embodiment 44

The system according to embodiment 43, wherein the fixed frame (110) is configured and adapted to mount to and dismount from the vehicle by manual operation without hand tools after an optional initial assembly of the fixed frame (110) with hand tools.

Embodiment 45

The system according to embodiment 37, comprising an actuator (170A or 170B) configured to receive power from a cordless hand tool battery (320), and configured to generate motion of the movable frame (120) with respect to the fixed frame (110).

Embodiment 46

The system according to embodiment 39, comprising an actuator (170A or 170B) configured to receive power from a cordless hand tool battery (320), and configured to generate motion of the movable frame (120) with respect to the fixed frame (110).

Embodiment 47

The system according to embodiment 40, wherein the modular implement base (140) connects the first opposing pair of adaptive mounting plates (1530) and the second opposing pair of adaptive mounting plates (1530).

Embodiment 48

The system according to embodiment 37, wherein the opposing pair of adaptive mounting plates (1530) comprises a multiplicity of adjustable pivot points aligned in a circle, a curve, or an arc.

Embodiment 49

The system according to embodiment 48, wherein the circle, the curve, or the arc is centered between the far end (121B) of one of the upper pivot arms (121), and the far end (122B) of one of the lower pivot arms (122) when the system is assembled for use in lifting the load.

Embodiment 50

The system according to embodiment 48, wherein the circle, the curve, or the arc is centered at the far end (121B) of one of the upper pivot arms (121), or at the far end (122B) of one of the lower pivot arms (122) when the system is assembled for use in lifting the load.

Embodiment 51

The system according to embodiment 48, wherein the circle, the curve, or the arc is centered beyond the far end (121B) of one of the upper pivot arms (121), or at the far end (122B) of one of the lower pivot arms (122) when the system is assembled for use in lifting the load.

Embodiment 52

The system according to embodiment 37, wherein the opposing pair of adaptive mounting plates (1530) comprise an opposing pair of connection points, configured and adapted to align and connect with the opposing far ends (121B) of the opposing upper pivot arms (121), or the opposing far ends (122B) of the opposing lower pivot arms (122), or both, when the system is assembled for use in lifting the load.

Embodiment 53

The system according to embodiment 37, wherein the hook (114) is configured and adapted to removably drop down onto the vehicle from above and the multiaxial adjustable brace (1570) is configured and adapted to locate the support surface (115) in contact with the vehicle and support the fixed frame at a desired position and orientation on the vehicle.

Embodiment 54

A modular implement lift conversion system (1500) configured for application to an existing utility vehicle having an existing rack, guard, or bumper, the lift system comprising:
 a frame member (111) having a hook (114) connected or integral thereto, the hook (114) configured to allow installation of the lift system onto the existing rack, guard, or bumper in a vertical direction, and inhibit motion of the lift system in a non-vertical direction;
 a multiaxial support brace (1570) connected to the frame member (111) and comprising a support surface (115) configured to engage an outward surface of the existing rack, guard, or bumper in rotational opposition to the hook such that the lift system is aligned in a vertical or near-vertical orientation when installed;
 an upper pivot point (112) on the frame member;
 a lower pivot point (113) on the frame member;
 an upper arm (121) rotatably connected to the upper pivot point (112);
 a lower arm (122) rotatably connected to the lower pivot point (113);
 an adaptive mounting plate (1530) comprising an adjustable upper pivot point (131), or an adjustable lower pivot point (132);
 a modular implement base (140) connected to the adaptive mounting plate (1530); and
 at least one modular implement (151), (152), (153) configured to allow installation on and removal from the modular implement base (140);
 wherein the frame member (111) connects the upper pivot point (112), the lower pivot point (113), the hook (114), and the multiaxial support brace (1570);
 wherein the adaptive mounting plate (1530) is configured to allow adjustment of the modular implement base (140) to align vertically when the lift system is installed on the utility vehicle.

Embodiment 55

The system according to embodiment 54, wherein the frame member (111) comprises a first plurality of attachment points, and the multiaxial support brace (1570) comprises a second plurality of attachment points, a combination of respective attachment points selectable to rotatably and translatably connect the multiaxial support brace (1570) to the frame member (111) while adjusting an angle of alignment and a position between the multiaxial support brace (1570) and the frame member (111).

Embodiment 56

The system according to embodiment 55, wherein either the first or second plurality of attachment points is arranged in a pattern comprising one or more arcuate sections, and the other plurality of attachment points is arranged in a pattern comprising either a linear array or a complimentary curve.

Embodiment 57

The system according to embodiment 55, comprising:
an attachment point (160B) kinematically linked to the modular implement base (140) and configured to detachably receive a winch hook at a first end of a winch cable; and
a roller (160A) kinematically linked to the frame member (111) and configured to support a portion of the winch cable;
wherein the attachment point (160B) and the roller (160A) both operate in a vertical plane aligned with a center of mass of the system; and
wherein a tension in the cable transmits over the roller (160A) and generates a reaction force in the attachment point (160B) such that the modular implement base is urged upwards to lift a load.

Embodiment 58

The system according to embodiment 55, comprising:
a roller (160A) configured and adapted to support a winch cable (171); and
an attachment point (160B) configured to detachably receive a winch hook at a first end of the winch cable (171);
both the roller (160A), and the attachment point (160B) operating in a vertical plane aligned with a center of mass of the system and configured to generate motion of the adaptive mounting plate (1530) with respect to the frame member (111) when a tension is applied to the winch cable (171).

Embodiment 59

The system according to embodiment 55, further comprising an actuator comprising a linear actuator (170B) configured to receive power from a cordless hand tool battery (320) and configured to generate motion of the adaptive mounting plate (1530) with respect to the frame member (111).

Embodiment 60

A modular implement lift conversion system (1500) configured for application to an existing vehicle having an existing rack, guard, or bumper, the lift system comprising:
a frame member (111) having a hook (114) connected or integral thereto, the hook (114) configured to allow installation of the lift system onto the existing rack, guard, or bumper in a vertical direction, and inhibit motion of the lift system in a non-vertical direction, the frame member (111) connected to or comprising a support surface (115) configured to engage an outward surface of the existing rack, guard, or bumper in rotational opposition to the hook such that the lift system is aligned in a vertical or near-vertical orientation when installed on the vehicle;
an upper pivot point (112) on the frame member;
a lower pivot point (113) on the frame member;
an upper arm (121) rotatably connected to the upper pivot point (112);
a lower arm (122) rotatably connected to the lower pivot point (113);
a modular implement base (140) connected to the upper arm (121) and the lower arm (122) by one or more adaptive mounting plates (1530); and
at least one modular implement (151), (152), (153) configured to allow installation on and removal from the modular implement base (140); and
a safety bar (1540) configured and adapted to selectively inhibit removal of the at least one modular implement (151), (152), (153) when installed on the modular implement base (140).

Embodiment 61

The system according to embodiment 60, comprising a safety bar lock (1550) configured and adapted to selectively inhibit motion of the safety bar (1540).

Embodiment 62

The system according to embodiment 61, wherein the modular implement base (140) comprises a mounting bar (141) extending across a width (w) of the modular implement base (140); wherein the at least one modular implement (151), (152), (153) comprises one or more contact support surfaces (159) configured and adapted to drop down onto the mounting bar (141) and to inhibit forward, backward, or further downward motion by contact with the mounting bar.

Embodiment 63

The system according to embodiment 62, the safety bar (1540) extending across a width (w) of the modular implement base (140) above the mounting bar (141), the safety bar (1540) adapted and configurable in a closed position to inhibit upward motion of the at least one modular implement (151), (152), (153) and in an open position to allow upward motion of the at least one modular implement (151), (152), (153).

Embodiment 64

The system according to embodiment 63, the safety bar (1540) being held at a first end by a pivot (1541) rotatable from the closed position to the open position.

Embodiment 65

The system according to embodiment 64, the safety bar (1540) secured in the closed position by the safety bar lock (1550).

Embodiment 66

A modular implement lift conversion system (1500) configured for application to an existing utility vehicle having an existing rack, guard, or bumper, the lift system comprising:

a frame member (111) connected to or comprising a hook (114) configured to allow installation of the lift system onto the existing rack, guard, or bumper in a vertical direction, and inhibit motion of the lift system in a non-vertical direction, the frame member (111) connected to or comprising a support surface (115) configured to engage an outward surface of the existing rack, guard, or bumper in rotational opposition to the hook such that the lift system is aligned in a vertical or near-vertical orientation when installed;

a modular implement base (140) movably connected to the frame member (111) through one or more adaptive mounting plates (1530); and at least one modular implement (151), (152), (153) configured to allow installation on and removal from the modular implement base (140); and a safety bar (1540) configured and adapted to selectively inhibit removal of the at least one modular implement (151), (152), (153) installed on the modular implement base (140).

Embodiment 67

The system according to embodiment 66, comprising a safety bar lock (1550) configured and adapted to selectively inhibit motion of the safety bar (1540).

Embodiment 68

The system according to embodiment 67, wherein the modular implement base (140) comprises a mounting bar (141) extending across a width (w) of the modular implement base (140); wherein the at least one modular implement (151), (152), (153) comprises one or more contact support surfaces (159) configured and adapted to drop down onto the mounting bar (141) and to inhibit forward, backward, or further downward motion by contact with the mounting bar.

Embodiment 69

The system according to embodiment 68, the safety bar (1540) extending across a width (w) of the modular implement base (140) above the mounting bar (141), the safety bar (1540) adapted and configurable in a closed position to inhibit upward motion of the at least one modular implement (151), (152), (153) and in an open position to allow upward motion of the at least one modular implement (151), (152), (153).

Embodiment 70

The system according to embodiment 69, the safety bar (1540) being held at a first end by a pivot (1541) rotatable from the closed position to the open position.

Embodiment 71

The system according to embodiment 70, the safety bar 15400 secured in the closed position by the safety bar lock (1550).

Embodiment 72

A modular implement lift system (1500) configured for application to an existing utility vehicle having an existing rack, guard, or bumper, the lift system comprising:

a frame member (111) connected to or comprising a vehicle mount (114B), the vehicle mount (114B) configured to secure the lift system onto the vehicle such that the lift system is aligned in a vertical or near-vertical orientation when installed;

a modular implement base (140) movably connected to the frame member (111) through one or more adaptive mounting plates (1530);

at least one modular implement (151), (152), (153) configured to allow installation on and removal from the modular implement base (140); and a safety bar (1540) configured and adapted to selectively inhibit removal of the at least one modular implement (151), (152), (153) installed on the modular implement base (140).

Embodiment 73

The system according to embodiment 72, comprising a safety bar lock (1550) configured and adapted to selectively inhibit motion of the safety bar (1540).

Embodiment 74

The system according to embodiment 73, wherein the modular implement base (140) comprises a mounting bar (141) extending across a width (w) of the modular implement base (140); wherein the at least one modular implement (151), (152), (153) comprises one or more contact support surfaces (159) configured and adapted to drop down onto the mounting bar (141) and to inhibit forward, backward, or further downward motion by contact with the mounting bar.

Embodiment 75

The system according to embodiment 74, the safety bar (1540) extending across a width (w) of the modular implement base (140) above the mounting bar (141), the safety bar (1540) adapted and configurable in a closed position to inhibit upward motion of the at least one modular implement (151), (152), (153) and in an open position to allow upward motion of the at least one modular implement (151), (152), (153).

Embodiment 76

The system according to embodiment 75, the safety bar (1540) being held at a first end by a pivot (1541) rotatable from the closed position to the open position.

Embodiment 77

The system according to embodiment 76, the safety bar (1540) secured in the closed position by the safety bar lock (1550).

Embodiment 78

The system according to embodiment 75, the safety bar (1540) being held at a first end by a sliding joint (1542) movable from the closed position to the open position.

Embodiment 79

The system according to embodiment 78, the safety bar (1540) secured in the closed position by the safety bar lock (1550).

Embodiment 80

The system according to embodiment 75, the safety bar (1540) being separable from the modular implement base (140) when moving from the closed position to the open position.

Embodiment 81

The system according to embodiment 80, the safety bar (1540) secured in the closed position by the safety bar lock (1550).

Embodiment 82

A modular implement lift conversion system (1500) configured for application to an existing utility vehicle having an existing rack, guard, or bumper, the lift system comprising:
- a fixed frame (110) configured to mount to the existing rack, guard, or bumper, the fixed frame comprising:
- an opposing pair of vertical frame members (111) having a hook (114) connected or integral thereto, the hook (114) configured to allow installation of the lift system onto the existing rack, guard, or bumper in a vertical direction and inhibit motion of the lift system in a non-vertical direction,
- a support surface (115) configured to engage the existing rack, guard, or bumper in rotational opposition to the hook such that the lift system is aligned in a vertical or near-vertical orientation when installed,
- a first compression member (1510) captured between the opposing pair of vertical frame members (111),
- a first tension member (1520) configured and adapted to generate inward pressure between opposing frame members against the first compression member (1510),
- an upper pivot point (112) on each of the vertical frame members (111), and
- a lower pivot point (113) on each of the vertical frame members (111); and
- a movable frame (120) configured to lift a load, the movable frame comprising:
- an opposing pair of upper pivot arms (121), each having a near end (121A) respectively connected to one of the upper pivot points (112), and a far end (121B) opposite the near end,
- an opposing pair of lower pivot arms (122), each having a near end (122A) respectively connected to one of the lower pivot points (113), and a far end (122B) opposite the near end,
- an opposing pair of adaptive mounting plates (1530), each connected to the far end (121B) of one of the upper pivot arms (121), or to the far end (122B) of one of the lower pivot arms (122), or to both;
- a modular implement base (140) connecting the opposing pair of adaptive mounting plates (1530),
- the modular implement base (140) configured and adapted such that in at least one configuration a multiplicity of modular implements (151), (152), (153) can be attached or detached to and from the modular implement base.

Embodiment 83

The system according to embodiment 82, comprising a second compression member (1510) captured and located between either the opposing pair of upper pivot arms (121) or the opposing pair of lower pivot arms (122) and a second tension member (1520) configured and adapted to generate inward pressure between opposing pivot arms (121), (122) against the second compression member (1510).

Embodiment 84

The system according to embodiment 83, wherein the opposing pair of vertical frame members (111), the opposing pair of upper pivot arms (121), the opposing pair of lower pivot arms (122), and the opposing pair of adaptive mounting plates (1530) either with or without the modular implement base (140) form an opposing pair of four-bar linkages configured to maintain a desired angle between the vertical frame members (111) and the adaptive mounting plates (1530).

Embodiment 85

The system according to embodiment 83, wherein the first tension member (1520) is contained within the first compression member (1510).

Embodiment 86

The system according to embodiment 85, wherein the first tension member (1520) comprises a threaded or partially threaded rod and the first compression member (1510) comprises a square or hexagonal tube section.

Embodiment 87

The system according to embodiment 86, comprising at least two cable interface points (160A), (160B) configured to simultaneously generate a downward force on the fixed frame and an upward force on the movable frame when tension is applied to a cable (171) originating from the vehicle and routed in contact with the two cable interface points.

Embodiment 88

The system according to embodiment 87, wherein the two cable interface points (160A), (160B) comprise a roller (160A), and an attachment point (160B) both operating in a vertical plane aligned with a center of mass of the system; the attachment point (160B) configured to detachably receive a connection at a first end of the cable.

Embodiment 89

The system according to embodiment 88, wherein one or both of the two cable interface points (160A), (160B) are supported by an accessory bracket (1560) configured and adapted to fit over, bolt to, or otherwise mount on the compression member (1510).

Embodiment 90

The system according to embodiment 88, wherein one or both of the two cable interface points (160A), (160B) is configured and adapted to selectively mount on the compression member (1510) in a multitude of predetermined orientations.

Embodiment 91

The system according to embodiment 90 the multitude of predetermined orientations comprises between 2 and 6 evenly spaced angular orientations around a central axis of the compression member (1510).

Embodiment 92

The system according to embodiment 91 the evenly spaced angular orientations around a central axis of the compression member (1510) comprising four orientations each separated by 90 degrees from the next adjacent orientation.

Embodiment 93

The system according to embodiment 86, comprising an opposing pair of capture brackets (1511) configured and adapted to capture and align opposing ends of the compression member (1510).

Embodiment 94

The system according to embodiment 84, comprising a linear actuator (170B) configured to receive power from a cordless hand tool battery (320), and configured to generate motion of the movable frame (120) with respect to the fixed frame (110).

Embodiments of the subject invention provide a stowable modular lift conversion system (1500). As used herein, stowable means configured and adapted to be stowed, held, locked, or retained in a specified position. For example, a stowable movable frame can be stowed within the confines of a fixed frame. Alternatively, a stowable movable frame can be stowed at, about at, or near an upper, top, or retracted position (e.g., when a winch cable retracts a movable frame to a top position, or a position of minimal extension from a vehicle) and held in place by a retention device (e.g., a pin, clip, or other latch either automatically engaged or manually inserted in a stowed position or configuration, which impedes movement away from the stowed position of configuration). As used herein, modular means that elements or subsystems are modularly replaceable or reconfigurable (e.g., each of a hook (114), a multiaxial adjustable brace (1570), or a multiplicity of modular implements (151), (152), (153) can respectively be replaced with one or more functionally different parts sharing a common mounting or assembly feature) to provide alternative features or functionality to a common base of other components (e.g., on the same fixed frame or on the same movable frame). As used herein, a conversion system means a system wherein installation of the system converts a vehicle that was either designed or made without a specific lifting capability, to then have that specific lifting capability (e.g., adding a forklift to the front of a vehicle either before or after the original retail sale of the vehicle).

Embodiments provide one or more compression members (1510), that can advantageously be captured and located between an opposing pair of frame members or other structural members. In certain embodiments, compression members are advantageously employed to add structural rigidity at a reduced cost and complexity compared to non-tensioned structures of similar materials. When a compression member is captured, it is held in place by friction, by contact forces, or by one or more geometric features (e.g., ribs, cutouts, detents, flanges, bosses, or recesses) under the pressure created between the compression member and the capturing elements (e.g., pressure generated by application of a tension member squeezing the compression member through opposing capturing structural members). Embodiments provide compression members comprising one or more of steel, stainless, steel, aluminum, or other metals; fiberglass, carbon fiber or other composites; high strength polymers, wood, other suitable materials; or mixtures or combinations thereof. Embodiments provide tension and compression members, respectively, made of the same material or a similar material to the frame on which they are mounted.

Embodiments provide compression members of rectangular, triangular, square, hexagonal, octagonal, or oval profile (e.g., an extruded or drawn pipe or tube, of metal or structural plastic composition) that advantageously allows expedient fabrication (e.g., from an extrusion having an inner dimension sized to slide over an outer dimension of the compression member), installation, and mounting of an attachment point or other accessory on the compression member. For example, rectangular (non-square), triangular, or square compression members can provide, respectively, 2, 3, or 4 selectable angular mounting orientations for an attachment point (e.g., a pulley, an eyelet, a hook, a loop, or a horn) to be mounted on the compression member. Alternatively, a round compression member can advantageously be employed to provide mounting of attachment points or other accessories without angular registration (e.g., by sliding or securing a larger mount over a slightly smaller compression member) to advantageously provide an accessory that can rotate to minimize stress or twisting, or be selectively secured by a bolt, a tab, or a pin at desired axial and angular locations.

Embodiments provide compression members and/or accessories of the same geometry on both fixed and movable frames, respectively, providing advantages of reduced inventory and part count, cost control, and interoperability. Alternatively, in certain embodiments one compression member can be larger or smaller (e.g., in diameter, width, or wall thickness than the other, made with different materials, or placed in a different location to meet the needs (e.g., to support structural loads on one frame while saving weight or space on the other frame) in a specific application. Alternatively, in certain embodiments one of the fixed frame or the movable frame can have a compression member while the other does not (e.g., to support structural loads on one frame while saving weight or space on the other frame). In certain embodiments bottom arm placement of the compression member on the movable frame provides sufficient space between attachment points (e.g., between a roller on the fixed frame and a hook on the bottom arm of the movable frame) to allow for cable crimps, large hooks, or other elements of a winch cable to operate between the fixed frame and the movable frame. In certain embodiments, angular rotation of an attachment point or other accessory around one or more compression members (e.g., compression members and attachment points or other accessories each, respectively, having a round cross section) allows for improved lines of action, force transfer, or working distances in operation.

Embodiments provide one or more tension members (1520) configured and adapted to transfer tension through threaded fasteners such as nuts or jam nuts, cam-locks, or other mechanisms known in the art and create compression in the tension member and optionally in one or more capturing structural members. For example, a commercial off the shelf 18" threaded rod can be fitted with standard or high strength nuts which upon tightening generate tension in the tension member that is opposed by compression in the compression member. Embodiments provide a single tension member located within a profile or boundary of a single compression member and supporting the structure of a single frame (e.g., supporting a fixed frame, or supporting a movable frame). Alternative embodiments provide a multiplicity of tension members (e.g., ultra-high molecular weight polyethylene (UHMwPE) fibers or cords, steel or aluminum cables, aramid (aromatic polyamide) fibers or cords, or other materials of sufficient tensile strength and other material properties, as known in the art) arranged within, around, alternating, or patterned with one or more compression members.

Embodiments provide a multiaxial adjustable brace (1570) configured and adapted to adjustably position a contact surface (115) by providing a multiplicity of rotation points and a multiplicity of translation points, thereby enabling a larger number of positions and orientations than would otherwise be available to a brace having only a single rotation point or a single translation length.

Embodiments provide an opposing pair of adaptive mounting plates (1530), each connected to the far end (121B) of one of the upper pivot arms (121) or to the far end (122B) of one of the lower pivot arms (122), adaptive mounting plates (1530) can advantageously use less material and fits more compactly in packaging, while providing equivalent functionality to larger, single piece adaptive alignment plates or x-plates (130), offering advantages in cost, ease of manufacturing, and packaging.

Embodiments provide an opposing pair of four-bar linkages configured to maintain a desired angle between the vertical frame members (111) and the adaptive mounting plates (1530). The desired angle can be an angle that results in a vertical orientation of the modular implement base (140) or a horizontal orientation of a modular implement (151, 152, 153).

Embodiments provide an optional opposing pair of stabilizer links (1531) pivotably connected between an opposing pair of upper pivot arms (121) and an opposing pair of lower pivot arms (122), respectively. In certain embodiments a single stabilizer link is provided. In alternative embodiments a multiplicity of stabilizer links are provided. The stabilizer link (alone or in combination) maintains a specified distance between mounting points and provides additional structural support and integrity. Stabilizer links (1531) or support plates (1580) can also provide the advantages of reducing rotary motion or drag between moving parts and mounting bolts or nuts, thus inhibiting loosening or backing out of bolts or nuts; and better supporting the free end of a mounting bolt or nut to inhibit binding or jamming of rotations about the bolt.

Embodiments provide two cable interface points (160A), (160B) that comprise a roller (160A), and an attachment point (160B) both operating in a vertical plane aligned with a center of mass of the system; the attachment point (160B) configured to detachably receive a winch hook at a first end of a winch cable. The center of mass of the system refers to a plane, a point, or a series of locations that are sufficiently centered and aligned within the system to allow smooth and non-binding operation of the system. The center of mass in this context does not refer to an infinitely small or thin plane or point, but rather to a practically workable positioning relative to the normal tolerances and operation of the system (e.g., in certain embodiments within 1 inch, alternatively within 0.5, 1.5, 2, 3, 4, 5, or 6 inches of the geometric center of the system, alternatively within 5%, 10%, 15%, 20%, or 25% of the width of the system, as measured from the geometric center of the system to the geometric center of each respective interface point.

Embodiments provide one or more adaptive mounting plates (1530) having a circle, a curve, or an arc of adjustment points centered between the far end (121B) of one of the upper pivot arms (121), and the far end (122B) of one of the lower pivot arms (122) when the system is assembled for use in lifting the load.

Embodiments provide one or more adaptive mounting plates (1530) having a circle, a curve, or an arc of adjustment points centered at the far end (121B) of one of the upper pivot arms (121), or at the far end (122B) of one of the lower pivot arms (122) when the system is assembled for use in lifting the load.

Embodiments provide one or more adaptive mounting plates (1530) having a circle, a curve, or an arc of adjustment points centered beyond (e.g., above) the far end (121B) of one of the upper pivot arms (121), or beyond (e.g., below) the far end (122B) of one of the lower pivot arms (122) when the system is assembled for use in lifting the load.

Embodiments provide storage receptacles (122C) (e.g., slots) for storing one or more modular implements (151, 152, 153). The storage receptacles (122C) can be horizontal or vertical in orientation; can have one, two, or multiple openings; can be aligned or offset between respective openings; can be level to the ground in operation, or biased to one side (e.g., sufficiently angled to keep the modular implement (151, 152, 153) stored in a nearly horizontal orientation, while inhibiting release of the modular implement (151, 152, 153) via advantageous application of gravitational force to urge the modular implement (151, 152, 153) back into the receptacle under normal use (e.g., when driving over rough or uneven terrain).

Specific embodiments provide "crossed sword" implement holders (e.g., a first pair of slots configured and adapted to accept a first forklift implement in a slightly downward left-to-right motion, and a second pair of slots configured and adapted to accept a second forklift implement in a slightly downward right-to-left motion; wherein the first pair of slots and the second pair of slots are offset in a manner that allows the first forklift implement to cross the second forklift implement when both the first and second forklift implements are respectively loaded into the first and second pair of slots).

Embodiments provide a multiaxial support brace (1570) connected to the frame member (111) and comprising a support surface (115) configured to engage an outward surface of the existing rack, guard, or bumper in rotational opposition to the hook such that the lift system is aligned in a vertical or near-vertical orientation when installed.

Embodiments provide a multiaxial support brace (1570) having a first or second plurality of attachment points arranged in a curvilinear pattern comprising one or more arcuate sections, and the other plurality of attachment points arranged in a pattern comprising either a linear array or a complimentary curve, whereby the linear pattern can be arranged in a multiplicity of locations and orientations with respect to the curvilinear pattern while accepting mounting bolts to connect the linear pattern and the curvilinear pattern.

Embodiments provide a hook (114) configured to allow installation of the lift system onto the existing rack, guard, or bumper in a vertical direction, and inhibit motion of the lift system in a non-vertical direction, the frame member (111) connected to or comprising a support surface (115) configured to engage an outward surface of the existing rack, guard, or bumper in rotational opposition to the hook such that the lift system is aligned in a vertical or near-vertical orientation when installed on the vehicle. In certain embodiments, the hook provides an inverted-U shaped recess configured and adapted to align with a frame rail (e.g., frame, brush guard, bumper, or other structure) on the vehicle, travel down a specified distance under gravity, then inhibit further travel when the top of the inverted-U contacts the frame rail, the allow rotation of the frame around the top of the inverted-U until the support surface contacts the outward surface and inhibits further rotation.

Embodiments provide a safety bar (1540) configured and adapted to selectively inhibit removal of the at least one modular implement (151), (152), (153) when installed on the modular implement base (140) and a safety bar lock (1550) configured and adapted to selectively inhibit motion of the safety bar (1540). The safety bar can rotate, slide, twist, or translate from an open position (e.g., allowing removal of the modular implement (151), (152), (153)) to a closed position (e.g., inhibiting removal of the modular implement (151), (152), (153)).

Certain embodiments provide a mounting bar (141) extending across a width (w) of the modular implement base (140); wherein the at least one modular implement (151), (152), (153) comprises one or more contact support surfaces (159) configured and adapted to drop down onto the mounting bar (141) and to inhibit forward, backward, or further downward motion by contact with the mounting bar. The contact support surfaces can be advantageously arranged to allow motion in one or more directions (e.g., up and down to an installed position) while inhibiting motion (e.g., rolling or sliding forward or backward) in another one or more directions. The contact support surfaces can be arranged to contact only a single mounting bar (141) (e.g., a top bar, or a front bar, of the modular implement base). In alternative embodiments, the contact support surfaces can be arranged to contact two or more mounting bars (141) (e.g., a top bar and a bottom bar, or a front bar and a rear bar, of the modular implement base).

Embodiments provide a safety bar (1540) extending across a width (w) of the modular implement base (140) above the mounting bar (141), the safety bar (1540) adapted and configurable in a closed position to inhibit upward motion, repositioning, and/or removal of the at least one modular implement (151), (152), (153) and in an open position to allow upward motion, repositioning, and/or removal of the at least one modular implement (151), (152), (153).

Embodiments provide a safety bar (1540) being held at a first end by a sliding joint (1542) (e.g., a slot, a bore, or a channel) and movable from the closed position to the open position.

Embodiments provide a first compression member (1510) (e.g., a square steel box section) captured between the opposing pair of vertical frame members (111), a first tension member (1520) (e.g., a threaded rod with a nut on each end) configured and adapted to generate inward pressure between opposing frame members against the first compression member (1510), wherein the first tension member (1520) is contained (e.g., passing through a respective hole in each respective opposing frame member, wherein each respective hole is centered with respect to a mounting position of the compression member with respect to the opposing frame members) within the first compression member (1510). The tension member is contained within the cross section of the tension member in a radial direction even though the tension member extends beyond the end of the compression member in an axial direction.

Embodiments provide a first tension member (1520) that comprises a threaded or partially threaded rod passing through a first compression member (1510) that comprises a square tube section.

Embodiments provide modular attachment points that allow flexibility to adjust an angle of travel of a winch cable to minimize force and avoid binding, or to configure a cable roller at the bottom arm of the movable frame and attach a cable end at the top of a fixed frame (e.g., to align with low mounted or obstructed winch cable).

All patents, patent applications, provisional applications, and publications referred to or cited herein are incorporated by reference in their entirety, including all figures and tables, to the extent they are not inconsistent with the explicit teachings of this specification.

Following are examples that illustrate procedures for practicing the invention. These examples should not be construed as limiting.

Example 1

A prototype of the modular lift conversion system 100 was constructed using ⅜" thick steel for all flat members, a 2" diameter steel bar and two pulleys for the cable interface points (160A, 160B), and ⅜" thick steel for the modular implement base 140, and ⅜" thick steel for one implement 151 (forks for lifting). Welds were used to assemble the frame (111, 112, 113, 114, and 115). Welds were also used to affix the cable interface points (160A, 160B) supporting bars to the frame. Welds were also used to affix the x-plates 130 to the implement bars of the modular implement base 140. ⁷⁄₁₆" diameter Clevis pins were used to affix the upper pivot arms 121 and lower pivot arms 122 to the frame on the near end 121A, and to the x-plates on the far end 121B.

This unit has been deployed on a 2021 Arctic Cat Prowler Pro UTV. (Arctic Cat, Inc., Plymouth, Minnesota; marketed and sold by Bass Pro Shops as a Tracker 800SX LE); then lifted off and deployed on a 2019 Mahindra Retriever 700 (Mahindra USA, Inc., Houston, TX). Each unit utilized a 4,000-pound pull winch (Warn Industries, Inc., Clackamas, Oregon) This unit has been used with a modular fork implement 151 deployed to pick up pallets of material (including 350 pounds of topsoil pictured in FIG. 12A.)

When deployed with the trailer ball implement 152, this unit has been used to lift the tongue and move the following trailers:

| Trailer | Weight |
| --- | --- |
| Two Horse Trailer | 3,000 pounds |
| Utility Trailer | 750 pounds |
| Boat Trailer With 24-foot Boat | 4,500 pounds |

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination)

or any other invention or embodiment thereof disclosed herein, and all such combinations are contemplated with the scope of the invention without limitation thereto.

We claim:

1. A stowable modular lift conversion system (1500) configured for application to a vehicle, the system comprising:
    a fixed frame (110) configured to mount to the vehicle, the fixed frame comprising:
    an opposing pair of vertical frame members (111),
    a first compression member (1510) captured between the opposing pair of vertical frame members (111),
    a first tension member (1520) configured and adapted to generate inward pressure between opposing frame members against the first compression member (1510),
    an upper pivot point (112) on each of the vertical frame members (111),
    a lower pivot point (113) on each of the vertical frame members (111),
    a hook (114) configured to inhibit translational motion of the fixed frame (110) in more than one direction, and
    a multiaxial adjustable brace (1570) comprising a support surface (115) configured to support the fixed frame (110) against rotation; and
    a movable frame (120) configured and adapted to lift a load and to move from a stowed configuration to an extended position, the movable frame comprising:
    an opposing pair of upper pivot arms (121), each having a near end (121A) respectively connected to one of the upper pivot points (112), and a far end (121B) opposite the near end,
    an opposing pair of lower pivot arms (122), each having a near end (122A) respectively connected to one of the lower pivot points (113), and a far end (122B) opposite the near end,
    a second compression member (1510) captured and located between either the opposing pair of upper pivot arms (121), or the opposing pair of lower pivot arms (122),
    a second tension member (1520) configured and adapted to generate inward pressure between opposing pivot arms (121, or 122) against the second compression member (1510),
    an opposing pair of adaptive mounting plates (1530), each connected to the far end (121B) of one of the upper pivot arms (121) or to the far end (122B) of one of the lower pivot arms (122),
    a modular implement base (140) connected to the opposing pair of adaptive mounting plates (1530), and
    a safety bar (1540) movable from an open position to a closed position with respect to the modular implement base (140);
    wherein the modular implement base (140) and the safety bar (1540) are each respectively adapted and configured such that a multiplicity of modular implements (151), (152), (153) can be detached from the modular implement base when the safety bar (1540) is in the open position, but not when the safety bar (1540) is in the closed position.

2. The system according to claim 1, comprising a safety bar lock (1550) movable from a locked configuration to an unlocked configuration, the safety bar lock (1550) configured and adapted to selectively inhibit movement of the safety bar (1540) from the closed position to the open position when in the locked configuration.

3. The system according to claim 2, wherein the opposing pair of vertical frame members (111), the opposing pair of upper pivot arms (121), the opposing pair of lower pivot arms (122), and the opposing pair of adaptive mounting plates (1530) form an opposing pair of four-bar linkages configured to maintain a desired angle between the vertical frame members (111) and the adaptive mounting plates (1530).

4. The system according to claim 3, wherein the opposing pair of adaptive mounting plates are a first opposing pair of adaptive mounting plates (1530) and the opposing pair of four-bar linkages further comprise a second opposing pair of adaptive mounting plates (1530) and, optionally, a stabilizer link (1531) pivotably connected between the opposing pair of upper pivot arms (121) and the opposing pair of lower pivot arms (122).

5. The system according to claim 4, wherein the modular implement base (140) connects the first opposing pair of adaptive mounting plates (1530) and the second opposing pair of adaptive mounting plates (1530).

6. The system according to claim 3, comprising an actuator (170A or 170B) configured to receive power from a cordless hand tool battery (320), and configured to generate motion of the movable frame (120) with respect to the fixed frame (110).

7. The system according to claim 1, wherein at least one vertical frame member (111) of the opposing pair of vertical frame members (111) connects at least one upper pivot point (112), at least one lower pivot point (113), the hook (114), and the multiaxial adjustable brace (1570).

8. The system according to claim 7, comprising at least two cable interface points (160A), (160B) configured to simultaneously generate a downward force on the fixed frame and an upward force on the movable frame when tension is applied to a cable (171) originating from the vehicle and routed in contact with the two cable interface points.

9. The system according to claim 8, wherein the two cable interface points (160A), (160B) comprise a roller (160A), and an attachment point (160B) both operating in a vertical plane aligned with a center of mass of the system; the attachment point (160B) configured to detachably receive a winch hook at a first end of the cable.

10. The system according to claim 9, wherein the fixed frame (110) is configured and adapted to mount to and dismount from the vehicle by manual operation without hand tools after an initial assembly of the fixed frame (110).

11. The system according to claim 1, comprising an actuator (170A or 170B) configured to receive power from a cordless hand tool battery (320), and configured to generate motion of the movable frame (120) with respect to the fixed frame (110).

12. The system according to claim 1, wherein the opposing pair of adaptive mounting plates (1530) comprises a multiplicity of adjustable pivot points aligned in a circle, a curve, or an arc.

13. The system according to claim 12, wherein the circle, the curve, or the arc is centered between the far end (121B) of one of the upper pivot arms (121), and the far end (122B) of one of the lower pivot arms (122) when the system is assembled for use in lifting the load.

14. The system according to claim 12, wherein the circle, the curve, or the arc is centered at the far end (121B) of one of the upper pivot arms (121), or at the far end (122B) of one of the lower pivot arms (122) when the system is assembled for use in lifting the load.

15. The system according to claim 12, wherein the circle, the curve, or the arc is centered beyond the far end (121B) of one of the upper pivot arms (121), or at the far end (122B)

of one of the lower pivot arms (122) when the system is assembled for use in lifting the load.

16. The system according to claim 1, wherein the opposing pair of adaptive mounting plates (1530) comprise an opposing pair of connection points, configured and adapted to align and connect with the opposing far ends (121B) of the opposing upper pivot arms (121), or the opposing far ends (122B) of the opposing lower pivot arms (122), or both, when the system is assembled for use in lifting the load.

17. The system according to claim 1, wherein the hook (114) is configured and adapted to removably drop down onto the vehicle from above and the multiaxial adjustable brace (1570) is configured and adapted to locate the support surface (115) in contact with the vehicle and support the fixed frame at a desired position and orientation on the vehicle.

18. A stowable modular lift conversion system (1500) configured for application to a vehicle, the system comprising:
- a fixed frame (110) configured to mount to the vehicle, the fixed frame comprising:
- an opposing pair of vertical frame members (111),
- a first compression member (1510) captured between the opposing pair of vertical frame members (111),
- a first tension member (1520) configured and adapted to generate inward pressure between opposing frame members against the first compression member (1510),
- an upper pivot point (112) on each of the vertical frame members (111),
- a lower pivot point (113) on each of the vertical frame members (111),
- a hook (114) configured to inhibit translational motion of the fixed frame (110) in more than one direction, and
- a multiaxial adjustable brace (1570) comprising a support surface (115) configured to support the fixed frame (110) against rotation; and
- a movable frame (120) configured and adapted to lift a load and to move from a stowed configuration to an extended position, the movable frame comprising:
- an opposing pair of upper pivot arms (121), each having a near end (121A) respectively connected to one of the upper pivot points (112), and a far end (121B) opposite the near end,
- an opposing pair of lower pivot arms (122), each having a near end (122A) respectively connected to one of the lower pivot points (113), and a far end (122B) opposite the near end,
- a second compression member (1510) captured and located between either the opposing pair of upper pivot arms (121), or the opposing pair of lower pivot arms (122),
- a second tension member (1520) configured and adapted to generate inward pressure between opposing pivot arms (121, or 122) against the second compression member (1510),
- an opposing pair of adaptive mounting plates (1530), each connected to the far end (121B) of one of the upper pivot arms (121) or to the far end (122B) of one of the lower pivot arms (122),
- a modular implement base (140) connected to the opposing pair of adaptive mounting plates (1530), and
- wherein the opposing pair of vertical frame members (111), the opposing pair of upper pivot arms (121), the opposing pair of lower pivot arms (122), and the opposing pair of adaptive mounting plates (1530) form an opposing pair of four-bar linkages configured to maintain a desired angle between the vertical frame members (111) and the adaptive mounting plates (1530);
- wherein the opposing pair of adaptive mounting plates are a first opposing pair of adaptive mounting plates (1530) and the opposing pair of four-bar linkages further comprise a second opposing pair of adaptive mounting plates (1530) and, optionally, a stabilizer link (1531) pivotably connected between the opposing pair of upper pivot arms (121) and the opposing pair of lower pivot arms (122);
- wherein the fixed frame (110) is configured and adapted to mount to and dismount from the vehicle by manual operation without hand tools after an initial assembly of the fixed frame (110);
- wherein the hook (114) is configured and adapted to removably drop down onto the vehicle from above and the multiaxial adjustable brace (1570) is configured and adapted to locate the support surface (115) in contact with the vehicle and support the fixed frame at a desired position and orientation on the vehicle.

19. A stowable modular lift conversion system (1500) configured for application to a vehicle, the system comprising:
- a fixed frame (110) configured to mount to the vehicle, the fixed frame comprising:
- an opposing pair of vertical frame members (111),
- a first compression member (1510) captured between the opposing pair of vertical frame members (111),
- a first tension member (1520) configured and adapted to generate inward pressure between opposing frame members against the first compression member (1510),
- an upper pivot point (112) on each of the vertical frame members (111),
- a lower pivot point (113) on each of the vertical frame members (111),
- a hook (114) configured to inhibit translational motion of the fixed frame (110) in more than one direction, and
- a support surface (115) configured to support the fixed frame (110) against rotation; and
- a movable frame (120) configured and adapted to lift a load and to move from a stowed configuration to an extended position, the movable frame comprising:
- an opposing pair of upper pivot arms (121), each having a near end (121A) respectively connected to one of the upper pivot points (112), and a far end (121B) opposite the near end,
- an opposing pair of lower pivot arms (122), each having a near end (122A) respectively connected to one of the lower pivot points (113), and a far end (122B) opposite the near end,
- a second compression member (1510) captured and located between either the opposing pair of upper pivot arms (121), or the opposing pair of lower pivot arms (122),
- a second tension member (1520) configured and adapted to generate inward pressure between opposing pivot arms (121, or 122) against the second compression member (1510),
- an opposing pair of adaptive mounting plates (1530), each connected to the far end (121B) of one of the upper pivot arms (121) or to the far end (122B) of one of the lower pivot arms (122),
- a modular implement base (140) connected to the opposing pair of adaptive mounting plates (1530), and a safety bar (1540) movable from an open position to a closed position with respect to the modular implement base (140);

wherein the modular implement base (140) and the safety bar (1540) are each respectively adapted and configured such that a multiplicity of modular implements (151), (152), (153) can be detached from the modular implement base when the safety bar (1540) is in the open position, but not when the safety bar (1540) is in the closed position;

wherein the opposing pair of vertical frame members (111), the opposing pair of upper pivot arms (121), the opposing pair of lower pivot arms (122), and the opposing pair of adaptive mounting plates (1530) form an opposing pair of four-bar linkages configured to maintain a desired angle between the vertical frame members (111) and the adaptive mounting plates (1530);

wherein the opposing pair of adaptive mounting plates are a first opposing pair of adaptive mounting plates (1530) and the opposing pair of four-bar linkages further comprise a second opposing pair of adaptive mounting plates (1530) and, optionally, a stabilizer link (1531) pivotably connected between the opposing pair of upper pivot arms (121) and the opposing pair of lower pivot arms (122);

wherein the fixed frame (110) is configured and adapted to mount to and dismount from the vehicle by manual operation without hand tools after an initial assembly of the fixed frame (110);

wherein the hook (114) is configured and adapted to removably drop down onto the vehicle from above and the support surface (115) is configured and adapted to contact the vehicle and support the fixed frame at a desired position and orientation on the vehicle.

20. The system according to claim 19, comprising a safety bar lock (1550) movable from a locked configuration to an unlocked configuration, the safety bar lock (1550) configured and adapted to selectively inhibit movement of the safety bar (1540) from the closed position to the open position when in the locked configuration.

* * * * *